(12) United States Patent
Chen et al.

(10) Patent No.: US 11,956,413 B2
(45) Date of Patent: Apr. 9, 2024

(54) PIXEL SENSOR HAVING MULTIPLE PHOTODIODES AND SHARED COMPARATOR

(71) Applicant: META PLATFORMS TECHNOLOGIES, LLC, Menlo Park, CA (US)

(72) Inventors: Song Chen, Redmond, WA (US); Xinqiao Liu, Medina, WA (US); Lyle David Bainbridge, Redwood City, CA (US); Andrew Samuel Berkovich, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 172 days.

(21) Appl. No.: 16/550,851

(22) Filed: Aug. 26, 2019

(65) Prior Publication Data

US 2020/0068189 A1 Feb. 27, 2020

Related U.S. Application Data

(60) Provisional application No. 62/723,376, filed on Aug. 27, 2018.

(51) Int. Cl.
*H04N 5/355* (2011.01)
*H04N 5/378* (2011.01)
*H04N 13/286* (2018.01)

(52) U.S. Cl.
CPC ......... *H04N 13/286* (2018.05); *H04N 5/3559* (2013.01); *H04N 5/378* (2013.01)

(58) Field of Classification Search
CPC ...... H04N 5/3355; H04N 5/341; H04N 5/355; H04N 5/3559; H04N 5/378; H04N 13/322

See application file for complete search history.

(56) References Cited

U.S. PATENT DOCUMENTS 4,596,977 A 6/1986 Bauman et al.
5,053,771 A 10/1991 McDermott
(Continued)

FOREIGN PATENT DOCUMENTS

CN 1490878 A 4/2004
CN 1728397 A 2/2006
(Continued)

OTHER PUBLICATIONS

U.S. Appl. No. 15/719,345, "Notice of Allowance", dated Sep. 3, 2020, 12 pages.
(Continued)

*Primary Examiner* — Kevin K Pyo
(74) *Attorney, Agent, or Firm* — Kilpatrick Townsend & Stockton LLP

(57) ABSTRACT

In one example, an apparatus comprises: a first photodiode to generate a first charge; a second photodiode to generate a second charge; a quantizer; a first memory bank and a second memory bank; and a controller configured to: control the quantizer to perform a first quantization operation and a second quantization operation of the first charge to generate, respectively, a first digital output and a second digital output, the first and second quantization operations being associated with different intensity ranges; store one of the first digital output or the second digital output in the first memory bank; control the quantizer to perform a third quantization operation of the second charge to generate a third digital output, the third quantization operation being associated with a different intensity range from at least one of the first or second quantization operations; and store the third digital output in the second memory bank.

20 Claims, 35 Drawing Sheets

(56) References Cited

U.S. PATENT DOCUMENTS

| | | |
|---|---|---|
| 5,844,512 A | 12/1998 | Gorin et al. |
| 5,963,369 A | 10/1999 | Steinthal et al. |
| 6,057,586 A | 5/2000 | Bawolek et al. |
| 6,384,905 B1 | 5/2002 | Barrows |
| 6,522,395 B1 | 2/2003 | Bamji et al. |
| 6,529,241 B1 | 3/2003 | Clark |
| 6,864,817 B1 | 3/2005 | Salvi et al. |
| 6,963,369 B1 | 11/2005 | Olding |
| 6,970,195 B1 | 11/2005 | Bidermann et al. |
| 6,972,791 B1 | 12/2005 | Yomeyama |
| 6,992,706 B2 | 1/2006 | Mabuchi et al. |
| 7,038,820 B1 | 5/2006 | Kindt et al. |
| 7,326,903 B2 | 2/2008 | Ackland |
| 7,362,365 B1 | 4/2008 | Reyneri et al. |
| 7,659,772 B2 | 2/2010 | Nomura et al. |
| 7,659,925 B2 | 2/2010 | Krymski |
| 7,719,589 B2 | 5/2010 | Turchetta et al. |
| 7,956,914 B2 | 6/2011 | Xu |
| 8,134,623 B2 | 3/2012 | Purcell et al. |
| 8,144,227 B2 | 3/2012 | Kobayashi |
| 8,369,458 B2 | 2/2013 | Wong et al. |
| 8,426,793 B1 | 4/2013 | Barrows |
| 8,754,798 B2 | 6/2014 | Lin |
| 8,773,562 B1 | 7/2014 | Fan |
| 8,779,346 B2 | 7/2014 | Fowler et al. |
| 8,946,610 B2 | 2/2015 | Iwabuchi et al. |
| 9,001,251 B2 | 4/2015 | Smith et al. |
| 9,094,629 B2 | 7/2015 | Ishibashi |
| 9,185,273 B2 | 11/2015 | Beck et al. |
| 9,274,151 B2 | 3/2016 | Lee et al. |
| 9,282,264 B2 | 3/2016 | Park et al. |
| 9,332,200 B1 | 5/2016 | Hseih et al. |
| 9,343,497 B2 | 5/2016 | Cho |
| 9,363,454 B2 | 6/2016 | Ito et al. |
| 9,478,579 B2 | 10/2016 | Dai et al. |
| 9,497,396 B2 | 11/2016 | Choi |
| 9,531,990 B1 | 12/2016 | Wilkins et al. |
| 9,800,260 B1 | 10/2017 | Banerjee |
| 9,819,885 B2 | 11/2017 | Furukawa et al. |
| 9,832,370 B2 | 11/2017 | Cho et al. |
| 9,909,922 B2 | 3/2018 | Schweickert et al. |
| 9,935,618 B1 | 4/2018 | Fenigstein |
| 9,948,316 B1 | 4/2018 | Yun et al. |
| 9,955,091 B1 | 4/2018 | Dai et al. |
| 9,967,496 B2 | 5/2018 | Ayers et al. |
| 10,003,759 B2 | 6/2018 | Fan |
| 10,015,416 B2 | 7/2018 | Borthakur et al. |
| 10,090,342 B1 | 10/2018 | Gambino et al. |
| 10,096,631 B2 | 10/2018 | Ishizu |
| 10,103,193 B1 | 10/2018 | Manabe et al. |
| 10,154,221 B2 | 12/2018 | Ogino et al. |
| 10,157,951 B2 | 12/2018 | Kim et al. |
| 10,321,081 B2 | 6/2019 | Watanabe et al. |
| 10,345,447 B1 | 7/2019 | Hicks |
| 10,419,701 B2 | 9/2019 | Liu |
| 10,574,925 B2 | 2/2020 | Otaka |
| 10,594,974 B2 | 3/2020 | Ivarsson et al. |
| 10,598,546 B2 | 3/2020 | Liu |
| 10,608,101 B2 | 3/2020 | Liu |
| 10,686,996 B2 | 6/2020 | Liu |
| 10,726,627 B2 | 7/2020 | Liu |
| 10,750,097 B2 | 8/2020 | Liu |
| 10,764,526 B1 | 9/2020 | Liu et al. |
| 10,804,926 B2 | 10/2020 | Gao et al. |
| 10,812,742 B2 | 10/2020 | Chen et al. |
| 10,825,854 B2 | 11/2020 | Liu |
| 10,834,344 B2 | 11/2020 | Chen et al. |
| 10,897,586 B2 | 1/2021 | Liu et al. |
| 10,903,260 B2 | 1/2021 | Chen et al. |
| 10,917,589 B2 | 2/2021 | Liu |
| 10,923,523 B2 | 2/2021 | Liu et al. |
| 10,931,884 B2 | 2/2021 | Liu et al. |
| 10,951,849 B2 | 3/2021 | Liu |
| 10,969,273 B2 | 4/2021 | Berkovich et al. |
| 11,004,881 B2 | 5/2021 | Liu et al. |
| 11,057,581 B2 | 7/2021 | Liu |
| 11,089,210 B2 | 8/2021 | Berkovich et al. |
| 11,089,241 B2 | 8/2021 | Chen et al. |
| 11,146,753 B2 | 10/2021 | Shimura et al. |
| 11,218,660 B1 | 1/2022 | Liu et al. |
| 11,463,636 B2 | 10/2022 | Berkovich et al. |
| 2002/0067303 A1 | 6/2002 | Lee et al. |
| 2002/0113886 A1 | 8/2002 | Hynecek |
| 2003/0001080 A1 | 1/2003 | Kummaraguntla et al. |
| 2003/0020100 A1 | 1/2003 | Guidash |
| 2003/0049925 A1 | 3/2003 | Layman et al. |
| 2004/0095495 A1 | 5/2004 | Inokuma et al. |
| 2004/0118994 A1 | 6/2004 | Mizuno |
| 2004/0251483 A1 | 12/2004 | Ko et al. |
| 2005/0046715 A1 | 3/2005 | Lim et al. |
| 2005/0057389 A1 | 3/2005 | Krymski |
| 2005/0104983 A1 | 5/2005 | Raynor |
| 2005/0206414 A1 | 9/2005 | Cottin et al. |
| 2005/0237380 A1 | 10/2005 | Kakii et al. |
| 2005/0280727 A1 | 12/2005 | Sato et al. |
| 2006/0023109 A1 | 2/2006 | Mabuchi et al. |
| 2006/0146159 A1 | 7/2006 | Farrier |
| 2006/0158541 A1 | 7/2006 | Ichikawa |
| 2007/0013983 A1 | 1/2007 | Kitamura et al. |
| 2007/0035653 A1 | 2/2007 | Hong et al. |
| 2007/0076109 A1 | 4/2007 | Krymski |
| 2007/0076481 A1 | 4/2007 | Tennant |
| 2007/0092244 A1 | 4/2007 | Pertsel et al. |
| 2007/0102740 A1 | 5/2007 | Ellis-Monaghan et al. |
| 2007/0131991 A1 | 6/2007 | Sugawa |
| 2007/0208526 A1 | 9/2007 | Staudt et al. |
| 2007/0222881 A1 | 9/2007 | Mentzer |
| 2007/0225560 A1 | 9/2007 | Avni et al. |
| 2008/0001065 A1 | 1/2008 | Ackland |
| 2008/0007731 A1 | 1/2008 | Botchway et al. |
| 2008/0042046 A1 | 2/2008 | Mabuchi |
| 2008/0042888 A1 | 2/2008 | Danesh |
| 2008/0068478 A1 | 3/2008 | Watanabe |
| 2008/0088014 A1 | 4/2008 | Adkisson et al. |
| 2008/0191791 A1 | 8/2008 | Nomura et al. |
| 2008/0226170 A1 | 9/2008 | Sonoda |
| 2008/0226183 A1 | 9/2008 | Lei et al. |
| 2009/0002528 A1 | 1/2009 | Manabe et al. |
| 2009/0033588 A1 | 2/2009 | Kajita et al. |
| 2009/0040364 A1 | 2/2009 | Rubner |
| 2009/0066820 A1 | 3/2009 | Jiang et al. |
| 2009/0091645 A1 | 4/2009 | Trimeche et al. |
| 2009/0128640 A1 | 5/2009 | Yumiki |
| 2009/0224139 A1 | 9/2009 | Buettgen et al. |
| 2009/0244328 A1 | 10/2009 | Yamashita |
| 2009/0244346 A1 | 10/2009 | Funaki |
| 2009/0245637 A1 | 10/2009 | Barman et al. |
| 2009/0261235 A1 | 10/2009 | Lahav et al. |
| 2009/0303371 A1 | 12/2009 | Watanabe et al. |
| 2009/0321615 A1 | 12/2009 | Sugiyama et al. |
| 2010/0013969 A1 | 1/2010 | Ui |
| 2010/0140732 A1 | 6/2010 | Eminoglu et al. |
| 2010/0194956 A1 | 8/2010 | Yuan et al. |
| 2010/0232227 A1 | 9/2010 | Lee |
| 2010/0245647 A1 | 9/2010 | Honda et al. |
| 2010/0276572 A1 | 11/2010 | Iwabuchi et al. |
| 2011/0049589 A1 | 3/2011 | Chuang et al. |
| 2011/0122304 A1 | 5/2011 | Sedelnikov |
| 2011/0149116 A1 | 6/2011 | Kim |
| 2011/0155892 A1 | 6/2011 | Neter et al. |
| 2011/0254986 A1 | 10/2011 | Nishimura et al. |
| 2011/0267533 A1 | 11/2011 | Hirose |
| 2011/0298074 A1 | 12/2011 | Funao |
| 2012/0016817 A1 | 1/2012 | Smith et al. |
| 2012/0039548 A1 | 2/2012 | Wang et al. |
| 2012/0068051 A1 | 3/2012 | Ahn et al. |
| 2012/0075511 A1 | 3/2012 | Tay |
| 2012/0092677 A1 | 4/2012 | Suehira et al. |
| 2012/0105475 A1 | 5/2012 | Tseng |
| 2012/0105668 A1 | 5/2012 | Velarde et al. |
| 2012/0113119 A1 | 5/2012 | Massie |
| 2012/0127284 A1 | 5/2012 | Bar-Zeev et al. |
| 2012/0133807 A1 | 5/2012 | Wu et al. |
| 2012/0138775 A1 | 6/2012 | Cheon et al. |

(56) References Cited

U.S. PATENT DOCUMENTS

| | | |
|---|---|---|
| 2012/0153123 A1 | 6/2012 | Mao et al. |
| 2012/0188420 A1 | 7/2012 | Black et al. |
| 2012/0200499 A1 | 8/2012 | Osterhout et al. |
| 2012/0212465 A1 | 8/2012 | White et al. |
| 2012/0241591 A1 | 9/2012 | Wan et al. |
| 2012/0262616 A1 | 10/2012 | Sa et al. |
| 2012/0267511 A1 | 10/2012 | Kozlowski |
| 2012/0273654 A1 | 11/2012 | Hynecek et al. |
| 2012/0273906 A1 | 11/2012 | Mackey et al. |
| 2012/0305751 A1 | 12/2012 | Kusuda |
| 2012/0327279 A1 | 12/2012 | Hashimoto et al. |
| 2013/0020466 A1 | 1/2013 | Ayers et al. |
| 2013/0056809 A1 | 3/2013 | Mao et al. |
| 2013/0057742 A1 | 3/2013 | Nakamura et al. |
| 2013/0068929 A1 | 3/2013 | Solhusvik et al. |
| 2013/0069787 A1 | 3/2013 | Petrou |
| 2013/0082313 A1 | 4/2013 | Manabe |
| 2013/0113969 A1 | 5/2013 | Manabe et al. |
| 2013/0120615 A1 | 5/2013 | Hirooka et al. |
| 2013/0120625 A1 | 5/2013 | Ishii et al. |
| 2013/0126710 A1 | 5/2013 | Kondo |
| 2013/0141619 A1 | 6/2013 | Lim et al. |
| 2013/0187027 A1 | 7/2013 | Qiao et al. |
| 2013/0207219 A1 | 8/2013 | Ahn |
| 2013/0214371 A1 | 8/2013 | Asatsuma et al. |
| 2013/0218728 A1 | 8/2013 | Hashop et al. |
| 2013/0221194 A1 | 8/2013 | Manabe |
| 2013/0229543 A1 | 9/2013 | Hashimoto et al. |
| 2013/0229560 A1 | 9/2013 | Kondo |
| 2013/0234029 A1 | 9/2013 | Bikumandla |
| 2013/0248685 A1 | 9/2013 | Ahn |
| 2013/0293752 A1 | 11/2013 | Peng et al. |
| 2013/0299674 A1 | 11/2013 | Fowler et al. |
| 2013/0300906 A1 | 11/2013 | Yan |
| 2014/0021574 A1 | 1/2014 | Egawa |
| 2014/0042299 A1 | 2/2014 | Wan et al. |
| 2014/0042582 A1 | 2/2014 | Kondo |
| 2014/0078336 A1 | 3/2014 | Beck et al. |
| 2014/0085523 A1 | 3/2014 | Hynecek |
| 2014/0176770 A1 | 6/2014 | Kondo |
| 2014/0211052 A1 | 7/2014 | Choi |
| 2014/0232890 A1 | 8/2014 | Yoo et al. |
| 2014/0247382 A1 | 9/2014 | Moldovan et al. |
| 2014/0306276 A1 | 10/2014 | Yamaguchi |
| 2014/0313387 A1 | 10/2014 | Vogelsang et al. |
| 2014/0368687 A1 | 12/2014 | Yu et al. |
| 2015/0048427 A1 | 2/2015 | Hu et al. |
| 2015/0083895 A1 | 3/2015 | Hashimoto et al. |
| 2015/0085134 A1 | 3/2015 | Novotny et al. |
| 2015/0090863 A1 | 4/2015 | Mansoorian et al. |
| 2015/0097951 A1 | 4/2015 | Barrows |
| 2015/0172574 A1 | 6/2015 | Honda et al. |
| 2015/0189209 A1 | 7/2015 | Yang et al. |
| 2015/0201142 A1 | 7/2015 | Smith et al. |
| 2015/0208009 A1 | 7/2015 | Oh et al. |
| 2015/0229859 A1 | 8/2015 | Guidash et al. |
| 2015/0237274 A1 | 8/2015 | Yang et al. |
| 2015/0279884 A1 | 10/2015 | Kusumoto |
| 2015/0287766 A1 | 10/2015 | Kim et al. |
| 2015/0309311 A1 | 10/2015 | Cho |
| 2015/0309316 A1 | 10/2015 | Osterhout et al. |
| 2015/0312461 A1 | 10/2015 | Kim et al. |
| 2015/0312502 A1 | 10/2015 | Borremans |
| 2015/0312557 A1 | 10/2015 | Kim |
| 2015/0350582 A1 | 12/2015 | Korobov et al. |
| 2015/0358569 A1 | 12/2015 | Egawa |
| 2015/0358571 A1 | 12/2015 | Dominguez Castro et al. |
| 2015/0358593 A1 | 12/2015 | Sato |
| 2015/0381907 A1 | 12/2015 | Boettiger et al. |
| 2015/0381911 A1 | 12/2015 | Shen et al. |
| 2016/0011422 A1 | 1/2016 | Thurber et al. |
| 2016/0018645 A1 | 1/2016 | Haddick et al. |
| 2016/0021302 A1 | 1/2016 | Cho et al. |
| 2016/0028974 A1 | 1/2016 | Guidash et al. |
| 2016/0028980 A1 | 1/2016 | Kameyama et al. |
| 2016/0035770 A1 | 2/2016 | Ahn et al. |
| 2016/0037111 A1 | 2/2016 | Dai et al. |
| 2016/0078614 A1 | 3/2016 | Ryu et al. |
| 2016/0088253 A1 | 3/2016 | Tezuka |
| 2016/0093659 A1 | 3/2016 | Nakamura et al. |
| 2016/0100115 A1 | 4/2016 | Kusano |
| 2016/0111457 A1 | 4/2016 | Sekine |
| 2016/0112626 A1 | 4/2016 | Shimada |
| 2016/0118992 A1 | 4/2016 | Milkov |
| 2016/0165160 A1 | 6/2016 | Hseih et al. |
| 2016/0181298 A1 | 6/2016 | Wan et al. |
| 2016/0197117 A1 | 7/2016 | Nakata et al. |
| 2016/0198114 A1 | 7/2016 | Zhang et al. |
| 2016/0204150 A1 | 7/2016 | Oh et al. |
| 2016/0210785 A1 | 7/2016 | Balachandreswaran et al. |
| 2016/0225813 A1 | 8/2016 | Liao et al. |
| 2016/0240570 A1 | 8/2016 | Barna et al. |
| 2016/0249004 A1 | 8/2016 | Saeki et al. |
| 2016/0255293 A1 | 9/2016 | Gesset |
| 2016/0276394 A1 | 9/2016 | Chou et al. |
| 2016/0307945 A1 | 10/2016 | Madurawe |
| 2016/0337605 A1 | 11/2016 | Ito |
| 2016/0353045 A1 | 12/2016 | Kawahito et al. |
| 2016/0360127 A1 | 12/2016 | Dierickx et al. |
| 2017/0013215 A1 | 1/2017 | McCarten |
| 2017/0039906 A1 | 2/2017 | Jepsen |
| 2017/0041571 A1 | 2/2017 | Tyrrell et al. |
| 2017/0053962 A1 | 2/2017 | Oh et al. |
| 2017/0059399 A1 | 3/2017 | Suh et al. |
| 2017/0062501 A1 | 3/2017 | Velichko et al. |
| 2017/0069363 A1 | 3/2017 | Baker |
| 2017/0070691 A1 | 3/2017 | Nishikido |
| 2017/0099422 A1 | 4/2017 | Goma et al. |
| 2017/0099446 A1 | 4/2017 | Cremers et al. |
| 2017/0104021 A1 | 4/2017 | Park et al. |
| 2017/0104946 A1 | 4/2017 | Hong |
| 2017/0111600 A1 | 4/2017 | Wang et al. |
| 2017/0141147 A1 | 5/2017 | Raynor |
| 2017/0154909 A1 | 6/2017 | Ishizu |
| 2017/0163924 A1 | 6/2017 | Wan |
| 2017/0170223 A1 | 6/2017 | Hynecek et al. |
| 2017/0201693 A1 | 7/2017 | Sugizaki et al. |
| 2017/0207268 A1 | 7/2017 | Kurokawa |
| 2017/0228345 A1 | 8/2017 | Gupta et al. |
| 2017/0264364 A1 | 9/2017 | Aoyama et al. |
| 2017/0270664 A1 | 9/2017 | Hoogi et al. |
| 2017/0272667 A1 | 9/2017 | Hynecek |
| 2017/0272768 A1 | 9/2017 | Tall et al. |
| 2017/0280031 A1 | 9/2017 | Price et al. |
| 2017/0293799 A1 | 10/2017 | Skogo et al. |
| 2017/0295338 A1 | 10/2017 | Geurts |
| 2017/0310910 A1 | 10/2017 | Smith et al. |
| 2017/0324917 A1 | 11/2017 | Mlinar et al. |
| 2017/0338262 A1 | 11/2017 | Hirata |
| 2017/0339327 A1 | 11/2017 | Koshkin et al. |
| 2017/0346579 A1 | 11/2017 | Barghi |
| 2017/0350755 A1 | 12/2017 | Geurts |
| 2017/0359497 A1 | 12/2017 | Mandelli et al. |
| 2017/0366766 A1 | 12/2017 | Geurts et al. |
| 2018/0019269 A1 | 1/2018 | Klipstein |
| 2018/0077368 A1 | 3/2018 | Suzuki |
| 2018/0084164 A1 | 3/2018 | Hynecek et al. |
| 2018/0115725 A1 | 4/2018 | Zhang et al. |
| 2018/0136471 A1 | 5/2018 | Miller et al. |
| 2018/0143701 A1 | 5/2018 | Suh et al. |
| 2018/0152650 A1 | 5/2018 | Sakakibara et al. |
| 2018/0167575 A1 | 6/2018 | Watanabe et al. |
| 2018/0176545 A1 | 6/2018 | Aflaki Beni |
| 2018/0204867 A1 | 7/2018 | Kim et al. |
| 2018/0213205 A1 | 7/2018 | Oh |
| 2018/0220093 A1 | 8/2018 | Murao et al. |
| 2018/0224658 A1 | 8/2018 | Teller |
| 2018/0227516 A1 | 8/2018 | Mo et al. |
| 2018/0241953 A1 | 8/2018 | Johnson |
| 2018/0270436 A1 | 9/2018 | Ivarsson et al. |
| 2018/0276841 A1 | 9/2018 | Krishnaswamy et al. |
| 2018/0286896 A1 | 10/2018 | Kim et al. |
| 2018/0376046 A1 | 12/2018 | Liu |
| 2018/0376090 A1 | 12/2018 | Liu |

(56) References Cited

U.S. PATENT DOCUMENTS

| | | |
|---|---|---|
| 2019/0035154 A1 | 1/2019 | Liu |
| 2019/0046044 A1 | 2/2019 | Tzvieli et al. |
| 2019/0052788 A1 | 2/2019 | Liu |
| 2019/0056264 A1 | 2/2019 | Liu |
| 2019/0057995 A1 | 2/2019 | Liu |
| 2019/0058058 A1 | 2/2019 | Liu |
| 2019/0098232 A1 | 3/2019 | Mori et al. |
| 2019/0104263 A1 | 4/2019 | Ochiai et al. |
| 2019/0104265 A1 | 4/2019 | Totsuka et al. |
| 2019/0110039 A1 | 4/2019 | Linde et al. |
| 2019/0123088 A1 | 4/2019 | Kwon |
| 2019/0124285 A1 | 4/2019 | Otaka |
| 2019/0141270 A1 | 5/2019 | Otaka et al. |
| 2019/0149751 A1 | 5/2019 | Wise |
| 2019/0157330 A1 | 5/2019 | Sato et al. |
| 2019/0172227 A1 | 6/2019 | Kasahara |
| 2019/0172868 A1 | 6/2019 | Chen et al. |
| 2019/0191116 A1 | 6/2019 | Madurawe |
| 2019/0246036 A1 | 8/2019 | Wu et al. |
| 2019/0253650 A1 | 8/2019 | Kim |
| 2019/0327439 A1 | 10/2019 | Chen et al. |
| 2019/0331914 A1 | 10/2019 | Lee et al. |
| 2019/0335151 A1 | 10/2019 | Rivard et al. |
| 2019/0348460 A1 | 11/2019 | Chen et al. |
| 2019/0355782 A1 | 11/2019 | Do et al. |
| 2019/0363118 A1 | 11/2019 | Berkovich et al. |
| 2019/0371845 A1 | 12/2019 | Chen et al. |
| 2019/0379827 A1 | 12/2019 | Berkovich et al. |
| 2019/0379846 A1 | 12/2019 | Chen et al. |
| 2020/0007800 A1 | 1/2020 | Berkovich et al. |
| 2020/0053299 A1 | 2/2020 | Zhang et al. |
| 2020/0059589 A1 | 2/2020 | Liu et al. |
| 2020/0068189 A1 | 2/2020 | Chen et al. |
| 2020/0186731 A1* | 6/2020 | Chen ............... G02B 27/0176 |
| 2020/0195875 A1 | 6/2020 | Berkovich et al. |
| 2020/0217714 A1* | 7/2020 | Liu .................. H04N 5/37455 |
| 2020/0228745 A1 | 7/2020 | Otaka |
| 2020/0374475 A1 | 11/2020 | Fukuoka et al. |
| 2020/0396399 A1 | 12/2020 | Tsai et al. |
| 2021/0026796 A1 | 1/2021 | Graif et al. |
| 2021/0099659 A1 | 4/2021 | Miyauchi et al. |
| 2021/0185264 A1 | 6/2021 | Wong et al. |
| 2021/0227159 A1 | 7/2021 | Sambonsugi |
| 2021/0368124 A1 | 11/2021 | Berkovich et al. |

FOREIGN PATENT DOCUMENTS

| | | | |
|---|---|---|---|
| CN | 1812506 A | | 8/2006 |
| CN | 103207716 A | | 7/2013 |
| CN | 103730455 A | | 4/2014 |
| CN | 104125418 A | | 10/2014 |
| CN | 104204904 A | | 12/2014 |
| CN | 104469195 A | | 3/2015 |
| CN | 104704812 A | | 6/2015 |
| CN | 104733485 A | | 6/2015 |
| CN | 104754255 A | | 7/2015 |
| CN | 105706439 A | | 6/2016 |
| CN | 106255978 A | | 12/2016 |
| CN | 106791504 A | | 5/2017 |
| CN | 207184624 U | | 4/2018 |
| CN | 109298528 A | | 2/2019 |
| DE | 202016105510 | | 10/2016 |
| EP | 0675345 | | 10/1995 |
| EP | 1681856 | | 7/2006 |
| EP | 1732134 | | 12/2006 |
| EP | 1746820 | | 1/2007 |
| EP | 1788802 A1 | | 5/2007 |
| EP | 2037505 A1 | | 3/2009 |
| EP | 2063630 | | 5/2009 |
| EP | 2538664 | | 12/2012 |
| EP | 2804074 A2 | | 11/2014 |
| EP | 2833619 | | 2/2015 |
| EP | 3032822 | | 6/2016 |
| EP | 3229457 A1 | | 10/2017 |
| EP | 3258683 | | 12/2017 |
| EP | 3425352 | | 1/2019 |
| EP | 3425353 A1 | | 1/2019 |
| EP | 3439039 A1 | | 2/2019 |
| EP | 3744085 A2 | | 12/2020 |
| JP | 2002199292 A | | 7/2002 |
| JP | 2003319262 A | | 11/2003 |
| JP | 2005328493 A | | 11/2005 |
| JP | 2006203736 A | | 8/2006 |
| JP | 2007074447 A | | 3/2007 |
| JP | 2011216966 A | | 10/2011 |
| JP | 2012095349 A | | 5/2012 |
| JP | 2013009087 A | | 1/2013 |
| JP | 2013090127 A | | 5/2013 |
| JP | 2013172203 A | | 9/2013 |
| JP | 2014165733 A | | 9/2014 |
| JP | 2016092661 A | | 5/2016 |
| KR | 100574959 | | 4/2006 |
| KR | 20110050351 | | 5/2011 |
| KR | 20120058337 A | | 6/2012 |
| KR | 20150095841 | | 8/2015 |
| KR | 20160008267 A | | 1/2016 |
| KR | 20160008287 | | 1/2016 |
| TW | 548962 B | | 8/2003 |
| TW | 201106691 A | | 2/2011 |
| TW | 201242353 A | | 10/2012 |
| TW | 201705755 A | | 2/2017 |
| TW | 201717381 A | | 5/2017 |
| TW | 201720138 A | | 6/2017 |
| TW | 201737696 A | | 10/2017 |
| TW | 201921660 A | | 6/2019 |
| TW | 774803 | | 8/2022 |
| WO | WO-2006124592 A2 | | 11/2006 |
| WO | WO-2014055391 A2 | | 4/2014 |
| WO | WO-2016095057 A1 | | 6/2016 |
| WO | WO-2017003477 A1 | | 1/2017 |
| WO | WO-2017013806 A1 | | 1/2017 |
| WO | WO-2017047010 A1 | | 3/2017 |
| WO | 2017058488 | | 4/2017 |
| WO | 2017069706 | | 4/2017 |
| WO | 2017169882 | | 10/2017 |
| WO | WO-2017169446 A1 | | 10/2017 |
| WO | WO-2019018084 A1 | | 1/2019 |
| WO | WO-2019111528 A1 | | 6/2019 |
| WO | WO-2019145578 A1 | | 8/2019 |
| WO | 2019168929 | | 9/2019 |

OTHER PUBLICATIONS

U.S. Appl. No. 16/249,420, "Notice of Allowance", dated Nov. 18, 2020, 8 pages.
U.S. Appl. No. 16/707,988, "Non-Final Office Action", dated Sep. 22, 2020, 15 pages.
U.S. Appl. No. 16/435,449, "Notice of Allowance", dated Sep. 16, 2020, 7 pages.
U.S. Appl. No. 16/454,787, "Notice of Allowance", dated Sep. 9, 2020, 9 pages.
International Preliminary Report on Patentability for International Application No. PCT/US2018/039352, dated Jan. 9, 2020, 7 pages.
International Preliminary Report on Patentability for International Application No. PCT/US2019/014044, dated Oct. 1, 2020, 8 Pages.
International Preliminary Report on Patentability for International Application No. PCT/US2019/019756, dated Dec. 17, 2020, 10 Pages.
International Preliminary Report on Patentability for International Application No. PCT/US2019/019765, dated Sep. 17, 2020, 8 Pages.
International Preliminary Report on Patentability for International Application No. PCT/US2019/025170, dated Oct. 15, 2020, 9 Pages.
International Preliminary Report on Patentability for International Application No. PCT/US2019/048241, dated Mar. 11, 2021, 13 Pages.
International Preliminary Report on Patentability for International Application No. PCT/US2020/014904, dated Aug. 6, 2020, 6 Pages.
International Search Report and Written Opinion for International Application No. PCT/US2019/014904, dated Aug. 5, 2019, 7 Pages.

(56) References Cited

OTHER PUBLICATIONS

International Search Report and Written Opinion for International Application No. PCT/US2019/019765, dated Jun. 14, 2019, 9 Pages.
Non-Final Office Action dated Apr. 21, 2021 for U.S. Appl. No. 16/453,538, filed Jun. 26, 2019, 16 Pages.
Non-Final Office Action dated Apr. 27, 2021 for U.S. Appl. No. 16/829,249, filed Mar. 25, 2020, 9 Pages.
Notice of Allowance dated Jul. 8, 2021 for U.S. Appl. No. 17/150,925, filed Jan. 15, 2021, 10 Pages.
Notice of Allowance dated Jan. 22, 2021 for U.S. Appl. No. 16/369,763, filed Mar. 29, 2019, 8 Pages.
U.S. Appl. No. 15/668,241, Advisory Action, dated Oct. 23, 2019, 5 pages.
U.S. Appl. No. 15/668,241, Final Office Action, dated Jun. 17, 2019, 19 pages.
U.S. Appl. No. 15/668,241, Non-Final Office Action, dated Dec. 21, 2018, 3 pages.
U.S. Appl. No. 15/668,241, Notice of Allowance, dated Jun. 29, 2020, 8 pages.
U.S. Appl. No. 15/668,241, Notice of Allowance, dated Mar. 5, 2020, 8 pages.
U.S. Appl. No. 15/668,241, "Supplemental Notice of Allowability", dated Apr. 29, 2020, 5 pages.
U.S. Appl. No. 15/719,345, Final Office Action, dated Apr. 29, 2020, 14 pages.
U.S. Appl. No. 15/719,345, Non- Final Office Action, dated Nov. 25, 2019, 14 pages.
U.S. Appl. No. 15/719,345, Notice of Allowance, dated Aug. 12, 2020, 11 pages.
U.S. Appl. No. 15/801,216, Advisory Action, dated Apr. 7, 2020, 3 pages.
U.S. Appl. No. 15/801,216, Final Office Action, dated Dec. 26, 2019, 5 pages.
U.S. Appl. No. 15/801,216, Non-Final Office Action, dated Jun. 27, 2019, 13 pages.
U.S. Appl. No. 15/801,216, Notice of Allowance, dated Jun. 23, 2020, 5 pages.
U.S. Appl. No. 15/847,517, Non-Final Office Action, dated Nov. 23, 2018, 21 pages.
U.S. Appl. No. 15/847,517, Notice of Allowance, dated May 1, 2019, 11 pages.
U.S. Appl. No. 15/861,588, Non-Final Office Action, dated Jul. 10, 2019, 11 pages.
U.S. Appl. No. 15/861,588, Notice of Allowance, dated Nov. 26, 2019, 9 pages.
U.S. Appl. No. 15/876,061, "Corrected Notice of Allowability", dated Apr. 28, 2020, 3 pages.
U.S. Appl. No. 15/876,061, Non-Final Office Action, dated Sep. 18, 2019, 23 pages.
U.S. Appl. No. 15/876,061, "Notice of Allowability", dated May 6, 2020, 2 pages.
U.S. Appl. No. 15/876,061, Notice of Allowance, dated Feb. 4, 2020, 13 pages.
U.S. Appl. No. 15/927,896, Non-Final Office Action, dated May 1, 2019, 10 pages.
U.S. Appl. No. 15/983,379, Notice of Allowance, dated Oct. 18, 2019, 9 pages.
U.S. Appl. No. 15/983,391, Non-Final Office Action, dated Aug. 29, 2019, 12 pages.
U.S. Appl. No. 15/983,391, Notice of Allowance, dated Apr. 8, 2020, 8 pages.
U.S. Appl. No. 16/177,971, Final Office Action, dated Feb. 27, 2020, 9 pages.
U.S. Appl. No. 16/177,971, Non-Final Office Action, dated Sep. 25, 2019, 9 pages.
U.S. Appl. No. 16/177,971, Notice of Allowance, dated Apr. 24, 2020, 6 pages.
U.S. Appl. No. 16/210,748, Final Office Action, dated Jul. 7, 2020, 11 pages.
U.S. Appl. No. 16/210,748, Non-Final Office Action, dated Jan. 31, 2020, 11 pages.
U.S. Appl. No. 16/249,420, Non-Final Office Action, dated Jul. 22, 2020, 9 pages.
U.S. Appl. No. 16/286,355, Non-Final Office Action, dated Oct. 1, 2019, 6 pages.
U.S. Appl. No. 16/286,355, Notice of Allowance, dated Feb. 12, 2020, 7 pages.
U.S. Appl. No. 16/286,355, Notice of Allowance, dated Jun. 4, 2020, 7 pages.
U.S. Appl. No. 16/369,763, Non-Final Office Action, dated Jul. 22, 2020, 15 pages.
U.S. Appl. No. 16/382,015, Notice of Allowance, dated Jun. 11, 2020, 11 pages.
U.S. Appl. No. 16/384,720, Non-Final Office Action, dated May 1, 2020, 6 pages.
U.S. Appl. No. 16/431,693, Non-Final Office Action, dated Jan. 30, 2020, 6 pages.
U.S. Appl. No. 16/431,693, Notice of Allowance, dated Jun. 24, 2020, 7 pages.
U.S. Appl. No. 16/435,449, Notice of Allowance, dated Jul. 27, 2020, 8 pages.
U.S. Appl. No. 16/436,049, Non-Final Office Action, dated Jun. 30, 2020, 11 pages.
U.S. Appl. No. 16/436,049, Non-Final Office Action, dated Mar. 4, 2020, 9 pages.
U.S. Appl. No. 16/454,787, Notice of Allowance, dated Apr. 22, 2020, 10 pages.
U.S. Appl. No. 16/454,787, Notice of Allowance, dated Jul. 9, 2020, 9 pages.
U.S. Appl. No. 16/566,583, Final Office Action, dated Apr. 15, 2020, 24 pages.
U.S. Appl. No. 16/566,583, Non-Final Office Action, dated Oct. 1, 2019, 10 pages.
U.S. Appl. No. 16/566,583, Non-Final Office Action, dated Jul. 27, 2020, 11 pages.
Cho et al., "A Low Power Dual CDS for a Column-Parallel CMOS Image Sensor", Journal of Semiconductor Technology and Science, vol. 12, No. 4, Dec. 30, 2012, pp. 388-396.
Application No. EP18179838.0, Extended European Search Report, dated May 24, 2019, 17 pages.
EP18179838.0, "Partial European Search Report", dated Dec. 5, 2018, 14 pages.
Application No. EP18179846.3, Extended European Search Report, dated Dec. 7, 2018, 10 pages.
Application No. EP18179851.3, Extended European Search Report, dated Dec. 7, 2018, 8 pages.
Application No. EP18188684.7, Extended European Search Report, dated Jan. 16, 2019, 10 pages.
Application No. EP18188684.7, Office Action, dated Nov. 26, 2019, 9 pages.
Application No. EP18188962.7, Extended European Search Report, dated Oct. 23, 2018, 8 pages.
Application No. EP18188962.7, Office Action, dated Aug. 28, 2019, 6 pages.
Application No. EP18188968.4, Extended European Search Report, dated Oct. 23, 2018, 8 pages.
Application No. EP18188968.4, Office Action, dated Aug. 14, 2019, 5 pages.
Application No. EP18189100.3, Extended European Search Report, dated Oct. 9, 2018, 8 pages.
Kavusi et al., "Quantitative Study of High-Dynamic-Range Image Sensor Architectures", Proceedings of Society of Photo-Optical Instrumentation Engineers—The International Society for Optical Engineering, vol. 5301, Jun. 2004, pp. 264-275.
Application No. PCT/US2018/039350, International Preliminary Report on Patentability, dated Jan. 9, 2020, 10 pages.
Application No. PCT/US2018/039350, International Search Report and Written Opinion, dated Nov. 15, 2018, 13 pages.
Application No. PCT/US2018/039352, International Search Report and Written Opinion, dated Oct. 26, 2018, 10 pages.
Application No. PCT/US2018/039431, International Search Report and Written Opinion, dated Nov. 7, 2018, 14 pages.

(56) References Cited

OTHER PUBLICATIONS

Application No. PCT/US2018/045661, International Search Report and Written Opinion, dated Nov. 30, 2018, 11 Pages.
Application No. PCT/US2018/045666, International Preliminary Report on Patentability, dated Feb. 27, 2020, 11 pages.
Application No. PCT/US2018/045666, International Search Report and Written Opinion, dated Dec. 3, 2018, 13 pages.
Application No. PCT/US2018/045673, International Search Report and Written Opinion, dated Dec. 4, 2018, 13 pages.
Application No. PCT/US2018/046131, International Search Report and Written Opinion, dated Dec. 3, 2018, 10 pages.
Application No. PCT/US2018/064181, International Preliminary Report on Patentability, dated Jun. 18, 2020, 9 pages.
Application No. PCT/US2018/064181, International Search Report and Written Opinion, dated Mar. 29, 2019, 12 pages.
Application No. PCT/US2019/014044, International Search Report and Written Opinion, dated May 8, 2019, 11 pages.
Application No. PCT/US2019/019756, International Search Report and Written Opinion, dated Jun. 13, 2019, 11 pages.
Application No. PCT/US2019/025170, International Search Report and Written Opinion, dated Jul. 9, 2019, 11 pages.
Application No. PCT/US2019/027727, International Search Report and Written Opinion, dated Jun. 27, 2019, 11 pages.
Application No. PCT/US2019/027729, International Search Report and Written Opinion, dated Jun. 27, 2019, 10 pages.
Application No. PCT/US2019/031521, International Search Report and Written Opinion, dated Jul. 11, 2019, 11 pages.
Application No. PCT/US2019/035724, International Search Report and Written Opinion, dated Sep. 10, 2019, 12 pages.
Application No. PCT/US2019/036484, International Search Report and Written Opinion, dated Sep. 19, 2019, 10 pages.
Application No. PCT/US2019/036492, International Search Report and Written Opinion, dated Sep. 25, 2019, 9 pages.
Application No. PCT/US2019/036536, International Search Report and Written Opinion, dated Sep. 26, 2019, 14 pages.
Application No. PCT/US2019/036575, International Search Report and Written Opinion, dated Sep. 30, 2019, 16 pages.
Application No. PCT/US2019/039410, International Search Report and Written Opinion, dated Sep. 30, 2019, 11 pages.
Application No. PCT/US2019/039758, International Search Report and Written Opinion, dated Oct. 11, 2019, 13 pages.
Application No. PCT/US2019/047156, International Search Report and Written Opinion, dated Oct. 23, 2019, 9 pages.
Application No. PCT/US2019/048241, International Search Report and Written Opinion, dated Jan. 28, 2020, 16 pages.
Application No. PCT/US2019/049756, International Search Report and Written Opinion, dated Dec. 16, 2019, 8 pages.
Application No. PCT/US2019/059754, International Search Report and Written Opinion, dated Mar. 24, 2020, 15 pages.
Application No. PCT/US2019/065430, International Search Report and Written Opinion, dated Mar. 6, 2020, 15 pages.
Snoeij, "A Low Power Column-Parallel 12-Bit ADC for CMOS Imagers", Institute of Electrical and Electronics Engineers Workshop on Charge-Coupled Devices and Advanced Image Sensors, Jun. 2005, pp. 169-172.
Tanner et al., "Low-Power Digital Image Sensor for Still Picture Image Acquisition", Visual Communications and Image Processing, vol. 4306, Jan. 22, 2001, 8 pages.
Xu et al., "A New Digital-Pixel Architecture for CMOS Image Sensor With Pixel-Level ADC and Pulse Width Modulation using A 0.18 Mu M CMOS Technology", Institute of Electrical and Electronics Engineers Conference on Electron Devices and Solid-State Circuits, Dec. 16-18, 2003, pp. 265-268.
Advisory Action dated Oct. 8, 2020 for U.S. Appl. No. 16/210,748, filed Dec. 5, 2018, 4 Pages.
Advisory Action dated Oct. 1, 2021 for U.S. Appl. No. 17/083,920, filed Oct. 29, 2020, 4 pages.
Amir M.F., et al., "3-D Stacked Image Sensor With Deep Neural Network Computation," IEEE Sensors Journal, IEEE Service Center, New York, NY, US, May 15, 2018, vol. 18 (10), pp. 4187-4199, XP011681876.
Chuxi L., et al., "A Memristor-Based Processing-in-Memory Architechture for Deep Convolutional Neural Networks Approximate Computation," Journal of Computer Research and Development, Jun. 30, 2017, vol. 54 (6), pp. 1367-1380.
Communication Pursuant Article 94(3) dated Dec. 23, 2021 for European Application No. 19744961.4, filed Jun. 28, 2019, 8 pages.
Communication Pursuant Article 94(3) dated Jan. 5, 2022 for European Application No. 19740456.9, filed Jun. 27, 2019, 12 pages.
Corrected Notice of Allowability dated Feb. 3, 2021 for U.S. Appl. No. 16/566,583, filed Sep. 10, 2019, 2 Pages.
Corrected Notice of Allowability dated Apr. 9, 2021 for U.S. Appl. No. 16/255,528, filed Jan. 23, 2019, 5 Pages.
Corrected Notice of Allowability dated Dec. 11, 2020 for U.S. Appl. No. 16/566,583, filed Sep. 10, 2019, 2 Pages.
Corrected Notice of Allowability dated Jul. 26, 2021 for U.S. Appl. No. 16/707,988, filed Dec. 9, 2019, 2 Pages.
Corrected Notice of Allowance dated Mar. 7, 2022 for U.S. Appl. No. 17/150,925, filed Jan. 15, 2021, 2 Pages.
Extended European Search Report for European Application No. 19743908.6, dated Sep. 30, 2020, 9 Pages.
Final Office Action dated Dec. 3, 2021 for U.S. Appl. No. 17/072,840, filed Oct. 16, 2020, 23 pages.
Final Office Action dated Jul. 12, 2021 for U.S. Appl. No. 16/435,451, filed Jun. 7, 2019, 13 Pages.
Final Office Action dated Oct. 18, 2021 for U.S. Appl. No. 16/716,050, filed Dec. 16, 2019, 18 Pages.
Final Office Action dated Oct. 21, 2021 for U.S. Appl. No. 16/421,441, filed May 23, 2019, 23 Pages.
Final Office Action dated Jan. 27, 2021 for U.S. Appl. No. 16/255,528, filed Jan. 23, 2019, 31 Pages.
Final Office Action dated Jul. 28, 2021 for U.S. Appl. No. 17/083,920, filed Oct. 29, 2020, 19 Pages.
International Preliminary Report on Patentability for International Application No. PCT/US2020/044807, dated Feb. 17, 2022, 10 pages.
International Search Report and Written Opinion for International Application No. PCT/US2019/034007, dated Oct. 28, 2019, 18 Pages.
International Search Report and Written Opinion for International Application No. PCT/US2019/066805, dated Mar. 6, 2020, 9 Pages.
International Search Report and Written Opinion for International Application No. PCT/US2019/066831, dated Feb. 27, 2020, 11 Pages.
International Search Report and Written Opinion for International Application No. PCT/US2020/044807, dated Sep. 30, 2020, 12 Pages.
International Search Report and Written Opinion for International Application No. PCT/US2020/058097, dated Feb. 12, 2021, 09 Pages.
International Search Report and Written Opinion for International Application No. PCT/US2020/059636, dated Feb. 11, 2021, 18 Pages.
International Search Report and Written Opinion for International Application No. PCT/US2021/031201, dated Aug. 2, 2021, 13 Pages.
International Search Report and Written Opinion for International Application No. PCT/US2021/033321, dated Sep. 6, 2021, 11 pages.
International Search Report and Written Opinion for International Application No. PCT/US2021/041775, dated Nov. 29, 2021, 14 pages.
International Search Report and Written Opinion for International Application No. PCT/US2021/054327, dated Feb. 14, 2022, 8 pages.
International Search Report and Written Opinion for International Application No. PCT/US2021/057966, dated Feb. 22, 2022, 15 pages.

(56) References Cited

OTHER PUBLICATIONS

Millet L., et al., "A 5500-Frames/s 85-GOPS/W 3-D Stacked BSI Vision Chip Based on Parallel In-Focal-Plane Acquisition and Processing," IEEE Journal of Solid-State Circuits, USA, Apr. 1, 2019, vol. 54 (4), pp. 1096-1105, XP011716786.
Non-Final Office Action dated Feb. 1, 2021 for U.S. Appl. No. 16/435,451, filed Jun. 7, 2019, 14 Pages.
Non-Final Office Action dated Jan. 1, 2021 for U.S. Appl. No. 16/715,792, filed Dec. 16, 2019, 15 Pages.
Non-Final Office Action dated Jul. 2, 2021 for U.S. Appl. No. 16/820,594, filed Mar. 16, 2020, 8 Pages.
Non-Final Office Action dated Mar. 2, 2022 for U.S. Appl. No. 17/127,670, filed Dec. 18, 2020, 18 pages.
Non-Final Office Action dated Sep. 2, 2021 for U.S. Appl. No. 16/910,844, filed Jun. 24, 2020, 7 Pages.
Non-Final Office Action dated Dec. 4, 2020 for U.S. Appl. No. 16/436,137, filed Jun. 10, 2019, 12 Pages.
Non-Final Office Action dated May 7, 2021 for U.S. Appl. No. 16/421,441, filed May 23, 2019, 17 Pages.
Non-Final Office Action dated Jun. 8, 2021 for U.S. Appl. No. 17/072,840, filed Oct. 16, 2020, 7 Pages.
Non-Final Office Action dated Jul. 10, 2020 for U.S. Appl. No. 16/255,528, filed Jan. 23, 2019, 27 Pages.
Non-Final Office Action dated May 14, 2021 for U.S. Appl. No. 16/716,050, filed Dec. 16, 2019, 16 Pages.
Non-Final Office Action dated Mar. 15, 2021 for U.S. Appl. No. 16/896,130, filed Jun. 8, 2020, 16 Pages.
Non-Final Office Action dated Apr. 21, 2021 for U.S. Appl. No. 17/083,920, filed Oct. 29, 2020, 17 Pages.
Non-Final Office Action dated Oct. 21, 2021 for U.S. Appl. No. 17/083,920, filed Oct. 29, 2020, 19 Pages.
Non-Final Office Action dated Jul. 25, 2019 for U.S. Appl. No. 15/909,162, filed Mar. 1, 2018, 20 Pages.
Notice of Allowance dated Apr. 1, 2021 for U.S. Appl. No. 16/255,528, filed Jan. 23, 2019, 7 Pages.
Notice of Allowance dated Mar. 2, 2022 for U.S. Appl. No. 16/453,538, filed Jun. 26, 2019, 8 pages.
Notice of Allowance dated Nov. 3, 2020 for U.S. Appl. No. 16/566,583, filed Sep. 10, 2019, 11 Pages.
Notice of Allowance dated May 5, 2021 for U.S. Appl. No. 16/707,988, filed Dec. 9, 2019, 14 Pages.
Notice of Allowance dated Jan. 7, 2022 for U.S. Appl. No. 16/899,908, filed Jun. 12, 2020, 10 pages.
Notice of Allowance dated Mar. 11, 2022 for U.S. Appl. No. 16/716,050, filed Dec. 16, 2019, 13 pages.
Notice of Allowance dated Jul. 13, 2021 for U.S. Appl. No. 16/896,130, filed Jun. 8, 2020, 8 Pages.
Notice of Allowance dated Feb. 14, 2022 for U.S. Appl. No. 16/715,792, filed Dec. 16, 2019, 9 pages.
Notice of Allowance dated Oct. 14, 2020 for U.S. Appl. No. 16/384,720, filed Apr. 15, 2019, 8 Pages.
Notice of Allowance dated Oct. 15, 2020 for U.S. Appl. No. 16/544,136, filed Aug. 19, 2019, 11 Pages.
Notice of Allowance dated Apr. 16, 2021 for U.S. Appl. No. 16/715,792, filed Dec. 16, 2019, 10 Pages.
Notice of Allowance dated Feb. 16, 2022 for U.S. Appl. No. 17/150,925, filed Jan. 15, 2021, 9 pages.
Notice of Allowance dated Nov. 17, 2021 for U.S. Appl. No. 16/899,908, filed Jun. 12, 2020, 7 Pages.
Notice of Allowance dated Sep. 17, 2021 for U.S. Appl. No. 16/899,908, filed Jun. 12, 2020, 11 Pages.
Notice of Allowance dated Mar. 18, 2020 for U.S. Appl. No. 15/909,162, filed Mar. 1, 2018, 9 Pages.
Notice of Allowance dated Oct. 21, 2020 for U.S. Appl. No. 16/436,049, filed Jun. 10, 2019, 8 Pages.
Notice of Allowance dated Dec. 22, 2021 for U.S. Appl. No. 16/910,844, filed Jun. 24, 2020, 7 pages.
Notice of Allowance dated Feb. 22, 2022 for U.S. Appl. No. 17/083,920, filed Oct. 29, 2020, 10 pages.
Notice of Allowance dated Nov. 22, 2021 for U.S. Appl. No. 16/820,594, filed Mar. 16, 2020, 18 pages.
Notice of Allowance dated Nov. 22, 2021 for U.S. Appl. No. 16/820,594, filed Mar. 16, 2020, 8 pages.
Notice of Allowance dated Nov. 24, 2021 for U.S. Appl. No. 16/910,844, filed Jun. 24, 2020, 8 pages.
Notice of Allowance dated Aug. 25, 2021 for U.S. Appl. No. 16/715,792, filed Dec. 16, 2019, 9 Pages.
Notice of Allowance dated Oct. 25, 2021 for U.S. Appl. No. 16/435,451, filed Jun. 7, 2019, 8 Pages.
Notice of Allowance dated Aug. 26, 2020 for U.S. Appl. No. 16/384,720, filed Apr. 15, 2019, 8 Pages.
Notice of Allowance dated Oct. 26, 2021 for U.S. Appl. No. 16/896,130, filed Jun. 8, 2020, 8 Pages.
Notice of Reason for Rejection dated Nov. 16, 2021 for Japanese Application No. 2019-571699, filed Jun. 25, 2018, 13 pages.
Notification of the First Office Action dated Oct. 28, 2021 for Chinese Application No. 2019800218483, filed Jan. 24, 2019, 17 pages.
Office Action dated Jul. 3, 2020 for Chinese Application No. 201810821296, filed Jul. 24, 2018, 17 Pages.
Office Action dated Jul. 7, 2021 for European Application No. 19723902.3, filed Apr. 1, 2019, 3 Pages.
Office Action dated Jul. 7, 2021 for European Application No. 19737299.8, filed Jun. 11, 2019, 5 Pages.
Office Action dated Mar. 9, 2021 for Chinese Application No. 201810821296, filed Jul. 24, 2018, 10 Pages.
Office Action dated Dec. 14, 2021 for Japanese Application No. 2019571598, filed Jun. 26, 2018, 12 pages.
Office Action dated Jun. 28, 2020 for Chinese Application No. 201810821296, filed Jul. 24, 2018, 2 Pages.
Office Action dated Sep. 30, 2021 for Taiwan Application No. 107124385, 17 Pages.
Partial International Search Report and Provisional Opinion for International Application No. PCT/US2021/041775, dated Oct. 8, 2021, 12 pages.
Restriction Requirement dated Feb. 2, 2021 for U.S. Appl. No. 16/716,050, filed Dec. 16, 2019, 7 Pages.
Sebastian A., et al., "Memory Devices and Applications for In-memory Computing," Nature Nanotechnology, Nature Publication Group, Inc, London, Mar. 30, 2020, vol. 15 (7), pp. 529-544, XP037194929.
Shi C., et al., "A 1000fps Vision Chip Based on a Dynamically Reconfigurable Hybrid Architecture Comprising a PE Array and Self-Organizing Map Neural Network," International Solid-State Circuits Conference, Session 7, Image Sensors, Feb. 10, 2014, pp. 128-130, XP055826878.
Snoeij M.F., et al., "A low Power Column-Parallel 12-bit ADC for CMOS Imagers," XP007908033, Jun. 1, 2005, pp. 169-172.
Notice of Allowance dated Mar. 7, 2022 for U.S. Appl. No. 16/421,441, filed May 23, 2019, 18 pages.
Corrected Notice of Allowability dated Dec. 1, 2021 for U.S. Appl. No. 16/210,748, filed Dec. 5, 2018, 3 pages.
Corrected Notice of Allowability dated Dec. 7, 2021 for U.S. Appl. No. 16/210,748, filed Dec. 5, 2018, 3 pages.
Corrected Notice of Allowability dated Jan. 25, 2021 for U.S. Appl. No. 16/384,720, filed Apr. 15, 2019, 4 Pages.
Corrected Notice of Allowability dated Jan. 29, 2021 for U.S. Appl. No. 16/544,136, filed Aug. 19, 2019, 2 Pages.
Extended European Search Report for European Application No. 18886564.6, dated Jan. 26, 2021, 6 Pages.
Final Office Action dated Nov. 3, 2021 for U.S. Appl. No. 16/560,665, filed Sep. 4, 2019, 19 Pages.
Final Office Action dated Jul. 8, 2021 for U.S. Appl. No. 16/672,427, filed Nov. 1, 2019, 10 Pages.
International Preliminary Report on Patentability for International Application No. PCT/US2019/027727, dated Oct. 29, 2020, 8 Pages.
Non-Final Office Action dated Feb. 2, 2021 for U.S. Appl. No. 16/210,748, filed Dec. 5, 2018, 8 Pages.
Non-Final Office Action dated Dec. 7, 2020 for U.S. Appl. No. 16/672,427, filed Nov. 1, 2019, 9 Pages.

(56) References Cited

OTHER PUBLICATIONS

Non-Final Office Action dated Jan. 8, 2020 for U.S. Appl. No. 16/285,873, filed Feb. 26, 2019, 14 Pages.
Non-Final Office Action dated Feb. 11, 2022 for U.S. Appl. No. 16/672,427, filed Nov. 1, 2019, 9 pages.
Non-Final Office Action dated Dec. 24, 2020 for U.S. Appl. No. 16/407,072, filed May 8, 2019, 15 Pages.
Non-Final Office Action dated Apr. 29, 2021 for U.S. Appl. No. 16/560,665, filed Sep. 4, 2019, 17 Pages.
Notice of Allowance dated Apr. 1, 2021 for U.S. Appl. No. 16/436,049, filed Jun. 10, 2019, 8 Pages.
Notice of Allowance dated Dec. 1, 2021 for U.S. Appl. No. 16/210,748, filed Dec. 5, 2018, 11 pages.
Notice of Allowance dated Jun. 1, 2021 for U.S. Appl. No. 16/407,072, filed May 8, 2019, 11 Pages.
Notice of Allowance dated Dec. 7, 2021 for U.S. Appl. No. 16/210,748, filed Dec. 5, 2018, 11 pages.
Notice of Allowance dated Jul. 9, 2021 for U.S. Appl. No. 16/210,748, filed Dec. 5, 2018, 6 Pages.
Notice of Allowance dated Nov. 10, 2021 for U.S. Appl. No. 16/672,427, filed Nov. 1, 2019, 6 Pages.
Notice of Allowance dated Sep. 13, 2021 for U.S. Appl. No. 16/407,072, filed May 8, 2019, 10 Pages.
Notice of Allowance dated Dec. 16, 2021 for U.S. Appl. No. 16/407,072, filed May 8, 2019, 2 pages.
Notice of Allowance dated Jun. 18, 2020 for U.S. Appl. No. 16/285,873, filed Feb. 26, 2019, 10 Pages.
Notice of Allowance dated Sep. 24, 2020 for U.S. Appl. No. 15/668,241, filed Aug. 3, 2017, 13 Pages.
Notice of Allowance dated Oct. 27, 2021 for U.S. Appl. No. 16/210,748, filed Dec. 5, 2018, 6 Pages.
Notice of Allowance dated Oct. 29, 2021 for U.S. Appl. No. 16/672,427, filed Nov. 1, 2019, 9 Pages.
Supplemental Notice of Allowability dated Jul. 8, 2021 for U.S. Appl. No. 16/436,049, filed Jun. 10, 2019, 2 Pages.
Notice of Allowance dated Jun. 14, 2022 for U.S. Appl. No. 16/453,538, filed Jun. 26, 2019, 8 pages.
Notice of Allowance dated Jun. 29, 2022 for U.S. Appl. No. 16/672,427, filed Nov. 1, 2019, 8 pages.
Office Action dated May 10, 2022 for Taiwan Application No. 108122610, 19 pages.
Non-Final Office Action dated Sep. 14, 2022 for U.S. Appl. No. 17/364,763, filed Jun. 30, 2021, 13 pages.
Notice of Allowance dated Aug. 16, 2022 for U.S. Appl. No. 16/453,538, filed Jun. 26, 2019, 2 pages.
Notice of Allowance dated Aug. 26, 2022 for U.S. Appl. No. 16/672,427, filed Nov. 1, 2019, 3 pages.
Notice of Allowance dated Aug. 31, 2022 for U.S. Appl. No. 16/453,538, filed Jun. 26, 2019, 2 pages.
Office Action dated Jul. 6, 2022 for Chinese Application No. 201980024435.0, filed Apr. 1, 2019, 16 pages.
International Search Report and Written Opinion for International Application No. PCT/US2022/044519, dated Dec. 8, 2022, 12 pages.
Non-Final Office Action dated Jan. 10, 2023 for U.S. Appl. No. 17/591,300, filed Feb. 2, 2022, 15 pages.
Non-Final Office Action dated Jan. 11, 2023 for U.S. Appl. No. 17/180,207, filed Feb. 19, 2021, 19 pages.
Non-Final Office Action dated Oct. 13, 2022 for U.S. Appl. No. 17/538,092, filed Nov. 30, 2021, 10 pages.
Notice of Allowance dated Feb. 14, 2023 for U.S. Appl. No. 17/538,092, filed Nov. 30, 2021, 8 pages.
Notice of Allowance dated Feb. 15, 2023 for U.S. Appl. No. 17/364,763, filed Jun. 30, 2021, 9 pages.
Notice of Allowance dated Oct. 5, 2022 for U.S. Appl. No. 16/672,427, filed Nov. 1, 2019, 13 pages.
Office Action dated Jan. 13, 2023 for Taiwan Application No. 108111979, filed Apr. 3, 2019, 38 pages.
Office Action dated Feb. 14, 2023 for Japanese Patent Application No. 2020-547367, filed Apr. 1, 2019, 12 pages.
Office Action dated Jan. 17, 2023 for Taiwan Patent Application No. 108129677, filed Aug. 20, 2019, 12 pages.
Office Action dated Dec. 19, 2022 for Taiwan Patent Application No. 108130644, filed Aug. 27, 2019, 23 pages.
Office Action dated Oct. 20, 2022 for European Application No. 19740456.9, filed Jun. 27, 2019, 6 pages.
Office Action dated Oct. 26, 2022 for Taiwan Application No. 108122610, 9 pages.

\* cited by examiner

PIXEL SENSOR HAVING MULTIPLE PHOTODIODES AND SHARED COMPARATOR

RELATED APPLICATION

This patent application claims priority to U.S. Provisional Patent Application Ser. No. 62/723,376, filed Aug. 27, 2018, entitled "Digital Pixel Sensor with Shared Comparator for Multiple Photodiodes," and which is assigned to the assignee hereof and is incorporated herein by reference in its entirety for all purposes.

BACKGROUND

The disclosure relates generally to image sensors, and more specifically to pixel cell structure including interfacing circuits for determining light intensity for image generation.

A typical pixel in an image sensor includes a photodiode to sense incident light by converting photons into charge (e.g., electrons or holes). The incident light can include components of different wavelength ranges for different applications, such as 2D and 3D sensing. Moreover, to reduce image distortion, a global shutter operation can be performed in which each photodiode of the array of photodiodes senses the incident light simultaneously in a global exposure period to generate the charge. The charge can be converted by a charge sensing unit (e.g., a floating diffusion) to convert to a voltage. The array of pixel cells can measure different components of the incident light based on the voltages converted by the charge sensing unit and provide the measurement results for generation of 2D and 3D images of a scene.

SUMMARY

The present disclosure relates to image sensors. More specifically, and without limitation, this disclosure relates to a pixel cell. This disclosure also relates to operating the circuits of pixel cells to generate a digital representation of the intensity of incident light.

In one example, an apparatus is provided. The apparatus includes a first photodiode to generate a first charge in response to incident light, a second photodiode to generate a second charge in response to the incident light, a quantizer, a first memory bank, a second memory bank, and a controller. The controller is configured to: control the quantizer to perform a first quantization operation and a second quantization operation of the first charge to generate, respectively, a first digital output and a second digital output, the first quantization and the second quantization operations being associated with different intensity ranges; store one of the first digital output or the second digital output in the first memory bank; control the quantizer to perform a third quantization operation of the second charge to generate a third digital output, the third quantization operation being associated with a different intensity range from at least one of the first quantization operation or the second quantization operation; and store the third digital output in the second memory bank.

In some aspects, the quantizer comprises a comparator. The comparator comprises a different type of transistor devices from the first and second photodiodes and from the first and second memory banks.

In some aspects, the first photodiode and the second photodiode are formed on a first semiconductor substrate. The quantizer, the first memory bank, and the second memory bank are formed on a second semiconductor substrate. The first semiconductor substrate and the second semiconductor substrate form a stack.

In some aspects, the apparatus further comprises: a charge sensing unit comprising a capacitor and a buffer, the buffer being coupled with the quantizer; a first transfer switch coupled between the first photodiode and the capacitor; and a second transfer switch coupled between the second photodiode and the capacitor. The controller is configured to: control the first transfer switch, while disabling the second transfer switch, to transfer first overflow charge of the first charge from the first photodiode to the capacitor to generate a first voltage; control the quantizer to measure, based on the first voltage, a time of saturation of the capacitor by the first overflow charge as the first digital output; control the quantizer to measure, based on the first voltage, a quantity of the first overflow charge transferred by the first photodiode as the second digital output; control the second transfer switch, while disabling the first transfer switch, to transfer second residual charge of the second charge from the second photodiode to the capacitor to generate a second voltage; and control the quantizer to measure, based on the second voltage, a quantity of the second residual charge transferred by the second photodiode as the third digital output.

In some aspects, the quantizer is configured to: measure the time of saturation based on comparing the first voltage against a static threshold to generate a first decision; measure the quantity of the first overflow charge transferred by the first photodiode based on comparing the first voltage against a first voltage ramp to generate a second decision; and measure the quantity of the second residual charge transferred by the second photodiode based on comparing the second voltage against a second voltage ramp to generate a third decision. The controller is configured to: forward the first decision and the second decision to the first memory bank to control a first time when the first memory bank stores a count value from a counter as the first digital output or the second digital output; and forward the third decision to the second memory bank to control a second time when the second memory bank stores a count value from the counter as the third digital output.

In some aspects, the controller is configured to: control the first transfer switch to transfer first residual charge of the first charge to the capacitor to generate a third voltage; control the quantizer to measure, based on the third voltage, a quantity of the first residual charge transferred by the first photodiode as a fourth digital output; and store one of the first, second, or fourth digital outputs in the first memory bank.

In some aspects, the capacitor comprise a primary capacitor and an auxiliary capacitor. The first overflow charge is stored in a parallel combination of the primary capacitor and the auxiliary capacitor. The first residual charge and the second residual charge are stored in the primary capacitor but not in the auxiliary capacitor.

In some aspects, the apparatus further comprises: a first charge sensing unit comprising a first capacitor and a first buffer, the first buffer being coupled with the quantizer; a second charge sensing unit comprising a second capacitor and a second buffer, the second buffer being coupled with the quantizer; a first transfer switch coupled between the first photodiode and the first capacitor; and a second transfer switch coupled between the second photodiode and the second capacitor. The controller is configured to: control the first transfer switch to transfer first overflow charge of the first charge from the first photodiode to the first capacitor to generate a first voltage; control the second transfer switch to transfer second overflow charge of the second charge from the second photodiode, after the second photodiode saturates, to the second capacitor to generate a second voltage; control the quantizer to measure, based on the first voltage, a time of saturation of the first capacitor by the first overflow charge as the first digital output; control the quantizer to measure, based on the first voltage, a quantity of the first overflow charge transferred by the first photodiode as the second digital output; and control the quantizer to measure, based on the second voltage, a quantity of the second overflow charge transferred by the second photodiode as the third digital output.

In some aspects, the quantizer is configured to: measure the time of saturation based on comparing the first voltage against a static threshold to generate a first decision; measure the quantity of the first overflow charge transferred by the first photodiode based on comparing the first voltage against a first voltage ramp to generate a second decision; and measure the quantity of the second overflow charge transferred by the second photodiode based on comparing the second voltage against a second voltage ramp to generate a third decision. The controller is configured to: forward the first decision and the second decision to the first memory bank to control a first time when the first memory bank stores a count value from a counter as the first digital output or the second digital output; and forward the third decision to the second memory bank to control a second time when the second memory bank stores a count value from the counter as the third digital output.

In some aspects, the controller is configured to: control the first transfer switch to transfer first residual charge of the first charge to the first capacitor to generate a third voltage; control the quantizer to measure, based on the third voltage, a quantity of the first residual charge transferred by the first photodiode as a fourth digital output; control the second transfer switch to transfer second residual charge of the second charge to the second capacitor to generate a fourth voltage; control the quantizer to measure, based on the fourth voltage, a quantity of the second residual charge transferred by the second photodiode as a fifth digital output; store one of the first, second, or fourth digital outputs in the first memory bank; and store one of the third or fifth digital outputs in the second memory bank.

In some aspects, the apparatus further comprises: a first group of photodiodes including the first photodiode and a third photodiode, the third photodiode configured to generate a third charge; and a second group of photodiodes including the second photodiode and a fourth photodiode, the fourth photodiode configured to generate a fourth charge. The controller is configured to: control the quantizer to quantize the third charge to generate a fourth digital output; control the quantizer to quantize the fourth charge to generate a fifth digital output; at a first time: store one of the first digital output or the second digital output in the first memory bank, and store the third digital output in the second memory bank; and at a second time: store the fourth digital output in the first memory bank, and store the fifth digital output in the second memory bank.

In some aspects, the first photodiode and the second photodiode are configured to detect visible light components of incident light and to generate, respectively, the first charge and the second charge within a first exposure period. The third photodiode and the fourth photodiode are configured to detect an infra-red light component of the incident light and to generate, respectively, the third charge and the fourth charge within a second exposure period.

In some aspects, the first group of photodiodes includes the first photodiode, the third photodiode, a fifth photodiode, and a sixth photodiode, the fifth photodiode configured to generate a fifth charge and the sixth photodiode configured to generate a sixth charge. The apparatus further includes a third memory bank and a fourth memory bank. The controller is configured to: control the quantizer to quantize the fifth charge to generate a sixth digital output; control the quantizer to quantize the sixth charge to generate a seventh digital output; store one of the first digital output or the second digital output in the first memory bank; store the sixth digital output in the third memory bank; and store the seventh digital output in the fourth memory bank.

In some aspects, the first group of photodiodes and the second group of photodiodes are part of different pixel cells.

In some aspects, the apparatus further comprises a third memory bank. The controller is further configured to: quantize, at a first time, the first voltage to generate the second digital output; quantize, at a second time, the first voltage to generate a fourth digital output; store the second digital output in the first memory bank; and store the fourth digital output in the third memory bank.

In some aspects, the apparatus further comprises a third photodiode to generate a third charge in response to incident light. The controller is configured to control the quantizer to perform the first quantization operation and the second quantization operation of a combination of the first charge and the third charge to generate, respectively, a first digital output and a second digital output, the first quantization and the second quantization operations being associated with different intensity ranges.

In some aspects, the first photodiode and the third photodiode are configured to detect same component of the incident light.

In one example, a method is provided. The method comprises: enabling a first photodiode to generate a first charge in response to incident light; enabling a second photodiode to generate a second charge in response to the incident light; controlling a quantizer to perform a first quantization operation and a second quantization operation of the first charge to generate, respectively, a first digital output and a second digital output, the first quantization and the second quantization operations being associated with different intensity ranges; storing one of the first digital output or the second digital output in the first memory bank; controlling the quantizer to perform a third quantization operation of the second charge to generate a third digital output, the third quantization operation being associated with a different intensity range from at least one of the first quantization operation or the second quantization operation; and storing the third digital output in the second memory bank.

In some aspects, the method further comprises: transferring first overflow charge of the first charge from the first photodiode, after the first photodiode saturates, to a capacitor to generate a first voltage; controlling the quantizer to measure, based on the first voltage, a time of saturation of the capacitor by the first overflow charge as the first digital output; controlling the quantizer to measure, based on the first voltage, a quantity of the first overflow charge transferred by the first photodiode as the second digital output; transferring second residual charge of the second charge from the second photodiode to the capacitor to generate a second voltage; and controlling the quantizer to measure, based on the second voltage, a quantity of the second residual charge transferred by the second photodiode as the third digital output.

In some aspects, the first photodiode and the second photodiode generate, respectively, the first charge and the second charge in response to different components of the incident light.

BRIEF DESCRIPTION OF THE DRAWINGS

Illustrative examples are described with reference to the following figures.

Figure 1A:
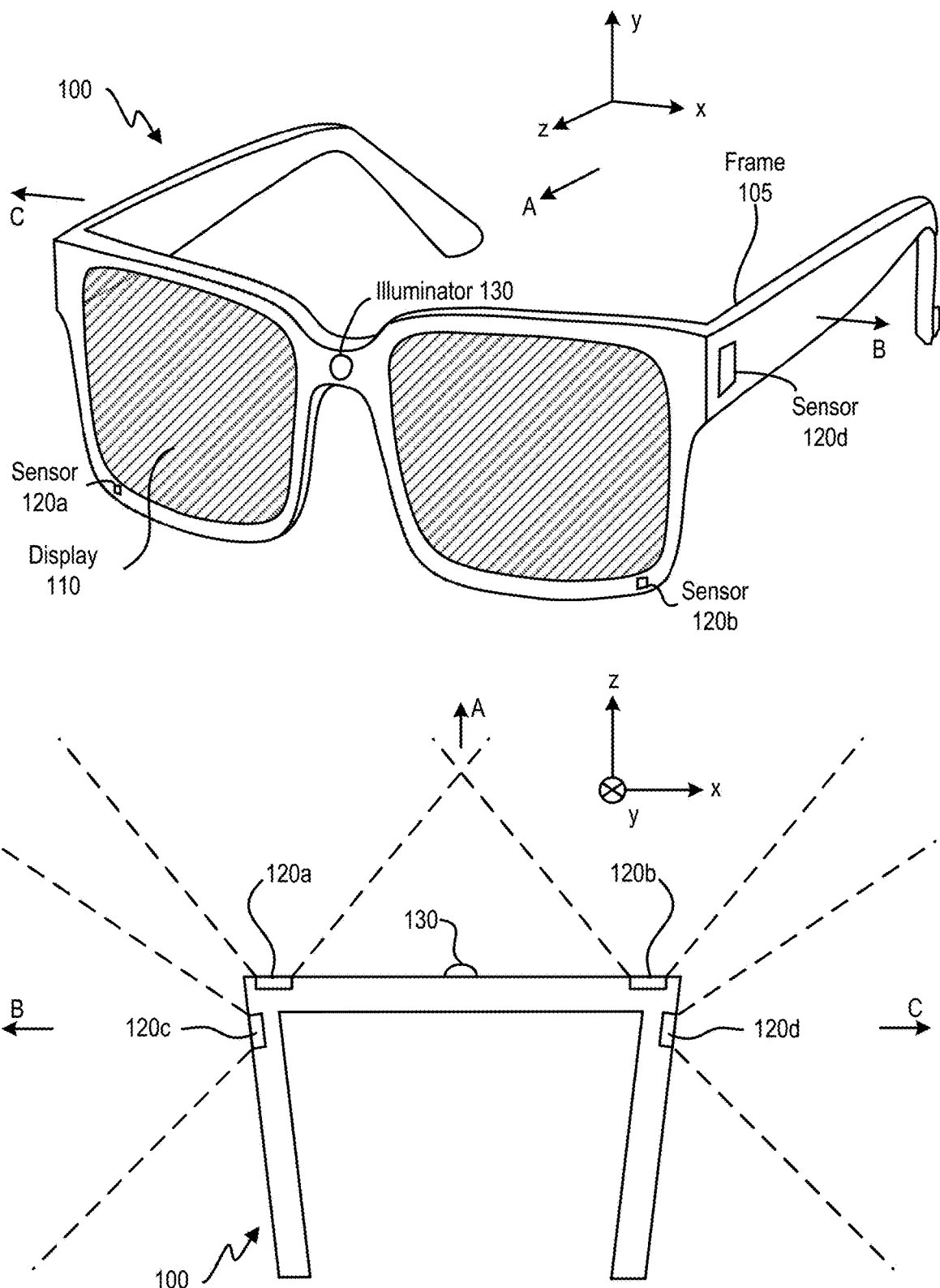
FIG. 1A and FIG. 1B are diagrams of an example of a near-eye display.

The figures depict examples of the present disclosure for purposes of illustration only. One skilled in the art will readily recognize from the following description that alternative examples of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive examples. However, it will be apparent that various examples may be practiced without these specific details. The figures and description are not intended to be restrictive.

A typical image sensor includes an array of pixel cells. Each pixel cell includes a photodiode to measure the intensity of incident light by converting photons into charge (e.g., electrons or holes). The charge generated by the photodiode can be converted to a voltage by a charge sensing unit, which can include a floating drain node. The voltage can be quantized by an analog-to-digital converter (ADC) into a digital value. The digital value can represent an intensity of light received by the pixel cell and can form a pixel, which can correspond to light received from a spot of a scene. An image comprising an array of pixels can be derived from the digital outputs of the array of pixel cells.

An image sensor can be used to perform different modes of imaging, such as 2D and 3D sensing. The 2D and 3D sensing can be performed based on light of different wavelength ranges. For example, light within a visible wavelength range can be used for 2D sensing, whereas light outside the visible wavelength range (e.g., infra-red light) can be used for 3D sensing. An image sensor may include an optical filter array to allow light of different visible wavelength ranges and colors (e.g., red, green, blue, monochrome, etc.) to reach a first set of pixel cells assigned for 2D sensing, and to allow light of the invisible wavelength range to a second set of pixel cells assigned for 3D sensing.

To perform 2D sensing, a photodiode of a pixel cell can generate charge at a rate that is proportional to an intensity of visible light component (e.g., red, green, blue, monochrome, etc.) incident upon the pixel cell, and the quantity of charge accumulated in an exposure period can be used to represent the intensity of visible light (or a certain color component of the visible light). The charge can be stored temporarily at the photodiode and then transferred to a capacitor (e.g., a floating diffusion) to develop a voltage. The voltage can be sampled and quantized by an analog-to-digital converter (ADC) to generate an output corresponding to the intensity of visible light. An image pixel value can be generated based on the outputs from multiple pixel cells configured to sense different color components of the visible light (e.g., red, green, and blue colors).

Moreover, to perform 3D sensing, light of a different wavelength range (e.g., infra-red light) can be projected onto an object, and the reflected light can be detected by the pixel cells. The light can include structured light, light pulses, etc. The pixel cells outputs can be used to perform depth sensing operations based on, for example, detecting patterns of the reflected structured light, measuring a time-of-flight of the light pulse, etc. To detect patterns of the reflected structured light, a distribution of quantities of charge generated by the pixel cells during the exposure time can be determined, and pixel values can be generated based on the voltages corresponding to the quantities of charge. For time-of-flight measurement, the timing of generation of the charge at the photodiodes of the pixel cells can be determined to represent the times when the reflected light pulses are received at the pixel cells. Time differences between when the light pulses are projected to the object and when the reflected light pulses are received at the pixel cells can be used to provide the time-of-flight measurement.

A pixel cell array can be used to generate information of a scene. In some examples, a subset (e.g., a first set) of the pixel cells within the array can detect visible components of light to perform 2D sensing of the scene, and another subset (e.g., a second set) of the pixel cells within the array can detect an infra-red component of the light to perform 3D sensing of the scene. The fusion of 2D and 3D imaging data are useful for many applications that provide virtual-reality (VR), augmented-reality (AR) and/or mixed reality (MR) experiences. For example, a wearable VR/AR/MR system may perform a scene reconstruction of an environment in which the user of the system is located. Based on the reconstructed scene, the VR/AR/MR can generate display effects to provide an interactive experience. To reconstruct a scene, a subset of pixel cells within a pixel cell array can perform 3D sensing to, for example, identify a set of physical objects in the environment and determine the distances between the physical objects and the user. Another subset of pixel cells within the pixel cell array can perform 2D sensing to, for example, capture visual attributes including textures, colors, and reflectivity of these physical objects. The 2D and 3D image data of the scene can then be merged to create, for example, a 3D model of the scene including the visual attributes of the objects. As another example, a wearable VR/AR/MR system can also perform a head tracking operation based on a fusion of 2D and 3D image data. For example, based on the 2D image data, the VR/AR/AR system can extract certain image features to identify an object. Based on the 3D image data, the VR/AR/AR system can track a location of the identified object relative to the wearable device worn by the user. The VR/AR/AR system can track the head movement based on, for example, tracking the change in the location of the identified object relative to the wearable device as the user's head moves.

To improve the correlation of 2D and 3D image data, an array of pixel cells can be configured to provide collocated imaging of different components of incident light from a spot of a scene. Specifically, each pixel cell can include a plurality of photodiodes, and a plurality of corresponding charge sensing units. Each photodiode of the plurality of photodiodes is configured to convert a different light component of incident light to charge. To enable the photodiodes to receive different light components of the incident light, the photodiodes can be formed in a stack which provides different absorption distances for the incident light for different photodiodes, or can be formed on a plane under an array of optical filters. Each charge sensing unit includes one or more capacitors to sense the charge of the corresponding photodiode by converting the charge to a voltage, which can be quantized by an ADC to generate a digital representation of an intensity of an incident light component converted by each photodiode. The ADC includes a comparator. As part of a quantization operation, the comparator can compare the voltage with a reference to output a decision. The output of the comparator can control when a memory stores a value from a free-running counter. The value can provide a result of quantizing the voltage.

There are various performance metrics of an image sensor, such as dynamic range, power, frame rate, etc. The dynamic range can refer to a range of light intensity measurable by the image sensor. For dynamic range, the upper limit can be defined based on the linearity of the light intensity measurement operation provided by the image sensor, whereas the lower limit can be defined based on the noise signals (e.g., dark charge, thermal noise, etc.) that affect the light intensity measurement operation. On the other hand, various factors can affect the frame rate, which can refer to the amount of time it takes for the image sensor to generate an image frame. The factors may include, for example, the time of completion of the quantization operation, various delays introduced to the quantization operation, etc.

To increase the dynamic range of the light intensity measurement operation, the ADC can quantize the voltages based on different quantization operations associated with different intensity ranges. Specifically, each photodiode can generate a quantity of charge within an exposure period, with the quantity of charge representing the incident light intensity. Each photodiode also has a quantum well to store at least some of the charge as residual charge. The quantum well capacity can be set based on a bias voltage on the switch between the photodiode and the charge sensing unit. For a low light intensity range, the photodiode can store the entirety of the charge as residual charge in the quantum well. In a PD ADC quantization operation, the ADC can quantize a first voltage generated by the charge sensing unit from sensing a quantity of the residual charge to provide a digital representation of the low light intensity. As the residual charge is typically much less susceptible to dark current in the photodiode, the noise floor of the low light intensity measurement can be lowered, which can further extend the lower limit of the dynamic range.

Moreover, for a medium light intensity range, the quantum well can be saturated by the residual charge, and the photodiode can transfer the remaining charge as overflow charge to the charge sensing unit, which can generate a second voltage from sensing a quantity of the overflow charge. In a FD ADC quantization operation, the ADC can quantize the second voltage to provide a digital representation of the medium light intensity. For both low and medium light intensities, the one or more capacitors in the charge sensing unit are not yet saturated, and the magnitudes of the first voltage and second voltage correlate with the light intensity. Accordingly for both low and medium light intensities, the comparator of the ADC can compare the first voltage or second voltage against a ramping voltage to generate a decision. The decision can control the memory to store a counter value which can represent a quantity of residual charge or overflow charge.

For a high light intensity range, the overflow charge can saturate the one or more capacitors in the charge sensing unit. As a result, the magnitudes of the second voltage no longer tracks the light intensity, and non-linearity can be introduced to the light intensity measurement. To reduce the non-linearity caused by the saturation of the capacitors, the ADC can perform a time-to-saturation (TTS) measurement operation by comparing the second voltage with a static threshold to generate a decision, which can control the memory to store a counter value. The counter value can represent a time when the second voltage reaches a saturation threshold. The time-to-saturation can represent the intensity of light in a range where the charge sensing unit is saturated and the value second voltage no longer reflects the intensity of light. With such arrangements, the upper limit of the dynamic range can be extended.

On the other hand, the operational speed of the image sensor can be improved based on various techniques, such as reducing the total time of completion of the quantization operations for all the photodiodes of a pixel cell, especially in a case where multiple quantization operations are performed on the charge generated by a photodiode to improve dynamic range, as described above. One way to reduce the total time of completion of the quantization operations is to enable parallel quantization operations for each photodiode by, for example, providing a comparator for each photodiode in a pixel cell, such that each photodiode of the pixel cell has its own dedicated comparator to perform the multiple quantization operations.

While including multiple comparators in each pixel cell of an image sensor can reduce the total time of completion of the quantization operations for each pixel cell and improve the operational speed of the image sensor, such arrangements can substantially increase the power consumption and the size of the pixel cell, both are which are undesirable especially for a wearable application. Specifically, the comparator typically comprises analog circuits (e.g., differential pairs, biasing circuits, output stages, etc.) which consume lots of static current. Moreover, those analog circuits typically use transistor devices that are of a different process node from the digital circuits and the photodiode devices of the pixel cell, and occupy far more spaces than the digital circuits and the photodiode devices. As the advancement in the process technologies further shrinks the sizes of the photodiodes and allows more photodiodes to be included in an image sensor to improve resolution, the power and space required by the comparators can become a bottleneck that limits how many photodiodes can be included in the image sensor, especially in a case where each photodiode is to have a dedicated comparator.

Besides parallelizing the quantization operations for each photodiode in a pixel cell, another way to improve the operational speed of the image sensor is by reducing the various delays introduced to the quantization operation. One source of delay can be the time for moving the quantization results (e.g., pixel data) out of the image sensor to a host device of the application that consumes the quantization results. For example, a subsequent quantization operation may be put on hold to wait for the quantization results of a previous quantization operation to be transferred to the host device. The operation speed of the image sensor can be improved if the hold time of the subsequent quantization operation can be reduced or minimized.

This disclosure relates to an image sensor that can provide improved collocated 2D and 3D imaging operations, as well as improved global shutter operations, by addressing at least some of the issues above. Specifically, an image sensor may include a first photodiode, a second photodiode, a quantizer, a first memory bank, a second memory bank, and a controller. The first photodiode can generate a first charge in response to incident light, whereas the second photodiode can generate a second charge in response to the incident light. The quantizer includes a comparator and is shared between the first photodiode and the second photodiode. The controller can control the quantizer to perform a first quantization operation and a second quantization operation of the first charge to generate, respectively, a first digital output and a second digital output, the first quantization and the second quantization operations being associated with different intensity ranges, and store one of the first digital output or the second digital output in the first memory bank. Moreover, the controller can control the quantizer to perform a third quantization operation of the second charge to generate a third digital output, and store the third digital output in the second memory bank. The third quantization operation is associated with different intensity ranges from at least one of the first or second quantization operations.

In one example, the image sensor may include a charge sensing unit shared between the first photodiode and the second photodiode, and the quantizer can quantize the output of the charge sensing unit. The charge sensing unit may include a capacitor to convert the first charge and the second charge to, respectively, a first voltage and a second voltage, which can be quantized by the quantizer. Specifically, within an exposure time, the controller can first connect the charge sensing unit to the first photodiode to receive a first overflow charge from the first photodiode as part of the first charge, while the first photodiode and the second photodiode accumulate, respectively, the first residual charge (as part of the first charge) and the second residual charge (as part of the second charge). During the exposure period, the first overflow charge stored at the capacitor may develop the first voltage, and the quantizer can perform at least one of the TTS or the FD ADC operation on the first voltage to generate the first digital output.

After the exposure period ends, a PD ADC operation can be performed for the first photodiode, in which the first residual charge accumulated at the first photodiode is transferred to the charge sensing unit to obtain a new first voltage. The new first voltage can be quantized by the quantizer to generate the second digital output. Based on whether the capacitor of the charge sensing unit is saturated by the first overflow charge, and whether the first photodiode is saturated by the first residual charge, one of the first digital output (from either the TTS or the FD ADC operation) or the second digital output (from the PD ADC operation) can be stored in the first memory bank. After the PD ADC operation for the first photodiode completes, the controller can control the second photodiode to transfer the second residual charge to the charge sensing unit to generate the second voltage, and control the quantizer to perform a PD ADC operation on the second voltage to generate the third digital output. The third digital output can be stored in the second memory bank.

The first photodiode and the second photodiode can be part of the same pixel cell or of different pixel cells of the image sensor. The first photodiode and the second photodiode can be configured to detect different components of the incident light. In one example, the first photodiode can be configured to detect visible components of the incident light to generate pixel data for 2D imaging, whereas the second photodiode can be configured to detect infra-red components of the incident light to generate pixel data for 3D imaging. The first memory bank can be part of a first memory for storing a 2D image frame, whereas the second memory bank can be part of a second memory for storing a 3D image frame.

The arrangements above can improve the performance and reduce the size and power of an image sensor. Specifically, by providing additional memory banks to store a 2D image frame and a 3D image frame generated from the completed quantization operations, the 2D and 3D image frames can be read out from the memory and transferred to the host device while the subsequent quantization operations for the next frame is underway. Compared with a case where a single memory bank is shared by multiple photodiodes, and the quantization of the output of one photodiode needs to be put on hold until the quantization result stored in the memory bank is read out and can be erased, the arrangements above can reduce the delay introduced to the quantization operations and can improve the operational speed of the image sensor. Moreover, by sharing the comparator between the photodiodes, the power and the size of the image sensor, which is typically dominated by the analog circuits of the comparator, can be reduced. On the other hand, given that the memory banks are typically implemented as digital circuits which occupy much less space and consume much less power than the comparator, including additional memory banks typically do not lead to substantial increase in size and power consumption of the image sensor, especially when the memory banks are fabricated with advanced process technologies.

The image sensor may include additional charge sensing units and additional memory banks, and the mapping between the photodiodes and the memory banks can vary based on different applications. In one example, the image sensor may include two pixel cells, each pixel cell including a pair of photodiodes and a charge sensing unit. The two charge sensing units (of the two pixel cells) can share the comparator. The first photodiode can be of the first pixel cell, whereas the second photodiode can be of the second pixel cell. The comparator can be first connected to the charge sensing unit of the first pixel cell to perform the TTS, FD ADC, and PD ADC operations for the first photodiode, and store the output of one of the operations at the first memory bank. The comparator can then be connected to the charge sensing unit of the second pixel cell to perform the FD ADC and PD ADC operations for the second photodiode, and store the output of one of the operations at the second memory bank. For the other photodiodes in the pixel cells, only PD ADC operations are performed, and the results of the PD ADC operations can be stored in the first and second memory banks after the outputs of the first and second photodiodes have been read out.

As another example, each pixel cell of the image sensor may include four photodiodes sharing a charge sensing unit, and the image sensor may include four memory banks. In some examples, the memory banks can be evenly distributed among the pixel cells, such as having two memory banks to store the outputs of the first pixel cell and the other two memory banks to store the outputs of the second pixel cell. In some examples, the memory banks can be preferentially assigned to store the outputs of a pixel cell based on, for example, the pixel cell being part of a region of interest and the outputs of the pixel cell need to be read out prior to other pixel cells to, for example, dynamically change the quantization operations of the other pixel cells, such as to set the exposure time of the other pixel cells, to enable/disable certain quantization operations of the other pixel cells, etc. As another example, multiple memory banks can be assigned to store the outputs of a photodiode. Such arrangements can be used to enable multiple sampling of the voltage at the charge sensing unit resulted from the accumulation of residual charge/overflow charge, which can improve the resolution of the quantization. In such an example, each of the memory banks can store a digital sample of the voltage, and the digital samples can be read averaged (or otherwise post-processed) to generate the digital output representing the residual charge/overflow charge.

The disclosed techniques may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some examples, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an example of a near-eye display 100. Near-eye display 100 presents media to a user. Examples of media presented by near-eye display 100 include one or more images, video, and/or audio. In some examples, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some examples, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some examples, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some examples, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some examples, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some examples, near-eye display 100 may further include one or more active illuminators 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some examples, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
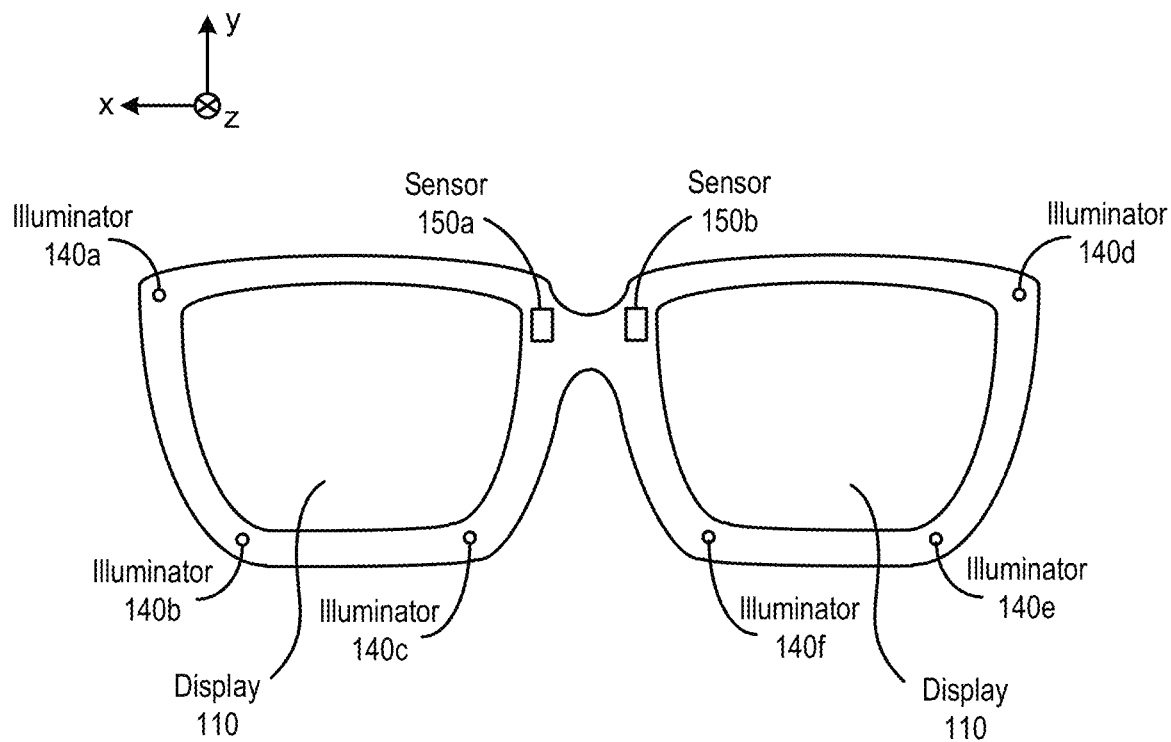

FIG. 1B is a diagram of another example of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 1B:
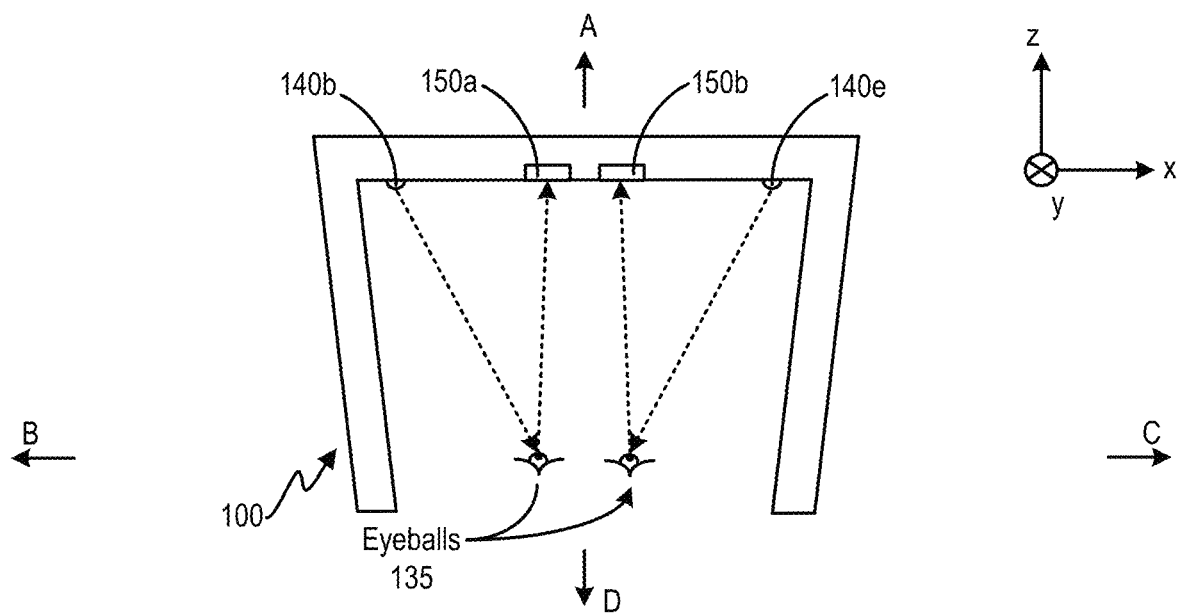
Figure 2:
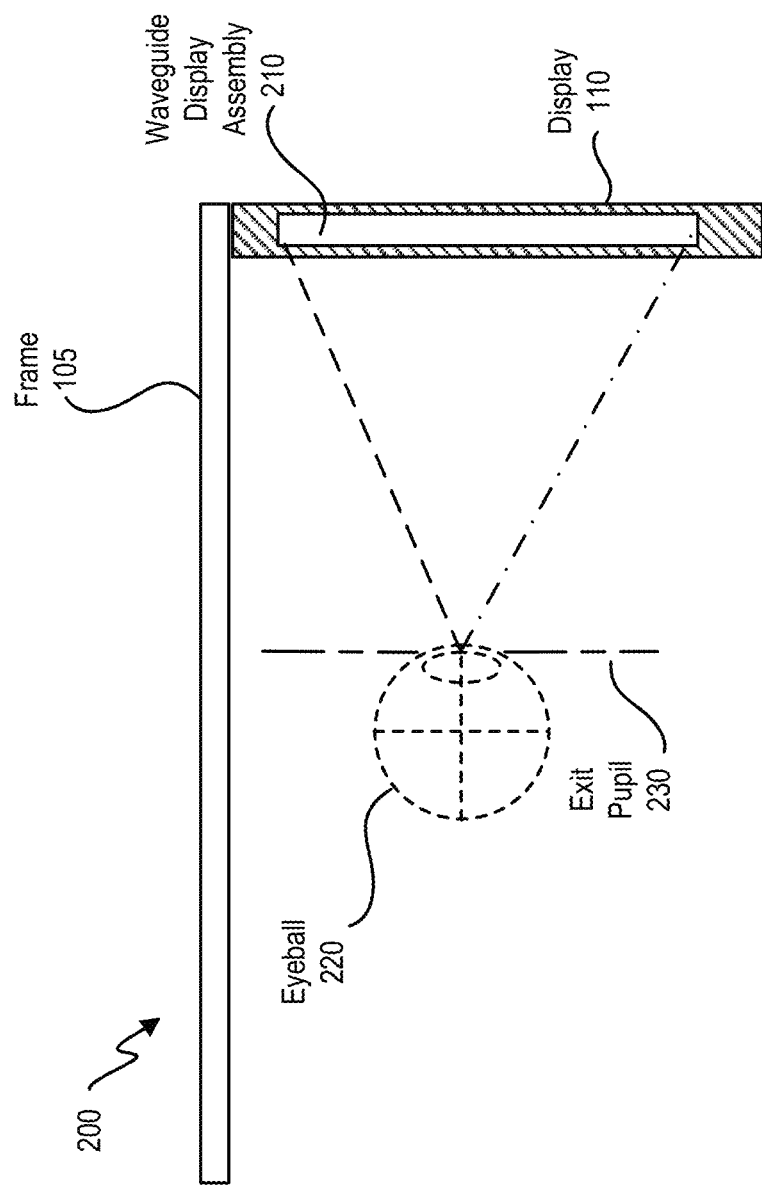
FIG. 2 is an example of a cross section of the near-eye display.

FIG. 2 is an example of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some examples, near-eye display 100 includes one or more optical elements between waveguide display assembly 210 and eyeball 220.

In some examples, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate examples, waveguide display assembly 210 may include the stacked waveguide display and the varifocal waveguide display.

Figure 3:
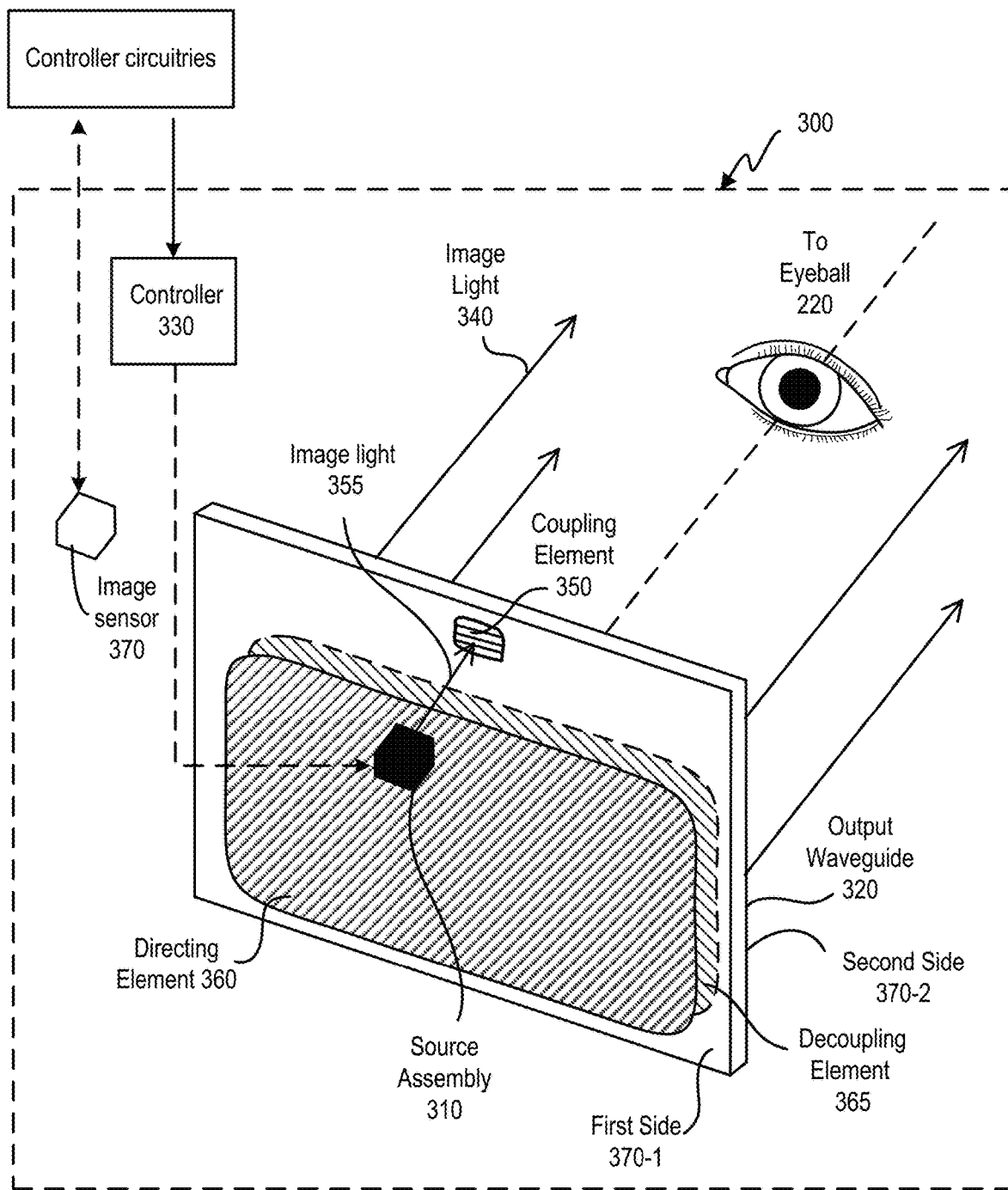
FIG. 3 illustrates an isometric view of an example of a waveguide display with a single source assembly.

FIG. 3 illustrates an isometric view of an example of a waveguide display 300. In some examples, waveguide display 300 is a component (e.g., waveguide display assembly 210) of near-eye display 100. In some examples, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some examples, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some examples, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some examples, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
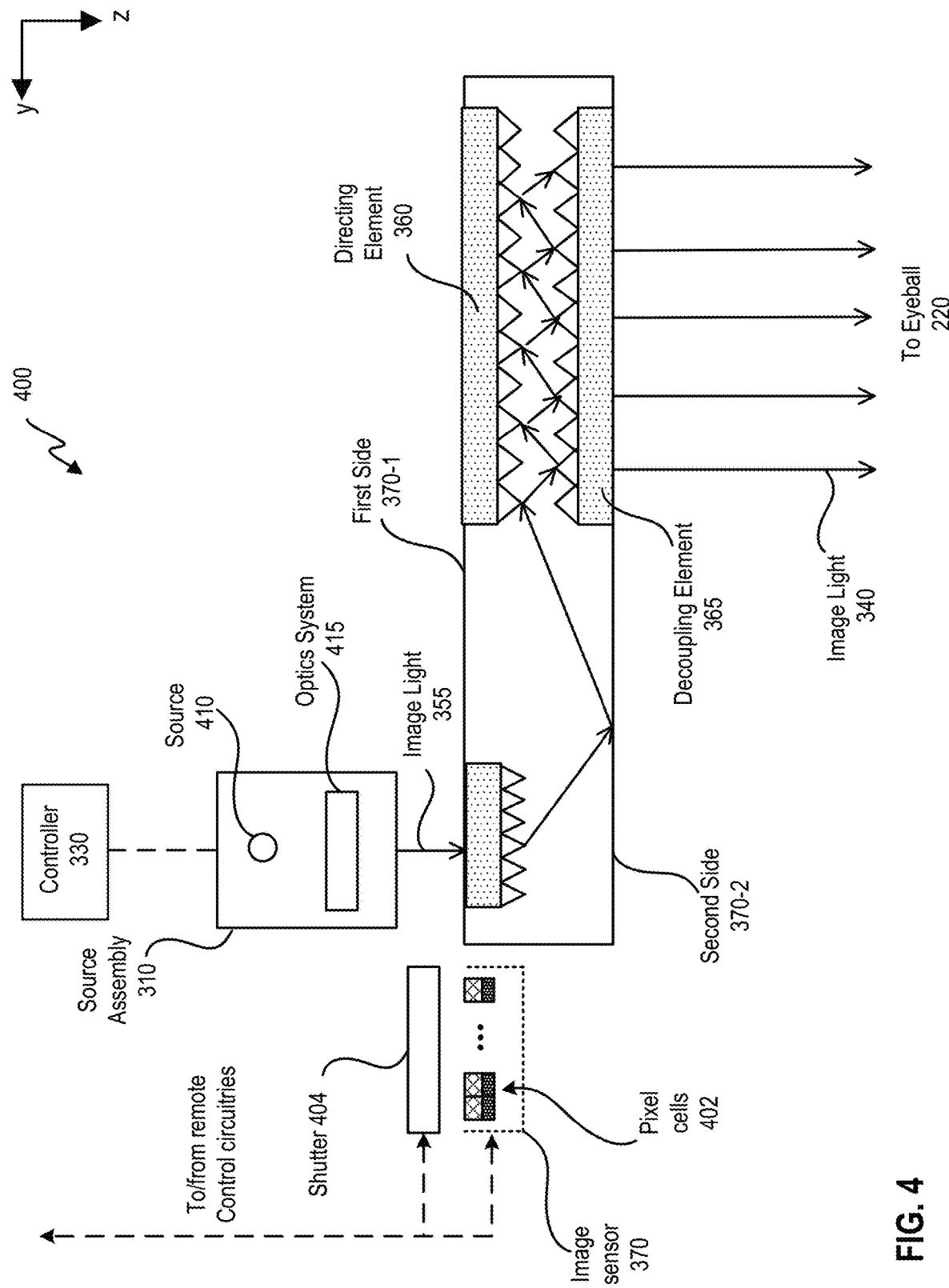
FIG. 4 illustrates a cross section of an example of the waveguide display.

FIG. 4 illustrates an example of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some examples, there can be a mechanical shutter 404 interposed between the set of pixel cells 402 and the physical environment to control the exposure of the set of pixel cells 402. In some examples, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some examples, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In examples where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In examples where directing element 360 is a diffraction grating, the pitch of the diffraction grating is chosen to cause incident image light 355 to exit output waveguide 320 at angle(s) of inclination relative to a surface of decoupling element 365.

In some examples, directing element 360 and/or decoupling element 365 are structurally similar. Expanded image light 340 exiting output waveguide 320 is expanded along one or more dimensions (e.g., may be elongated along x-dimension). In some examples, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
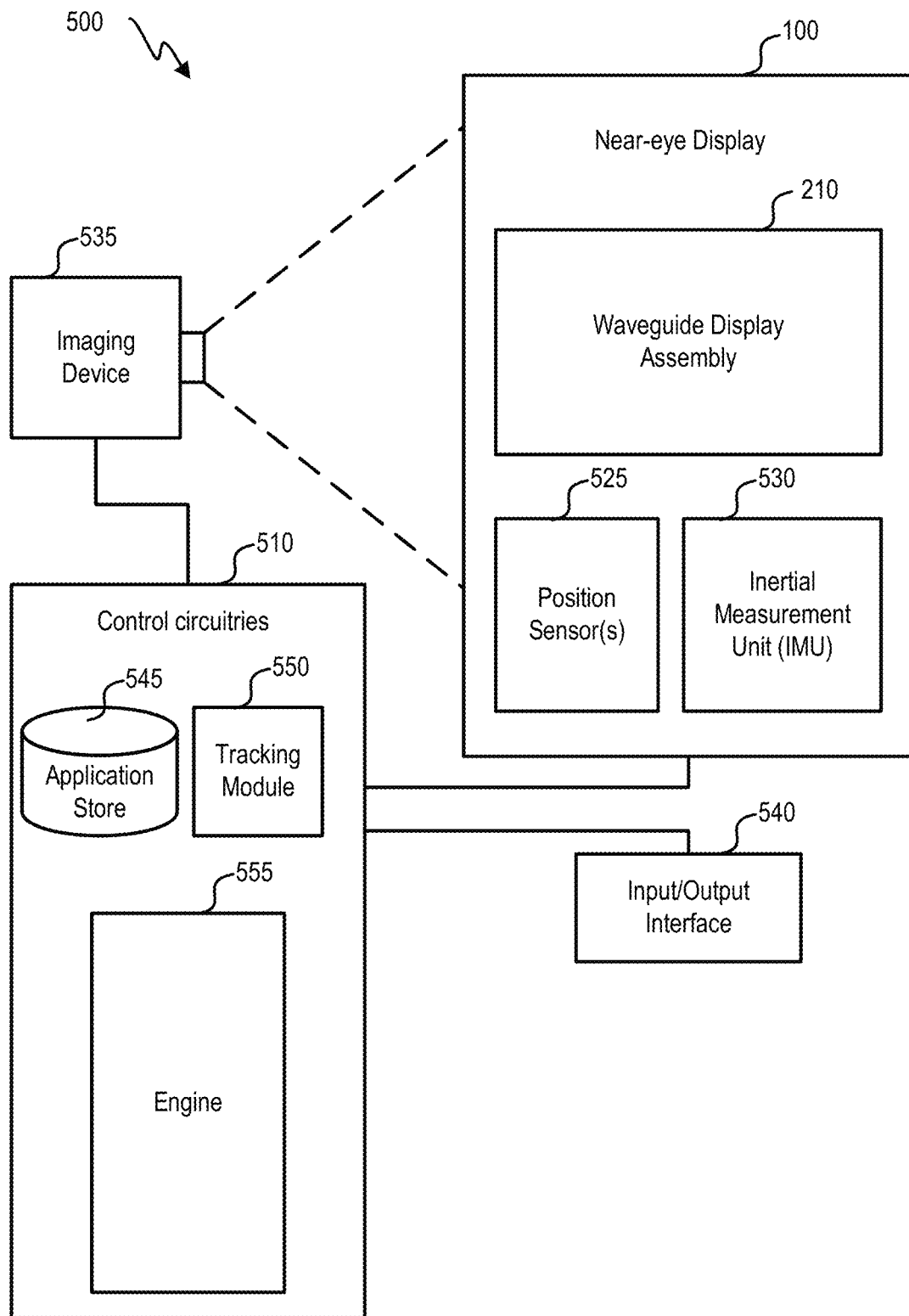
FIG. 5 is a block diagram of an example of a system including the near-eye display.

FIG. 5 is a block diagram of an example of a system 500 including the near-eye display 100. The system 500 comprises near-eye display 100, an imaging device 535, an input/output interface 540, and image sensors 120a-120d and 150a-150b that are each coupled to control circuits 510. System 500 can be configured as a head-mounted device, a wearable device, etc.

Near-eye display 100 is a display that presents media to a user. Examples of media presented by the near-eye display 100 include one or more images, video, and/or audio. In some examples, audio is presented via an external device (e.g., speakers and/or headphones) that receives audio information from near-eye display 100 and/or control circuits 510 and presents audio data based on the audio information to a user. In some examples, near-eye display 100 may also act as an AR eyewear glass. In some examples, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuits 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuits 510. An action request is a request to perform a particular action. For example, an action request may be to start or end an application or to perform a particular action within the application.

Control circuits 510 provide media to near-eye display 100 for presentation to the user in accordance with information received from one or more of: imaging device 535, near-eye display 100, and input/output interface 540. In some examples, control circuits 510 can be housed within system 500 configured as a head-mounted device. In some examples, control circuits 510 can be a standalone console device communicatively coupled with other components of system 500. In the example shown in FIG. 5, control circuits 510 include an application store 545, a tracking module 550, and an engine 555.

The application store 545 stores one or more applications for execution by the control circuits 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some examples, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6A:
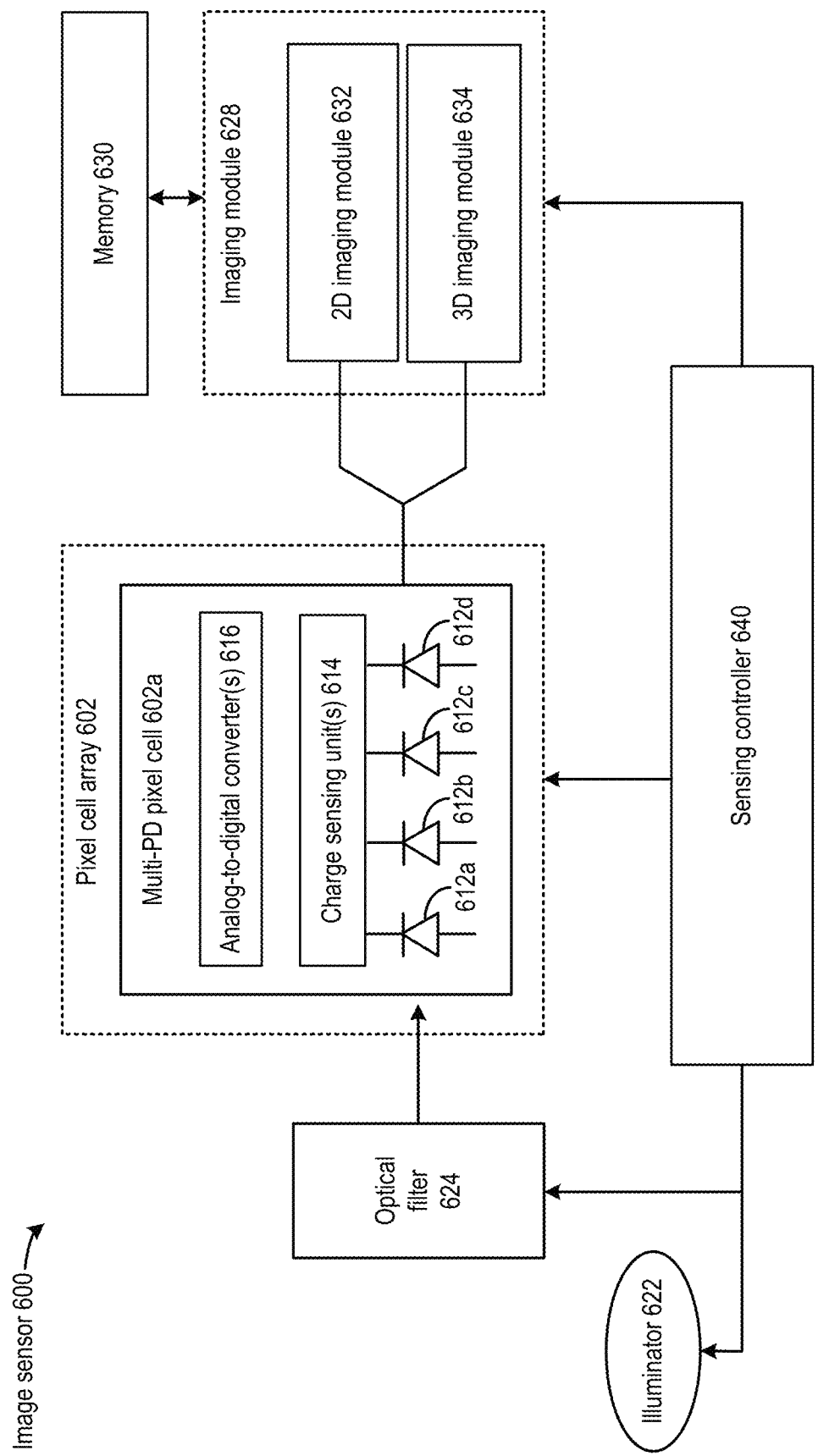
FIG. 6A and FIG. 6B illustrate block diagrams of examples of an image sensor and a host device.

FIG. 6A illustrates an example of an image sensor 600. Image sensor 600 can be part of near-eye display 100, and can provide 2D and 3D image data to control circuits 510 of FIG. 5 to control the display content of near-eye display 100. As shown in FIG. 6A, image sensor 600 may include an array of pixel cells 602 including pixel cell 602a. Pixel cell 602a can include a plurality of photodiodes 612 including, for example, photodiodes 612a, 612b, 612c, and 612d, one or more charge sensing units 614, and one or more analog-to-digital converters 616. The plurality of photodiodes 612 can convert different components of incident light to charge. For example, photodiode 612a-612c can correspond to different visible light channels, in which photodiode 612a can convert a visible blue component (e.g., a wavelength range of 450-490 nanometers (nm)) to charge. Photodiode 612b can convert a visible green component (e.g., a wavelength range of 520-560 nm) to charge. Photodiode 612c can convert a visible red component (e.g., a wavelength range of 635-700 nm) to charge. Moreover, photodiode 612d can convert an infra-red component (e.g., 700-1000 nm) to charge. Each of the one or more charge sensing units 614 can include a charge storage device and a buffer to convert the charge generated by photodiodes 612a-612d to voltages, which can be quantized by one or more ADCs 616 into digital values. The digital values generated from photodiodes 612a-612c can represent the different visible light components of a pixel, and each can be used for 2D sensing in a particular visible light channel. Moreover, the digital value generated from photodiode 612d can represent the infra-red light component of the same pixel and can be used for 3D sensing. Although FIG. 6A shows that pixel cell 602a includes four photodiodes, it is understood that the pixel cell can include a different number of photodiodes (e.g., two, three, etc.).

In addition, image sensor 600 also includes an illuminator 622, an optical filter 624, an imaging module 628, and a sensing controller 640. Illuminator 622 may be an infra-red illuminator, such as a laser, a light emitting diode (LED), etc., that can project infra-red light for 3D sensing. The projected light may include, for example, structured light, light pulses, etc. Optical filter 624 may include an array of filter elements overlaid on the plurality of photodiodes 612a-612d of each pixel cell including pixel cell 606a. Each filter element can set a wavelength range of incident light received by each photodiode of pixel cell 606a. For example, a filter element over photodiode 612a may transmit the visible blue light component while blocking other components, a filter element over photodiode 612b may transmit the visible green light component, a filter element over photodiode 612c may transmit the visible red light component, whereas a filter element over photodiode 612d may transmit the infra-red light component.

Image sensor 600 further includes an imaging module 628 and memory 630. Imaging module 628 may further include a 2D imaging module 632 to perform 2D imaging operations and a 3D imaging module 634 to perform 3D imaging operations. The operations can be based on digital values provided by ADCs 616. For example, based on the digital values from each of photodiodes 612a-612c, 2D imaging module 632 can generate an array of pixel values representing an intensity of an incident light component for each visible color channel, and generate an image frame for each visible color channel. Moreover, 3D imaging module 634 can generate a 3D image based on the digital values from photodiode 612d. In some examples, based on the digital values, 3D imaging module 634 can detect a pattern of structured light reflected by a surface of an object, and compare the detected pattern with the pattern of structured light projected by illuminator 622 to determine the depths of different points of the surface with respect to the pixel cells array. For detection of the pattern of reflected light, 3D imaging module 634 can generate pixel values based on intensities of infra-red light received at the pixel cells. As another example, 3D imaging module 634 can generate pixel values based on time-of-flight of the infra-red light transmitted by illuminator 622 and reflected by the object. Memory 630 can store at least some of the pixel data of the 2D and 3D images generated by, respectively, 2D imaging module 632 and 3D imaging module 634.

Figure 7A:
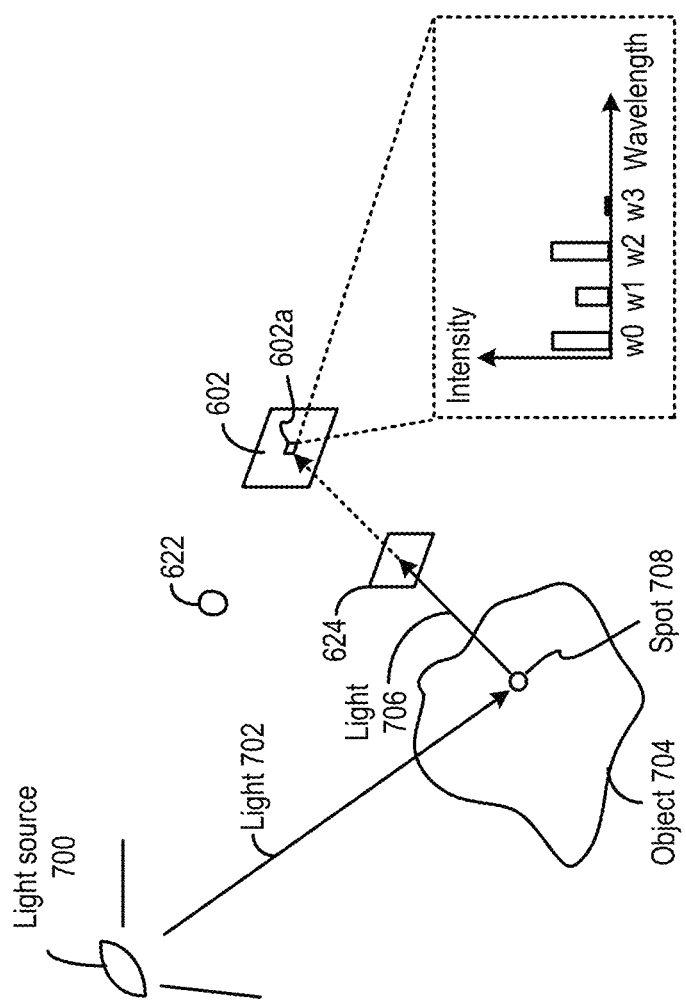
FIG. 7A, FIG. 7B, and FIG. 7C illustrate operations for determining light intensities of different ranges by example image sensor of FIG. 6A.
Figure 7B:
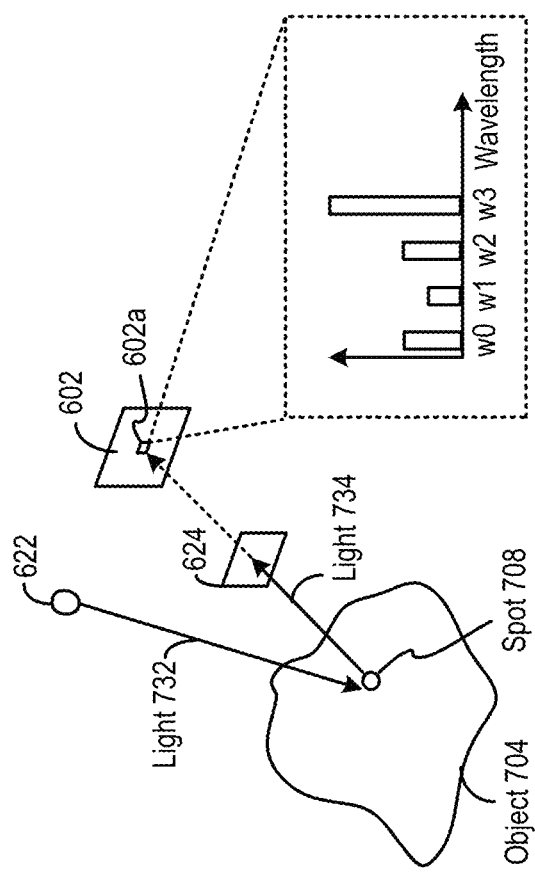
Figure 7C:
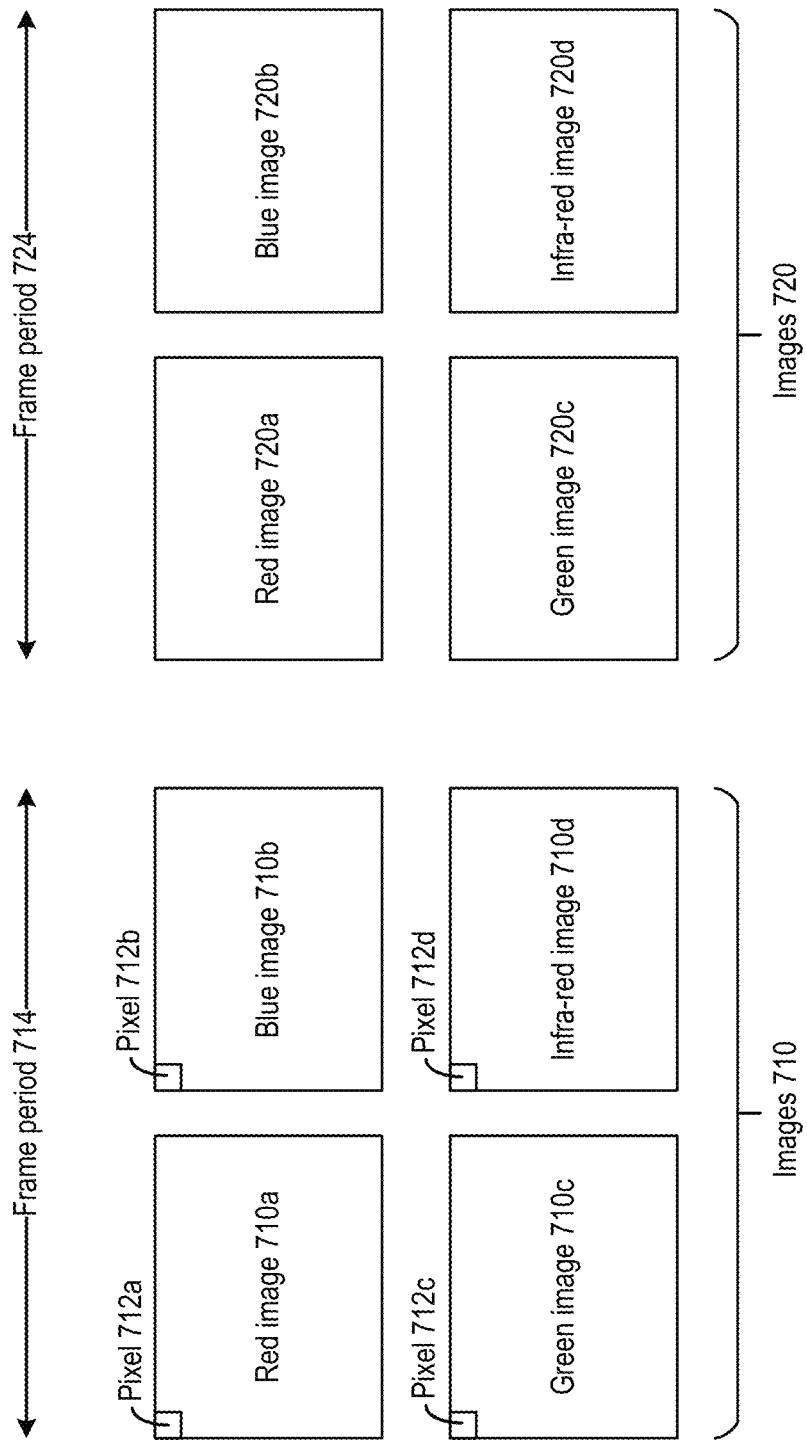

Image sensor 600 further includes a sensing controller 640 to control different components of image sensor 600 to perform 2D and 3D imaging of an object. Reference is now made to FIG. 7A-FIG. 7C, which illustrate examples of operations of image sensor 600 for 2D and 3D imaging. FIG. 7A illustrates an example of operations for 2D imaging. For 2D imaging, pixel cells array 602 can detect visible light in the environment including visible light reflected off an object. For example, referring to FIG. 7A, visible light source 700 (e.g., a light bulb, the sun, or other sources of ambient visible light) can project visible light 702 onto an object 704. Visible light 706 can be reflected off a spot 708 of object 704. Visible light 706 can also include the ambient infra-red light component. Visible light 706 can be filtered by optical filter array 624 to pass different components of visible light 706 of wavelength ranges w0, w1, w2, and w3 to, respectively, photodiodes 612a, 612b, 612c, and 612d of pixel cell 602a. Wavelength ranges w0, w1, w2, and w3 an correspond to, respectively, blue, green, red, and infra-red. As shown in FIG. 7A, as the infra-red illuminator 622 is not turned on, the intensity of infra-red component (w3) is contributed by the ambient infra-red light and can be very low. Moreover, different visible components of visible light 706 can also have different intensities. Charge sensing units 614 can convert the charge generated by the photodiodes to voltages, which can be quantized by ADCs 616 into digital values representing the red, blue, and green components of a pixel representing spot 708. Referring to FIG. 7C, after the digital values are generated, sensing controller 640 can control 2D imaging module 632 to generate, based on the digital values, sets of images including a set of images 710, which includes a red image frame 710a, a blue image frame 710b, and a green image frame 710c each representing one of red, blue, or green color image of a scene captured with the same frame period 714. Each pixel from the red image (e.g., pixel 712a), from the blue image (e.g., pixel 712b), and from the green image (e.g., pixel 712c) can represent visible components of light from the same spot (e.g., spot 708) of a scene. A different set of images 720 can be generated by 2D imaging module 632 in a subsequent frame period 724. Each of red image 710a, blue image 710b, and green image 710c can represent the scene in a specific color channel and can be provided to an application to, for example, extract image features from the specific color channel. As each image represents the same scene and each corresponding pixel of the images represent light from the same spot of the scene, the correspondence of images between different color channels can be improved.

Furthermore, image sensor 600 can also perform 3D imaging of object 704. Referring to FIG. 7B, sensing controller 610 can control illuminator 622 to project infra-red light 732, which can include a light pulse, structured light, etc., onto object 704. Infra-red light 732 can have a wavelength range of 700 nanometers (nm) to 1 millimeter (mm). Infra-red light 734 can reflect off spot 708 of object 704 and can propagate towards pixel cells array 602 and pass through optical filter 624, which can provide the infra-red component (of wavelength range w3) to photodiode 612d to convert to charge. Charge sensing units 614 can convert the charge to a voltage, which can be quantized by ADCs 616 into digital values. Referring to FIG. 7C, after the digital values are generated, sensing controller 640 can control 3D imaging module 634 to generate, based on the digital values, an infra-red image 710d of the scene as part of images 710 captured within exposure period 714. As infra-red image 710d can represent the same scene in the infra-red channel and a pixel of infra-red image 710d (e.g., pixel 712d) represents light from the same spot of the scene as other corresponding pixels (pixels 712a-712c) in other images within images 710, the correspondence between 2D and 3D imaging can be improved as well.

Figure 6B:
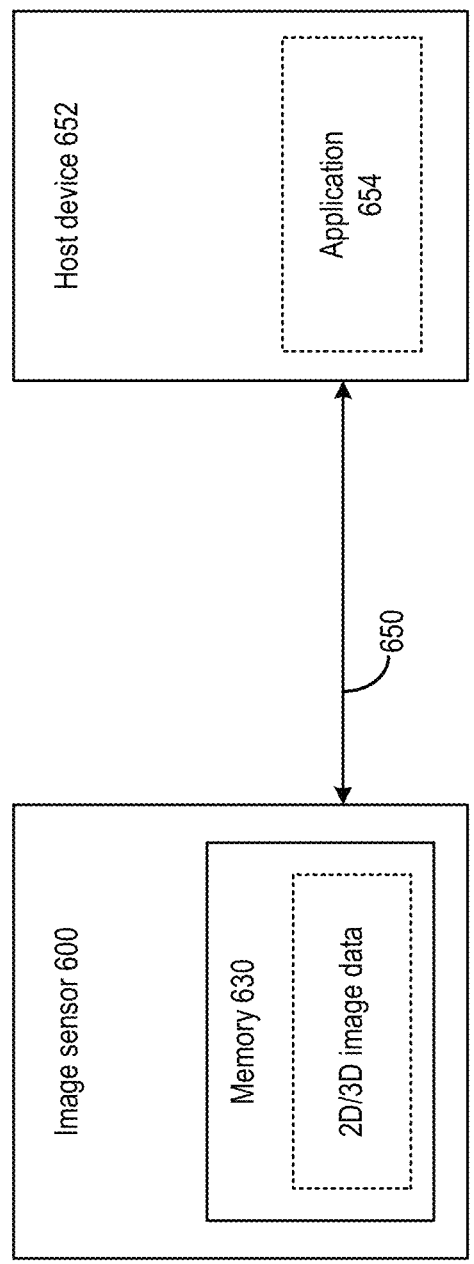

In some examples, as shown in FIG. 6B, image sensor 600 can be communicatively coupled, via an interconnect 650, with a host device 652 that hosts an application 654. Image sensor 600 and host device 652 can be part of a wearable VR/AR/MR system, whereas application 654 may perform a scene reconstruction of an environment in which the user of the system is located based on 2D and 3D image data provided by image sensor 600, and can generate display effects based on the reconstructed scene to provide an interactive experience. In some examples, interconnect 650 can be a serial interconnect compliant with the Camera Serial Interface (CSI) specification of the Mobile Industry Processor Interface (MIPI). Image sensor 600 can perform a readout of the 2D and/or 3D image data from memory 630 and transmit the 2D and 3D image data to host deice 652 via interconnect 650.

Figure 8A:
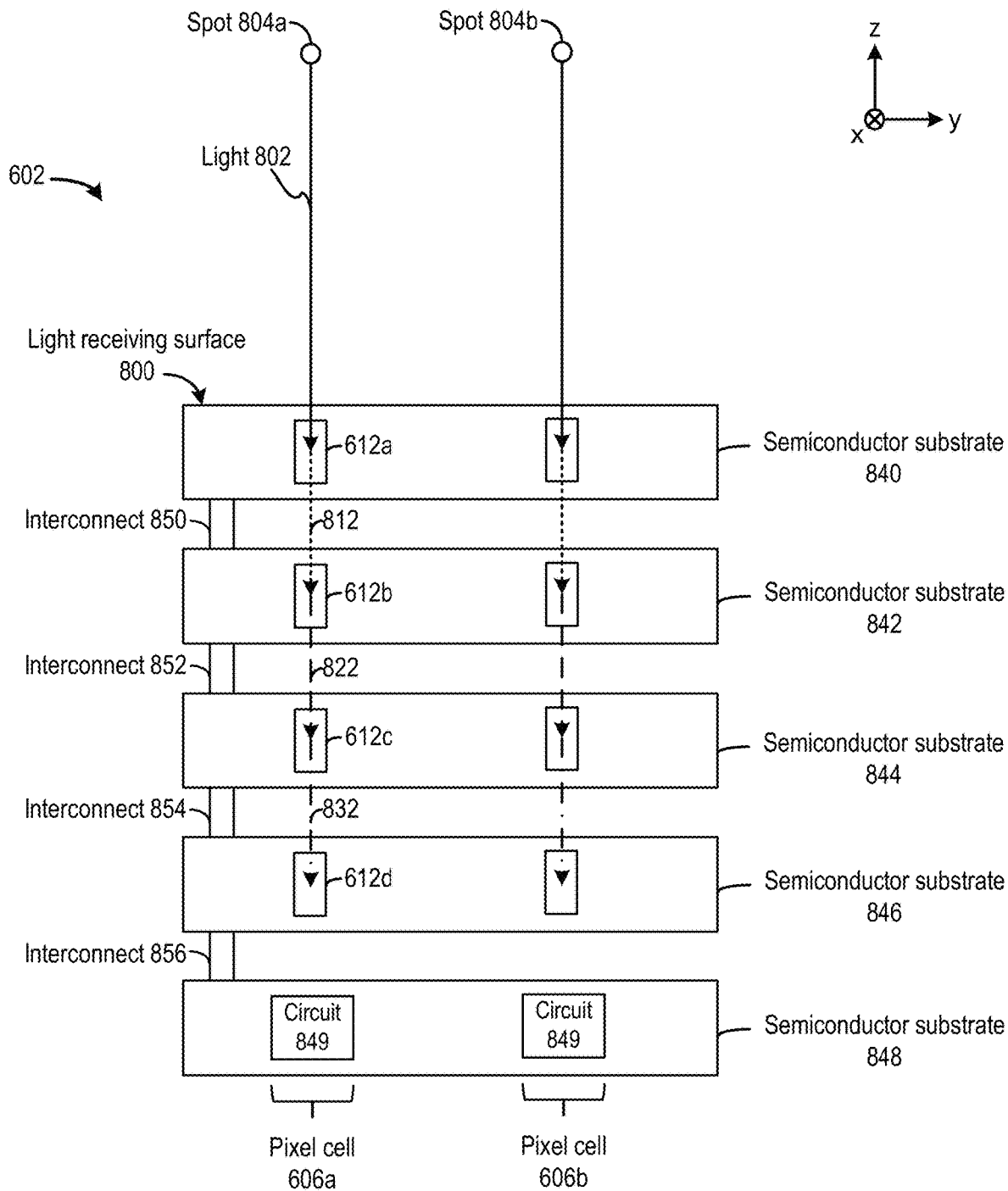
FIG. 8A, FIG. 8B, FIG. 8C, and FIG. 8D illustrate examples of internal components of an example pixel cell of the example image sensor of FIG. 6A.

FIG. 8A-FIG. 8D illustrate examples of arrangements of photodiodes 612 in a pixel cell. As shown in FIG. 8A, the photodiodes 612a-612d in a pixel cell 602a can form a stack along an axis that is perpendicular to a light receiving surface 800 through which pixel cell 602a receives incident light 802 from a spot 804a. For example, the photodiodes 612a-612d can form a stack along a vertical axis (e.g., the z-axis) when the light receiving surface 800 is parallel with the x and y axes. Each photodiode can have a different distance from light receiving surface 800, and the distance can set the component of incident light 802 being absorbed and converted to charge by each photodiode. For example, photodiode 612a is closest to light receiving surface 800 and can absorb and convert the blue component to charge, which is of the shortest wavelength range among the other components. Light 812 includes the remaining components of light 802 (e.g., green, red, and infra-red) and can propagate to photodiode 612b, which can absorb and convert the green component. Light 822 includes the remaining components of light 812 (e.g., red and infra-red) and can propagate to photodiode 612c, which can absorb and convert the red component. The remaining infra-red component 832 can propagate to photodiode 612d to be converted to charge.

Each the photodiodes 612a, 612b, 612c, and 612d can be in a separate semiconductor substrate, which can be stacked to form image sensor 600. For example, photodiode 612a can be in a semiconductor substrate 840, photodiode 612b can be in a semiconductor substrate 842, photodiode 612c can be in a semiconductor substrate 844, whereas photodiode 612d can be in a semiconductor substrate 846. Each semiconductor substrate can include other photodiodes of other pixel cells, such as pixel cells 602b to receive light from spot 804b. Image sensor 600 can include another semiconductor substrate 848 which can include pixel cell processing circuits 849 which can include, for example, charge sensing units 614, ADCs 616, etc. Each semiconductor substrate can be connected to a metal interconnect, such as metal interconnects 850, 852, 854, and 856 to transfer the charge generated at each photodiode to processing circuit 849.

Figure 8B:
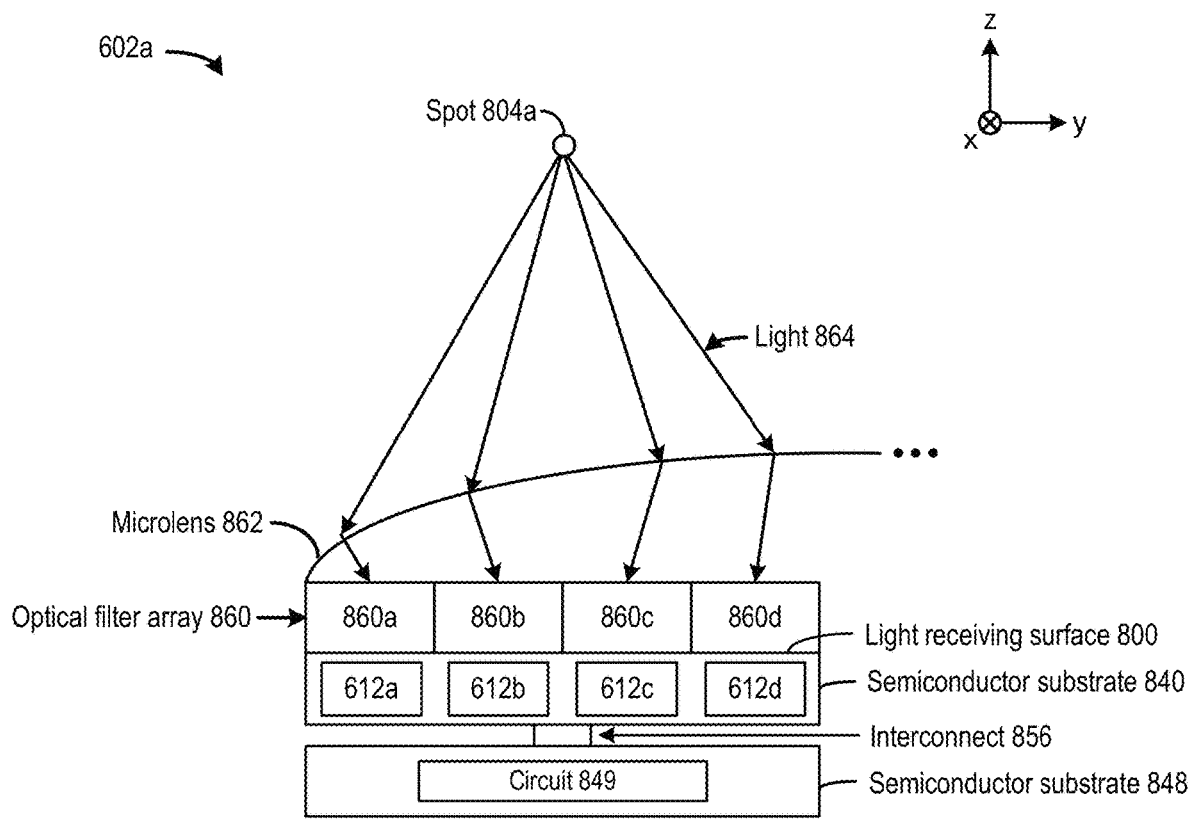
Figure 8B:
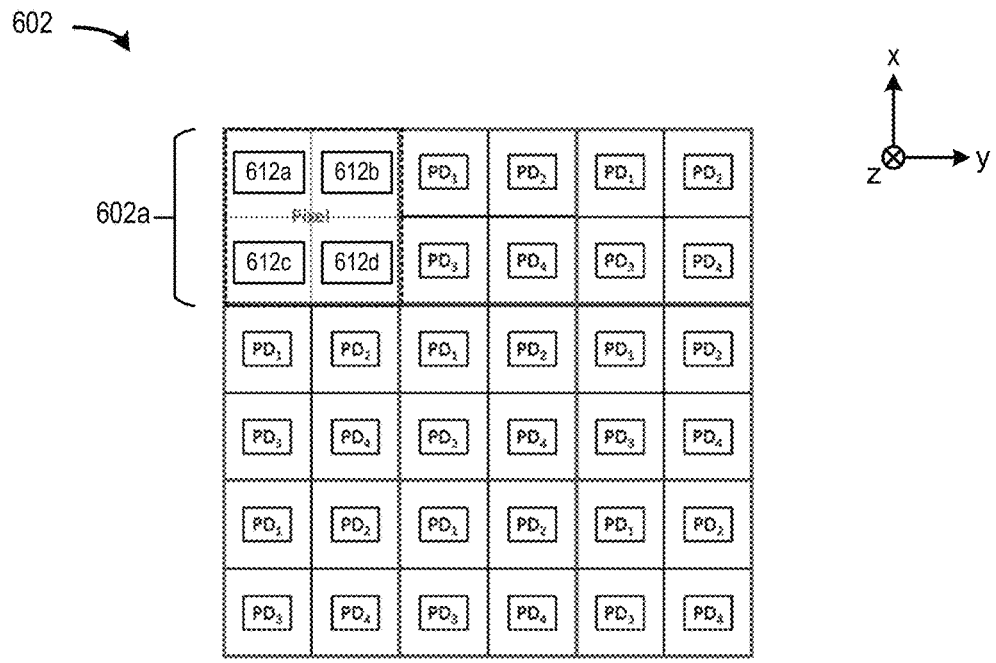
Figure 8C:
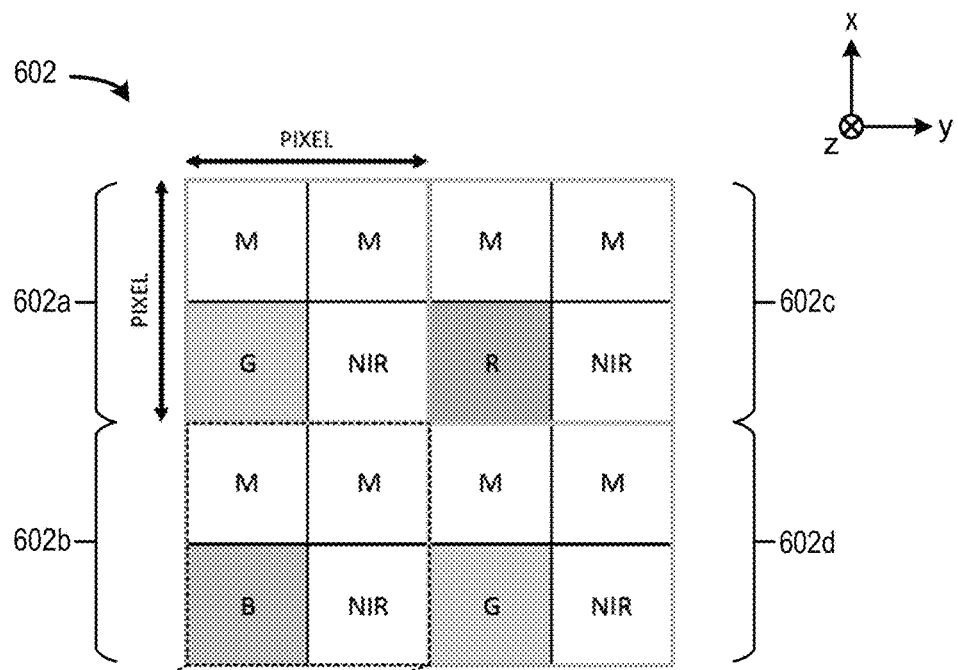
Figure 8C:
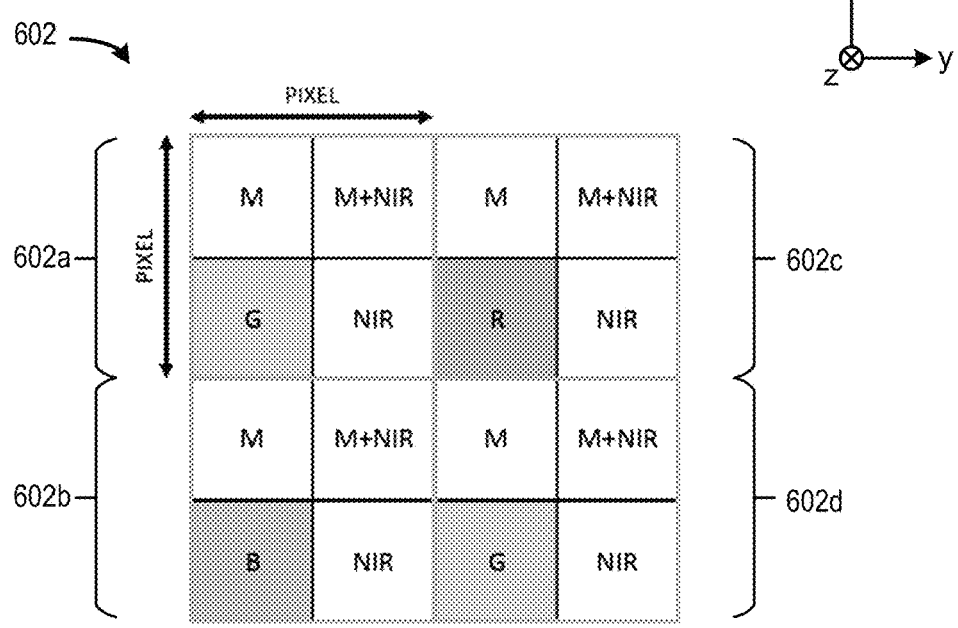
Figure 8D:
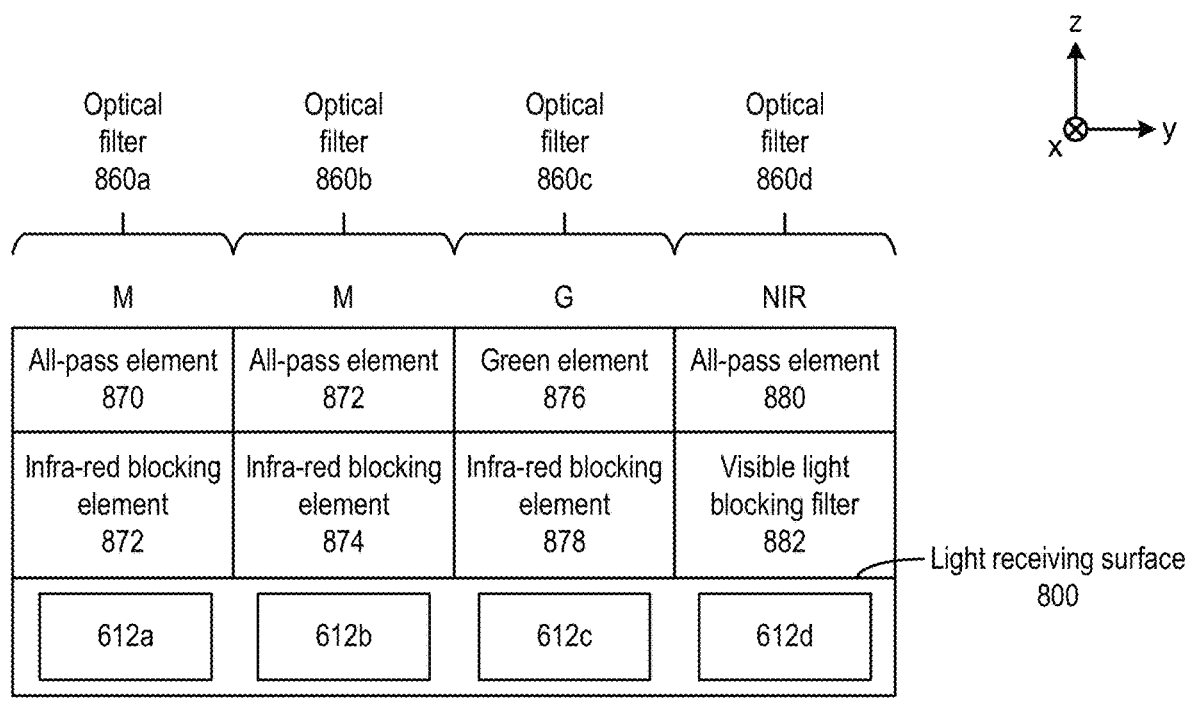
Figure 8D:
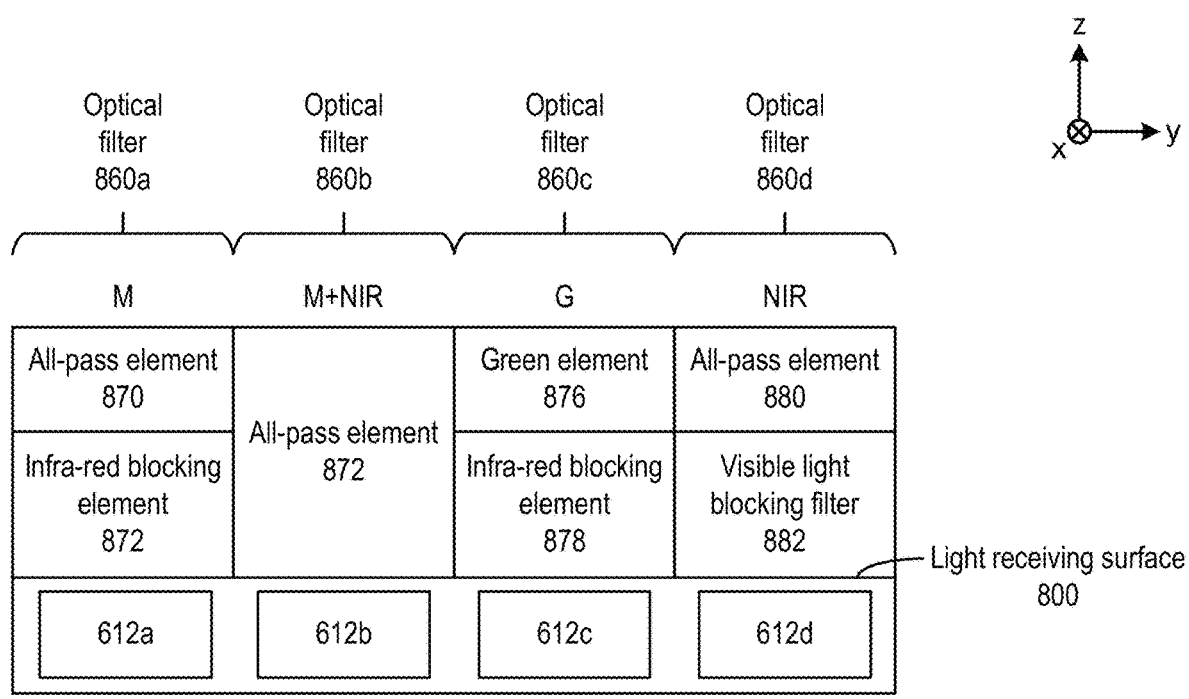

FIG. 8B-FIG. 8D illustrate other example arrangements of photodiodes 612. As shown in FIG. 8B-FIG. 8D, the plurality of photodiodes 612 can be arranged laterally parallel with light receiving surface 800. The top graph of FIG. 8B illustrates a side view of an example of pixel cell 602a, whereas the bottom graph of FIG. 8B illustrates a top view of pixel array 602 including pixel cell 602a. As shown in FIG. 8B, with light receiving surface 800 being parallel with the x and y axes, photodiodes 612a, 612b, 612c, and 612d can be arranged adjacent to each other also along the x and y axes in semiconductor substrate 840. Pixel cell 602a further includes an optical filter array 860 overlaid on the photodiodes. Optical filter array 860 can be part of optical filter 624. Optical filter array 860 can include a filter element overlaid on each of photodiodes 612a, 612b, 612c, and 612d to set a wavelength range of incident light component received by the respective photodiode. For example, filter element 860a is overlaid on photodiode 612a and can allow only visible blue light to enter photodiode 612a. Moreover, filter element 860b is overlaid on photodiode 612b and can allow only visible green light to enter photodiode 612b. Further, filter element 860c is overlaid on photodiode 612c and can allow only visible red light to enter photodiode 612c. Filter element 860d is overlaid on photodiode 612d and can allow only infra-red light to enter photodiode 612d. Pixel cell 602a further includes one or more microlens 862 which can project light 864 from a spot of a scene (e.g., spot 804a) via optical tiler array 860 to different lateral locations of light receiving surface 800, which allows each photodiode to become a sub-pixel of pixel cell 602a and to receive components of light from the same spot corresponding to a pixel. Pixel cell 602a can also include semiconductor substrate 848 which can include circuit 849 (e.g., charge sensing units 614, ADCs 616, etc.) to generate digital values from the charge generated by the photodiodes. Semiconductor substrates 840 and 848 can form a stack and can be connected with interconnect 856.

The arrangements of FIG. 8B, in which the photodiodes are arranged laterally and an optical filter array is used to control the light components received by the photodiodes, can offer numerous advantages. For example, the number of stacks and the number of semiconductor substrates can be reduced, which not only reduce the vertical height but also the interconnects among the semiconductor substrates. Moreover, relying on filter elements rather than the propagation distance of light to set the wavelength ranges of the components absorbed by each photodiode can offer flexibilities in selecting the wavelength ranges. As shown in top graph of FIG. 8C, pixel cells array 602 can include different optical filter arrays 860 for different pixel cells. For example, each pixel cell of pixel cells array 602 can have an optical filter array that provides monochrome channel of a wavelength range of 380-740 nm (labelled with "M") for photodiodes 612a and 612b, and an infra-red channel of a wavelength range of 700-1000 nm (labelled with "NIR") for photodiode 612d. But the optical filter arrays may also provide a different visible color channel for the different pixel cells. For example, the optical filter arrays 860 for pixel cells array 602a, 602b, 602c, and 602d may provide, respectively, a visible green channel (labelled with "G"), a visible red channel (labelled with "R"), a visible blue channel (labelled with "B"), and a visible green channel for photodiode 612c of the pixel cells arrays. As another example, as shown in the bottom graph of FIG. 8C, each optical filter array 860 can provide a monochrome and infra-red channel (labelled "M+NIR") which spans a wavelength range of 380-1000 nm for photodiode 612b of each pixel cells array.

FIG. 8D illustrates examples of optical filter array 860 to provide the example channels shown in FIG. 8C. As shown in FIG. 8D, optical filter array 860 can include a stack of optical filters to select a wavelength range of light received by each photodiode within a pixel cell array. For example, referring to the top graph of FIG. 8D, optical filter 860a can include an all-pass element 870 (e.g., a transparent glass that passes both visible light and infra-red light) and an infra-red blocking element 872 forming a stack to provide a monochrome channel for photodiode 612a. Optical filter 860b can also include an all-pass element 874 and an infra-red blocking element 876 to also provide a monochrome channel for photodiode 612b. Further, optical filter 860c can include a green-pass element 876 which passes green visible light (but reject other visible light component), and an infra-red blocking element 878, to provide a green channel for photodiode 612c. Lastly, optical filter 860d can include an all-pass element 880 and a visible light blocking filter 882 (which can block out visible light but allows infra-red light to go through) to provide an infra-red channel for photodiode 612d. In another example, as shown in the bottom graph of FIG. 8D, optical filter 860b can include only all-pass element 872 to provide a monochrome and infra-red channel for photodiode 612b.

Figure 9A:
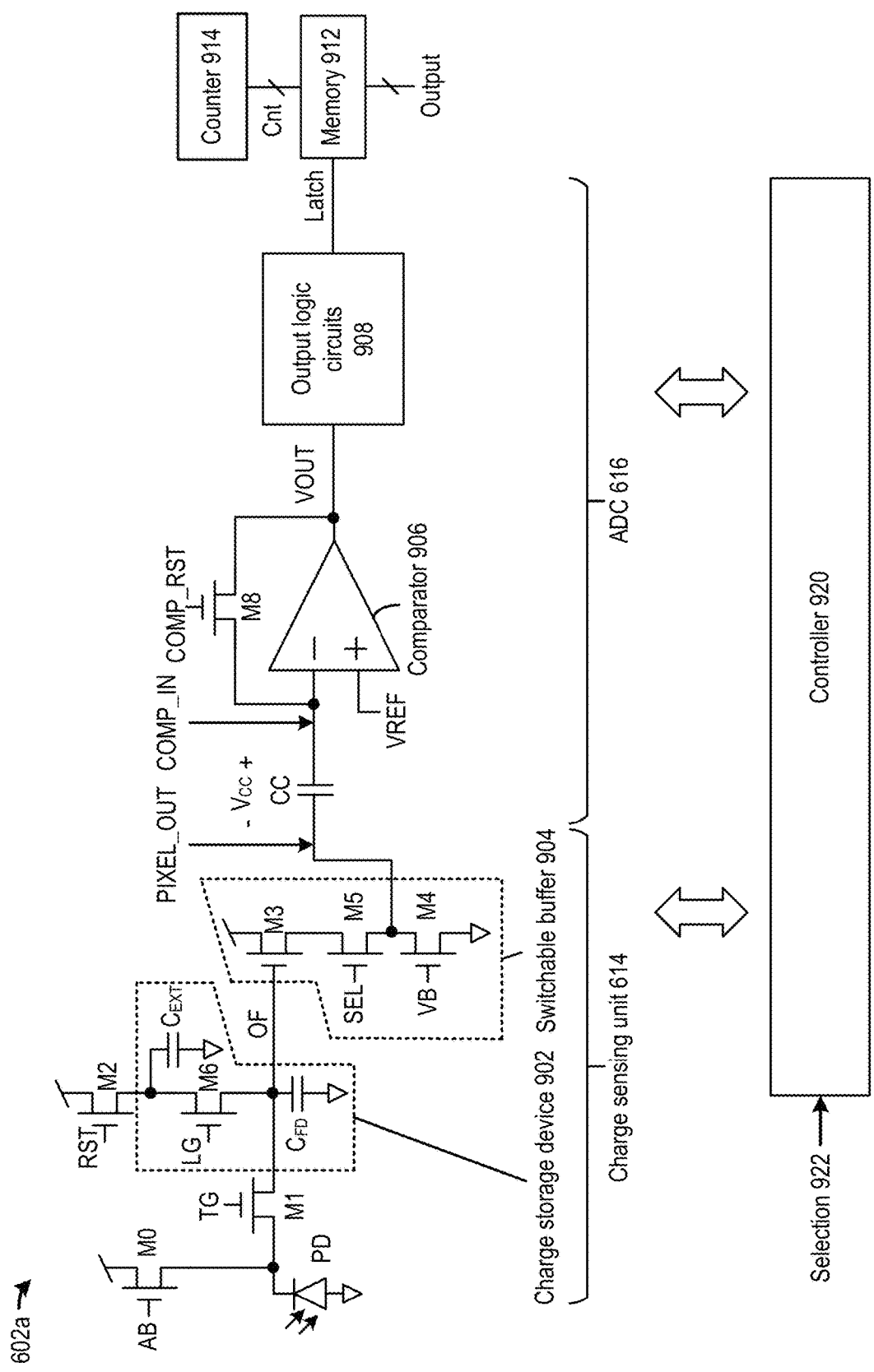
FIG. 9A, FIG. 9B, and FIG. 9C illustrate examples of internal components of the example pixel cells of FIG. 8A, FIG. 8B, FIG. 8C, and FIG. 8D.
Figure 9B:
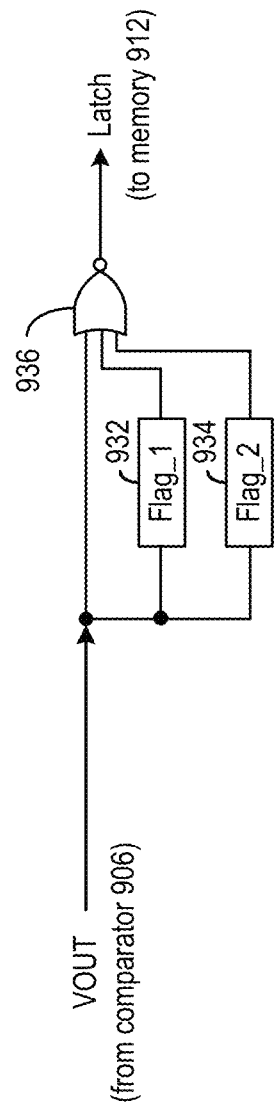
Figure 9C:
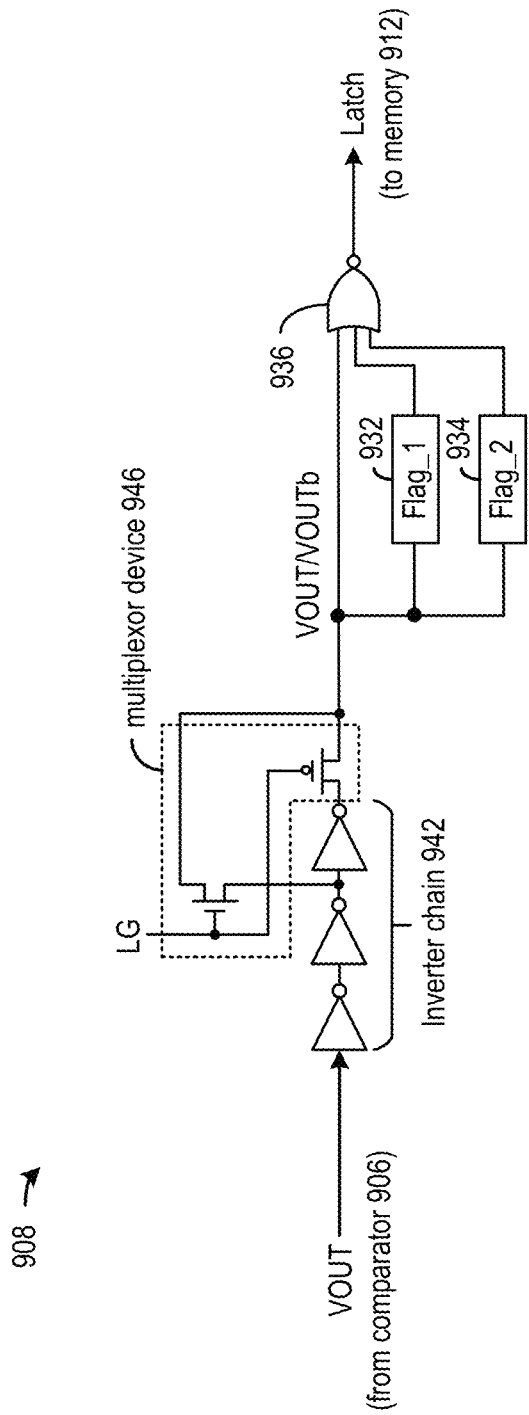

Reference is now made to FIG. 9A-FIG. 9C, which illustrate additional components of pixel cell 602a including an example of charge sensing unit 614 and ADC 616. As shown in FIG. 9A, pixel cell 602a can include a photodiode PD (e.g., photodiode 612a), a shutter switch M0, a transfer switch M1, a charge sensing unit 614 comprising a charge storage device 902 and a switchable buffer 904, and an ADC 616 comprising a CC capacitor, a comparator 906, and output logic circuits 908. The output of comparator 906 is coupled, via output logic circuits 908, with a memory 912 and a counter 914 which can be internal to or external to pixel cell 602a. Pixel cell 602 further includes a controller 920 to control the switches, charge sensing unit 614, as well as ADC 616. Controller 920 can control charge sensing unit 614 and ADC 616 to perform multiple quantization operations associated with different light intensity ranges to generate a digital representation of the intensity of the incident light. Controller 920 can receive a selection signal 924 to select which of the multiple quantization operations to be performed (and which is to be skipped). The selection can come from a host device which hosts an application that uses the digital representation of incident light intensity. Output logic circuits 908 can determine which quantization operation output is to be stored in memory 912 and/or to be output as a pixel value. Controller 920 can be internal to pixel cell 602a or part of sensing controller 640. Each switch can be a transistor such as, for example, a metal-oxide-semiconductor field-effect transistor (MOSFET), a bipolar junction transistor (BJT), etc.

Specifically, shutter switch M0 can be disabled by an AB signal provided by controller 920 to start an exposure period, in which the photodiode PD can generate and accumulate charge in response to incident light. Transfer switch M1 can be controlled by a TG signal provided by controller 920 to transfer some of the charge to charge storage device 902. In one quantization operation, transfer switch M1 can be biased at a partially-on state to set a quantum well capacity of photodiode PD, which also sets a quantity of residual charge stored at the photodiode PD. After the photodiode PD is saturated by the residual charge, overflow charge can flow through transfer switch M1 to charge storage device 902. In another quantization operation, transfer switch M1 can be fully turned on to transfer the residual charge from the photodiode PD to charge storage device for measurement.

Charge storage device 902 has a configurable capacity and can convert the charge transferred from switch M1 to a voltage at the OF node. Charge storage device 902 includes a $C_{FD}$ capacitor (e.g., a floating drain) and a $C_{EXT}$ capacitor (e.g., an MOS capacitor) connected by a M6 switch. M6 switch can be enabled by a LG signal to expand the capacity of charge storage device 902 by connecting $C_{FD}$ and $C_{EXT}$ capacitors in parallel, or to reduce the capacity by disconnecting the capacitors from each other. The capacity of charge storage device 902 can be reduced for measurement of residual charge to increase the charge-to-voltage gain and to reduce the quantization error. Moreover, the capacity of charge storage device 902 can also be increased for measurement of overflow charge to reduce the likelihood of saturation and to improve non-linearity. As to be described below, the capacity of charge storage device 902 can be adjusted for measurement of different light intensity ranges. Charge storage device 902 is also coupled with a reset switch M2 which can be controlled by a reset signal RST, provided by controller 920, to reset $C_{FD}$ and $C_{EXT}$ capacitors between different quantization operations.

Switchable buffer 904 can be include a switch M3 configured as a source follower to buffer the voltage at the OF node to improve its driving strength. The buffered voltage can be at the input node PIXEL_OUT of ADC 616. The M4 transistor provides a current source for switchable buffer 904 and can be biased by a VB signal. Switchable buffer 904 also includes a switch M5 which be enabled or disabled by a SEL signal. When switch M5 is disabled, source follower M3 can be disconnected from the PIXEL_OUT node. As to be described below, pixel cell 602a may include multiple charge sensing units 614 each including a switchable buffer 904, and one of the charge sensing units can be coupled with PIXEL_OUT (and ADC 616) at one time based on the SEL signal.

Figure 10:
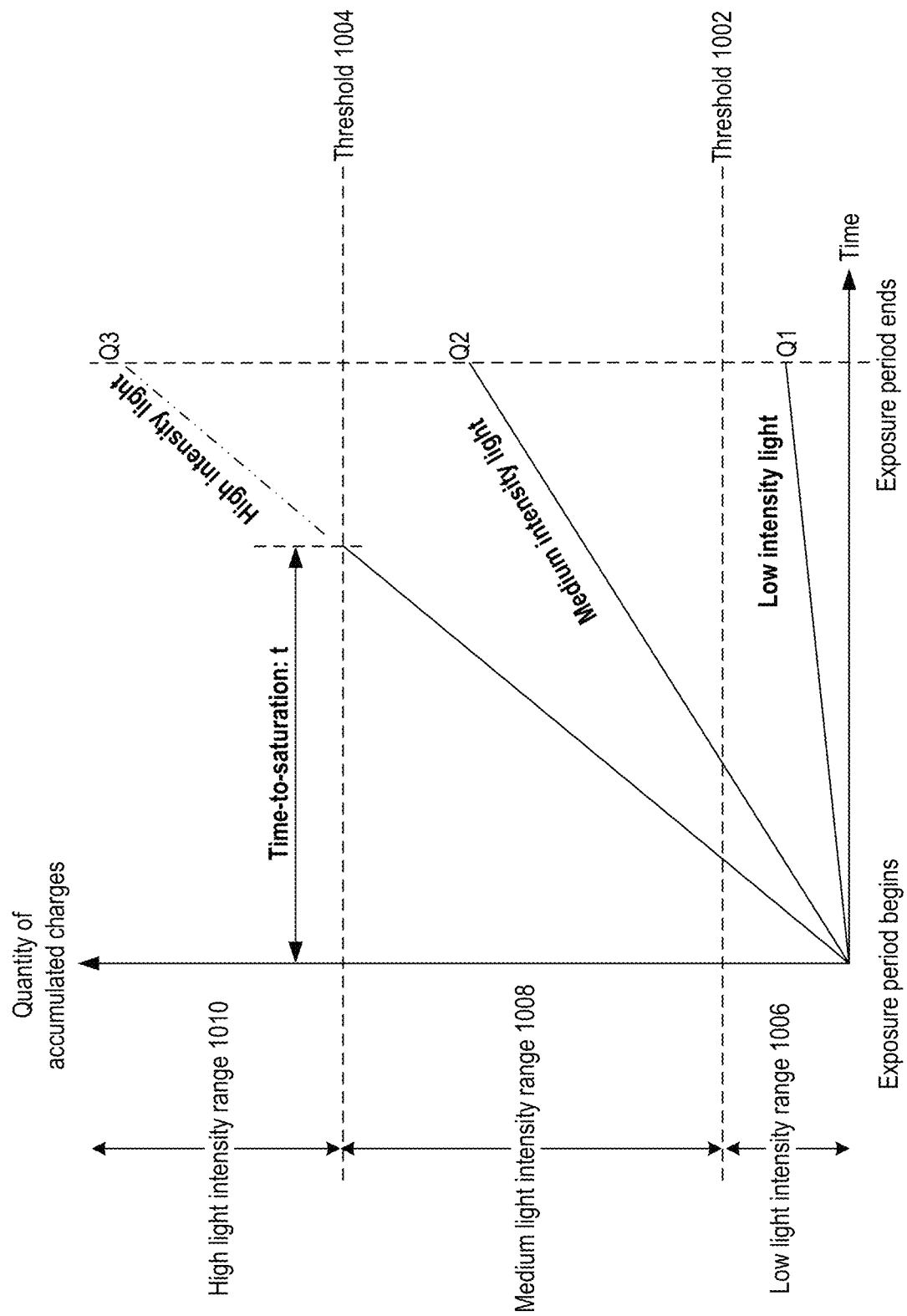
FIG. 10 illustrates an example of ranges of light intensity to be measured by the disclosed techniques.

As described above, charge generated by photodiode PD within an exposure period can be temporarily stored in charge storage device 902 and converted to a voltage. The voltage can be quantized to represent an intensity of the incident light based on a pre-determined relationship between the charge and the incident light intensity. Reference is now made to FIG. 10, which illustrates a quantity of charge accumulated with respect to time for different light intensity ranges. The total quantity of charge accumulated at a particular time point can reflect the intensity of light incident upon photodiode PD of FIG. 6 within an exposure period. The quantity can be measured when the exposure period ends. A threshold 1002 and a threshold 1004 can be defined for a threshold's quantity of charge defining a low light intensity range 1006, a medium light intensity range 1008, and a high light intensity range 1010 for the intensity of the incident light. For example, if the total accumulated charge is below threshold 1002 (e.g., Q1), the incident light intensity is within low light intensity range 1006. If the total accumulated charge is between threshold 1004 and threshold 1002 (e.g., Q2), the incident light intensity is within medium light intensity range 1008. If the total accumulated charge is above threshold 1004, the incident light intensity is within medium light intensity range 1010. The quantity of the accumulated charge, for low and medium light intensity ranges, can correlate with the intensity of the incident light, if the photodiode does not saturate within the entire low light intensity range 1006 and the measurement capacitor does not saturate within the entire medium light intensity range 1008.

The definitions of low light intensity range 1006 and medium light intensity range 1008, as well as thresholds 1002 and 1004, can be based on the full well capacity of photodiode PD and the capacity of charge storage device 902. For example, low light intensity range 706 can be defined such that the total quantity of residual charge stored in photodiode PD, at the end of the exposure period, is below or equal to the storage capacity of the photodiode, and threshold 1002 can be based on the full well capacity of photodiode PD. Moreover, medium light intensity range 1008 can be defined such that the total quantity of charge stored in charge storage device 902, at the end of the exposure period, is below or equal to the storage capacity of the measurement capacitor, and threshold 1004 can be based on the storage capacity of charge storage device 902. Typically threshold 1004 is can be based on a scaled storage capacity of charge storage device 902 to ensure that when the quantity of charge stored in charge storage device 902 is measured for intensity determination, the measurement capacitor does not saturate, and the measured quantity also relates to the incident light intensity. As to be described below, thresholds 1002 and 1004 can be used to detect whether photodiode PD and charge storage device 902 saturate, which can determine the intensity range of the incident light.

In addition, in a case where the incident light intensity is within high light intensity range 1010, the total overflow charge accumulated at charge storage device 902 may exceed threshold 1004 before the exposure period ends. As additional charge is accumulated, charge storage device 902 may reach full capacity before the end of the exposure period, and charge leakage may occur. To avoid measurement error caused due to charge storage device 902 reaching full capacity, a time-to-saturation (TTS) measurement can be performed to measure the time duration it takes for the total overflow charge accumulated at charge storage device 902 to reach threshold 1004. A rate of charge accumulation at charge storage device 902 can be determined based on a ratio between threshold 1004 and the time-to-saturation, and a hypothetical quantity of charge (Q3) that could have been accumulated at charge storage device 902 at the end of the exposure period (if the capacitor had limitless capacity) can be determined by extrapolation according to the rate of charge accumulation. The hypothetical quantity of charge (Q3) can provide a reasonably accurate representation of the incident light intensity within high light intensity range 1010.

Referring back to FIG. 9A, to measure high light intensity range 1010 and medium light intensity range 1008, transfer switch M1 can be biased by TG signal in a partially turned-on state. For example, the gate voltage of transfer switch M1 (TG) can be set based on a target voltage developed at photodiode PD corresponding to the full well capacity of the photodiode. With such arrangements, only overflow charge (e.g., charge generated by the photodiode after the photodiode saturates) will transfer through transfer switch M1 to reach charge storage device 902, to measure time-to-saturation (for high light intensity range 1010) and/or the quantity of charge stored in charge storage device 902 (for medium light intensity range 1008). For measurement of medium and high light intensity ranges, the capacitance of charge storage device 902 (by connecting $C_{EXT}$ and $C_{FD}$) can also be maximized to increase threshold 1004.

Moreover, to measure low light intensity range 1006, transfer switch M1 can be controlled in a fully turned-on state to transfer the residual charge stored in photodiode PD to charge storage device 902. The transfer can occur after the quantization operation of the overflow charge stored at charge storage device 902 completes and after charge storage device 902 is reset. Moreover, the capacitance of charge storage device 902 can be reduced. As described above, the reduction in the capacitance of charge storage device 902 can increase the charge-to-voltage conversion ratio at charge storage device 902, such that a higher voltage can be developed for a certain quantity of stored charge. The higher charge-to-voltage conversion ratio can reduce the effect of measurement errors (e.g., quantization error, comparator offset, etc.) introduced by subsequent quantization operation on the accuracy of low light intensity determination. The measurement error can set a limit on a minimum voltage difference that can be detected and/or differentiated by the quantization operation. By increasing the charge-to-voltage conversion ratio, the quantity of charge corresponding to the minimum voltage difference can be reduced, which in turn reduces the lower limit of a measurable light intensity by pixel cell 602a and extends the dynamic range.

The charge (residual charge and/or overflow charge) accumulated at charge storage device 902 can develop an analog voltage at the OF node, which can be buffered by switchable buffer 904 at PIXEL_OUT and quantized by ADC 616. As shown in FIG. 9A, ADC 616 includes a comparator 906 which can be reset by a switch M8, and output logic circuits 908. ADC 616 is also coupled with memory 912 and counter 914. Counter 914 can generate a set of count values based on a free-running clock signal, whereas memory 912 can be controlled, by comparator 906 via output logic circuits 908, to store a count value (e.g., the latest count value) generated by counter 914. Memory 912 can be, for example, a latch circuit to store the counter value based on local pixel value as described below. The stored count value can be output to represent incident light intensity. Memory 912 can be part of memory 630 of FIG. 6A.

Comparator 906 can compare an analog voltage COMP_IN, which is derived from PIXEL_OUT by the CC capacitor, against a threshold VREF, and generate a decision VOUT based on the comparison result. The CC capacitor can be used in a noise/offset compensation scheme to store the reset noise and comparator offset information in a VCC voltage, which can be added to the PIXEL_OUT voltage to generate the COMP_IN voltage, to cancel the reset noise component in the PIXEL_OUT voltage. The offset component remains in the COMP_IN voltage and can be cancelled out by the offset of comparator 906 when comparator 906 compares the COMP_IN voltage against threshold VREF to generate the decision VOUT. Comparator 906 can generate a logical one for VOUT if the COMP_IN voltage equals or exceeds VREF. Comparator 906 can also generate a logical zero for VOUT if the COMP_IN voltage falls below VREF. VOUT can control a latch signal which controls memory 912 to store a count value from counter 914.

Figure 11B:
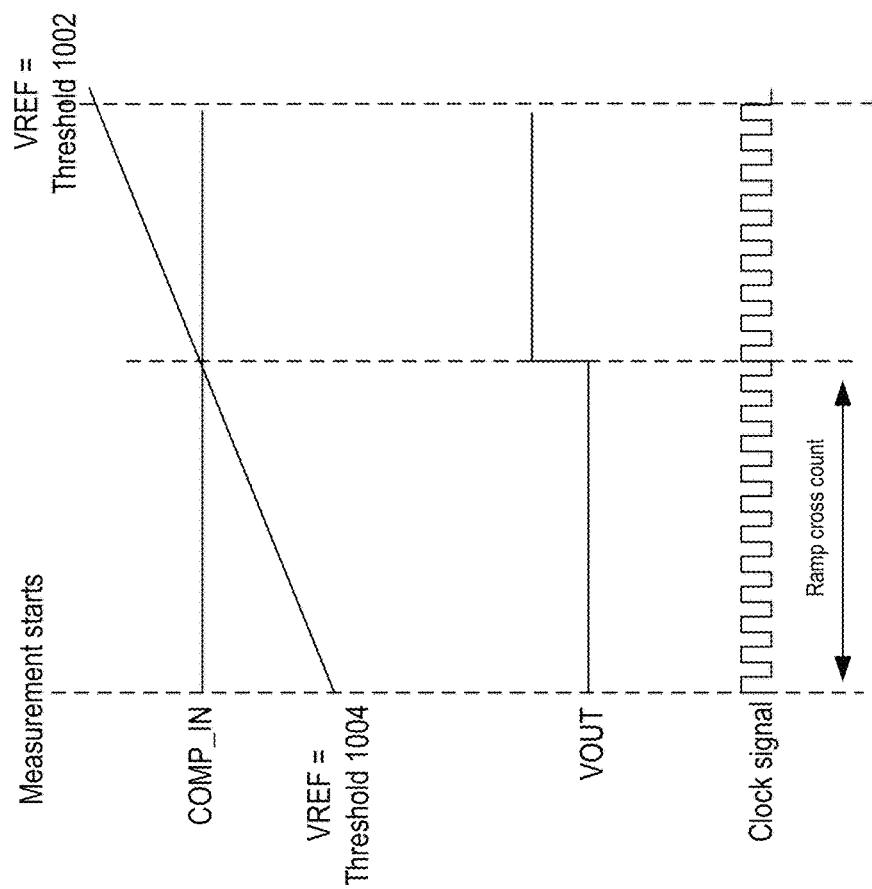
FIG. 11A, FIG. 11B, FIG. 11C, and FIG. 11D illustrate example methods for determining a light intensity.
Figure 11A:
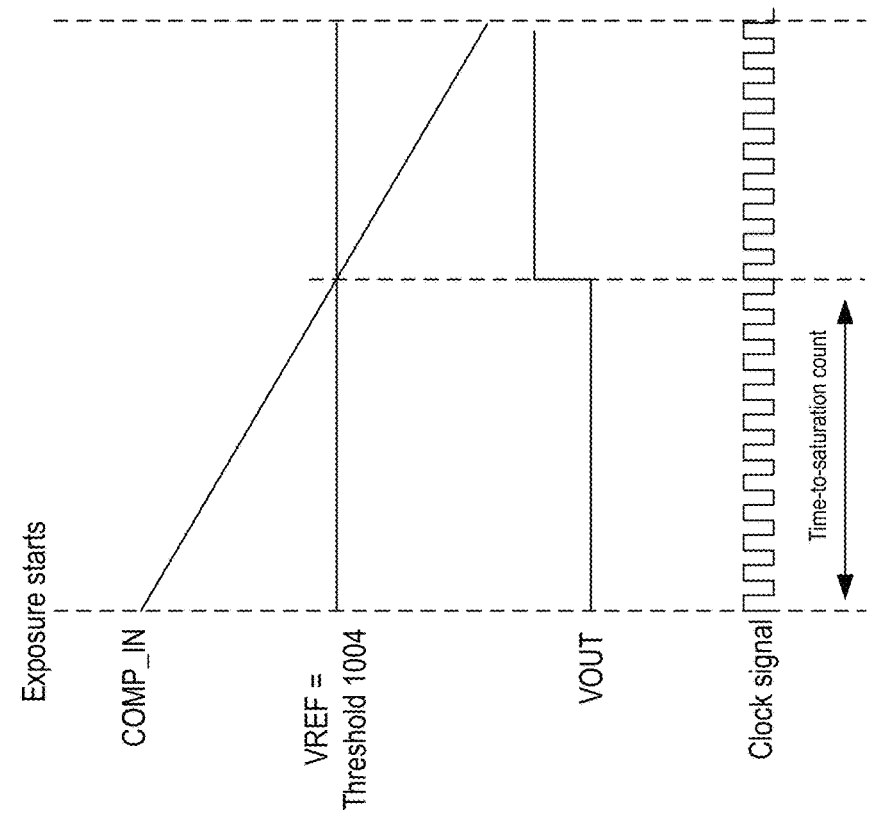

FIG. 11A illustrates an example of time-to-saturation measurement by ADC 616. To perform the time-to-saturation measurement, a threshold generator (which can be external to pixel cell 602a) can generate a fixed VREF. Fixed VREF can be set at a voltage corresponding a charge quantity threshold for saturation of charge storage device 902 (e.g., threshold 1004 of FIG. 10). Counter 914 can start counting right after the exposure period starts (e.g., right after shutter switch M0 is disabled). As the COMP_IN voltage ramps down (or up depending on the implementation) due to accumulation of overflow charge at charge storage device 902, clock signal keeps toggling to update the count value at counter 914. The COMP_IN voltage may reach the fixed VREF threshold at a certain time point, which causes VOUT to flip from low to high. The change of VOUT may stop the counting of counter 914, and the count value at counter 914 may represent the time-to-saturation.

FIG. 11B illustrates an example of measurement of a quantity of charge stored at charge storage device 902. After measurement starts, the threshold generator can generate a ramping VREF, which can either ramp up (in the example of FIG. 11B) or ramp down depending on implementation. The rate of ramping can be based on the frequency of the clock signal supplied to counter 914. In a case where overflow charge is measured, the voltage range of ramping VREF can be between threshold 1004 (charge quantity threshold for saturation of charge storage device 902) and threshold 1002 (charge quantity threshold for saturation of photodiode PD), which can define the medium light intensity range. In a case where residual charge is measured, the voltage range of the ramping VREF can be based on threshold 1002 and scaled by the reduced capacity of charge storage device 902 for residual charge measurement. In the example of FIG. 11B, the quantization process can be performed with uniform quantization steps, with VREF increasing (or decreasing) by the same amount for each clock cycle. The amount of increase (or decrease) of VREF corresponds to a quantization step. When VREF reaches within one quantization step of the COMP_IN voltage, VOUT of comparator 906 flips, which can stop the counting of counter 914, and the count value can correspond to a total number of quantization steps accumulated to match, within one quantization step, the COMP_IN voltage. The count value can become a digital representation of the quantity of charge stored at charge storage device 902, as well as the digital representation of the incident light intensity.

Referring back to FIG. 9A, controller 920 can, based on selection 922, perform a TTS quantization operation, a quantization operation to measure a quantity of overflow charge (herein after, "FD ADC" operation), and a quantization operation to measure a quantity of residual charge (hereinafter "PD ADC" operation). The TTS quantization operation can be based on the scheme described in FIG. 11A, whereas the PD ADC and FD ADC quantization operations can be based on the scheme described in FIG. 11B. Controller 920 can also skip one or more of the quantization operations. Output logic circuits 908 can determine which of the quantization operations to store the count value in memory 912. Specifically, referring to FIG. 9B, output logic circuits 908 include a set of registers 932 and 934 to store the decision outputs of the quantization operations as FLAG_1 and FLAG_2 signals. Based on the FLAG_1 and FLAG_2 signals, controller 920 can select the count value output in one of the three phases to represent the incident light intensity. The selected count value can be stored in memory 912, and memory 912 can be locked based on a combination of the FLAG_1 and FLAG_2 signals by NOR gate 936 to prevent subsequent measurement phases from overwriting the selected ADC code output in memory 912. At the end of the three-phase measurement process, controller 920 can retrieve the count value stored in memory 912 and provide the count value as the digital output representing the incident light intensity. In some examples, referring to FIG. 9C, the polarity of comparison by comparator 906 can be opposite between PD ADC and TTS/FD ADC operations, as to be described in details below. In such examples, output logic circuits 908 may further include, in addition to register 932 and 934 and NOR gate 936, an inverter chain 942 and a multiplexor device 946. Multiplexor device 946 can be controlled by a selection signal that toggles based on whether TTS/FD ADC or PD ADC operation is performed, such as the LG signal, to either output VOUT or VOUTb from different tap points of inverter chain 942 to registers 932 and 934 and NOR gate 936.

Figure 11C:
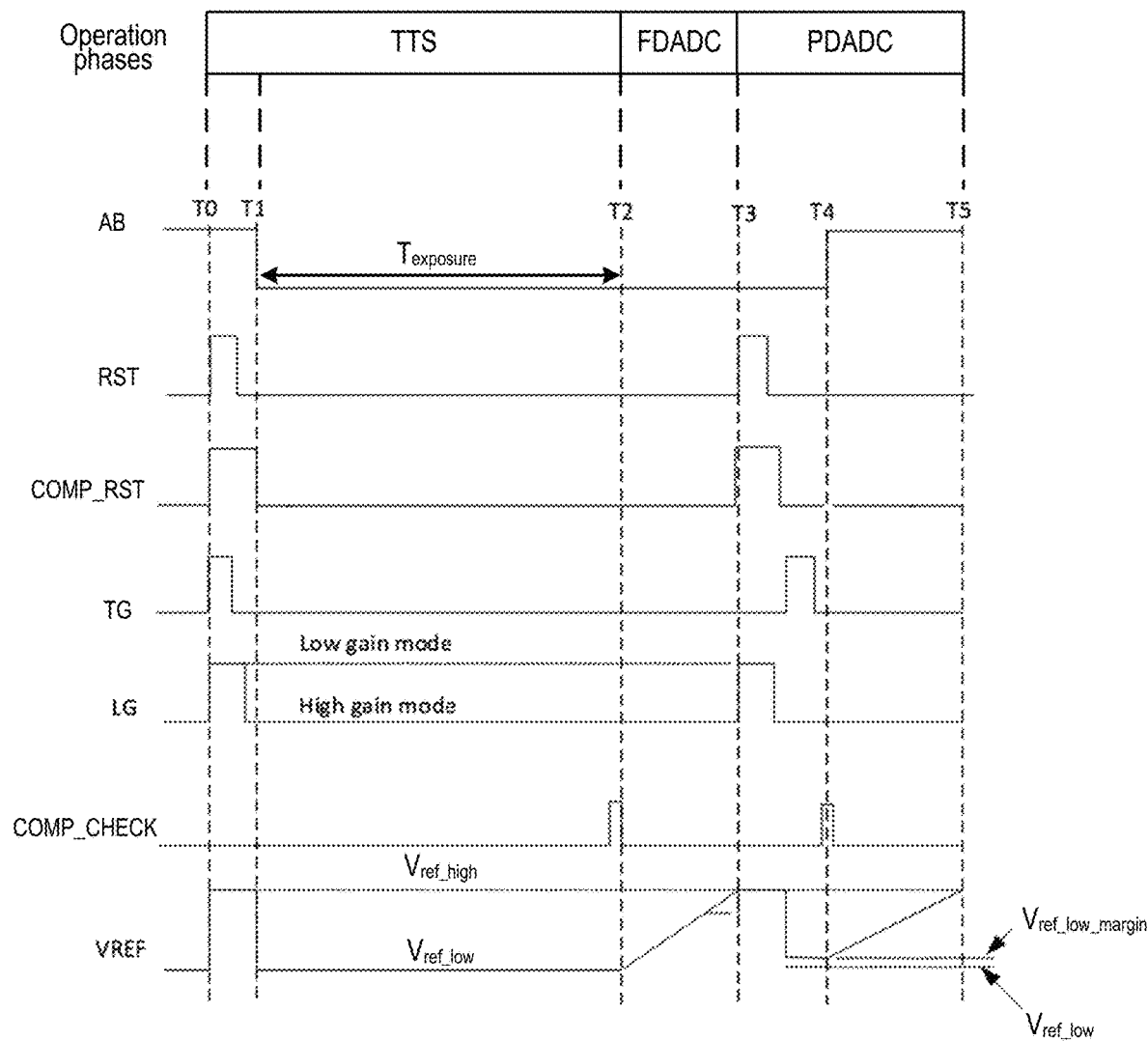

Reference is now made to FIG. 11C, which illustrate an example sequence of control signals of pixel cell 602a including the output logic circuits 908 of FIG. 9B. The example sequence of control signals can be generated by controller 920 and can include TTS, FD ADC, and PD ADC operations based on selection 922. FIG. 11C illustrates the change of AB, RST, COMP_RST, TG, LG, and VREF with respect to time. Referring to FIG. 11C, the period between times T0 and T1 can correspond to a first reset phase, in which charge storage device 902 and comparator 906 can be put in a reset state by controller 920 by asserting the RST and COMP_RST signals, while the shutter signal AB can be asserted to prevent charge generated by photodiode PD from reaching charge storage device 902. Both RST and LG signals are asserted to reset $C_{FD}$ and $C_{EXT}$ capacitors to set PIXEL_OUT at the reset level. With COMP_RST signal asserted and the positive terminal of comparator 906 connected to $V_{ref\_high}$, COMP_IN can be set to a sum of $V_{ref\_high}$ and comparator offset $V_{comp\_offset}$. Moreover, with RST signal asserted, PIXEL_OUT can be set the reset voltage $V_{pixel\_out\_rst}$ and can include reset noise $V\sigma_{KTC}$. A first sampling operation can be performed by the CC cap to store a $V_{CC}$ voltage including the components of the comparator offset, the reset noise, and PIXEL_OUT voltage at the reset level, as follows:

$$V_{cc}(T1)=(V_{ref\_high}+V_{comp\_offset})-(V_{pixel\_out\_rst}+V\sigma_{KTC}) \quad \text{(Equation 1)}$$

At time T1, the RST signal, the AB signal, and the COMP_RST signal are released, which starts an exposure period (labelled $T_{exposure}$) in which photodiode PD can accumulate and transfer charge. Exposure period $T_{exposure}$ can end at time T2. Between times T1 and T3, TG signal can set transfer switch M1 in a partially turned-on state to allow PD to accumulate residual charge before photodiode PD saturates. If the light intensity in the medium or high intensity ranges of FIG. 10, photodiode PD can saturate and transfer overflow charge via transfer switch M1. LG signal can remain asserted to operate in low gain mode, in which both $C_{FD}$ capacitor and $C_{EXT}$ capacitor are connected in parallel to form charge storage device 902 to store the overflow charge. The overflow charge develops a new PIXEL_OUT voltage, $V_{pixel\_out\_sig1}$. The CC capacitor can AC couple the new PIXEL_OUT voltage $V_{pixel\_out\_sig1}$ into COMP_IN voltage by adding the $V_{CC}$ voltage, which includes the reset noise and comparator offset component. The new PIXEL_OUT voltage also includes reset noise, which can be cancelled by the reset noise component of the $V_{CC}$ voltage. The COMP_IN voltage at time Tx between times T1 and T3 can be as follows:

$$V_{comp\_in}(Tx)=V_{pixel\_out\_sig1}-V_{pixel\_out\_rst}+V_{ref\_high}+V_{comp\_offset} \quad \text{(Equation 2)}$$

In Equation 2, the difference between $V_{pixel\_out\_sig1}-V_{pixel\_out\_rst}$ represents the quantity of overflow charge stored in charge storage device 902. The comparator offset in the COMP_IN voltage can also cancel out the comparator offset introduced by comparator 906 when performing the comparison.

Between times T1 and T3, two phases of measurement of the COMP_IN voltage can be performed, including a time-to-saturation (TTS) measurement phase for high light intensity range 1010 and an FD ADC phase for measurement of overflow charge for medium light intensity 1008. Between times T1 and T2 ($T_{exposure}$) the TTS measurement can be performed by comparing COMP_IN voltage with a static $V_{ref\_low}$ representing a saturation level of charge storage device 902 by comparator 906. When PIXEL_OUT voltage reaches the static VREF, the output of comparator 906 (VOUT) can trip, and a count value from counter 914 at the time when VOUT trips can be stored into memory 912. At or before time T2, output logic circuits 908 can determine the state of VOUT of comparator 906 at the end of the TTS phase, and can assert FLAG_1 signal if VOUT is asserted. The assertion of the FLAG_1 signal can indicate that charge storage device 902 saturates and can prevent subsequent measurement phases (FD ADC and PD ADC) from overwriting the count value stored in memory 912. The count value from TTS can then be provided to represent the intensity of light received by the photodiode PD during the integration period.

Between times T2 and T3 (labelled $T_{FDADC}$), the FD ADC operation can be performed by comparing COMP_IN voltage with a ramping VREF voltage that ramps from $V_{ref\_low}$ to $V_{ref\_high}$, which represents the saturation level of photodiode PD (e.g., threshold 1002), as described in FIG. 10. If VOUT of comparator 906 trips during FD ADC, the count value of counter 914 at the time when VOUT trips can be stored in memory 912, if FLAG_1 is low which indicates that charge storage device 902 does not saturate. Although exposure period ends at time T2, between times T2 and T3 the photodiode PD remains capable of accumulating residual charge (if not saturated) or transferring overflow charge to charge storage device 902. As a result, additional charge can accumulate at charge storage device 902 or at the photodiode PD between times T2 and T3 after the TTS operation. The additional charge can introduce motion blurring and distortions when imaging a bright, fast moving object similar to a rolling shutter operation, which can reduce the shutter efficiency of the image sensor.

Between times T3 and T5 (labelled TPDADC), the PD ADC operation can be performed. Between times T3 and T4 can be the second reset phase, in which both RST and COMP_RST signals are asserted to reset charge storage device 902 (comprising the parallel combination of $C_{FD}$ capacitor and $C_{EXT}$ capacitor) and comparator 906 to prepare for the subsequent PD ADC operation. The $V_{CC}$ voltage can be set according to Equation 1.

After RST and COMP_RST are released, LG is turned off to disconnect $C_{EXT}$ from $C_{FD}$ to increase the charge-to-voltage conversion rate for the PD ADC operation. TG is set at a level to fully turn on the M1 transfer switch to transfer the residual charge stored in the photodiode PD to $C_{FD}$. The residual charge develops a new PIXEL_OUT voltage, $V_{pixel\_out\_sig2}$. The CC capacitor can AC couple the new PIXEL_OUT voltage $V_{pixel\_out\_sig2}$ into COMP_IN voltage by adding the $V_{CC}$ voltage. Between times T3 and T4, the photodiode PD remains capable of generating additional charge in addition to the charge generated between times T1 to T3, and transferring the additional charge to charge storage device 902. The $V_{pixel\_out\_sig2}$ also represents the additional charge transferred between times T3 and T4. At time T4, the COMP_IN voltage can be as follows:

$$V_{comp\_in}(T4) = V_{pixel\_out\_sig2} - V_{pixel\_out\_rst} + V_{ref\_high} + V_{comp\_offset} \quad \text{(Equation 3)}$$

In Equation 3, the difference between $V_{pixel\_out\_sig2} - V_{pixel\_out\_rst}$ represents the quantity of charge transferred by the photodiode to charge storage device 902 between times T3 and T4. The comparator offset in the COMP_IN voltage can also cancel out the comparator offset introduced by comparator 906 when performing the comparison.

At time T4, the AB signal is asserted to prevent the photodiode PD from accumulating and transferring additional charge. Moreover, VREF can be set a static level $V_{ref\_low\_margin}$. Comparator 906 can compare the COMP_IN voltage with $V_{ref\_low\_margin}$ to determine whether the photodiode PD saturates. $V_{ref\_low\_margin}$ is slightly higher than $V_{ref\_low}$, which represents the saturation level of photodiode PD (e.g., threshold 1002), to prevent false tripping of comparator 906 when the quantity of residual charge is close to but does not exceed the saturation level. Output logic circuits 908 can determine the state of VOUT of comparator 906 and can assert FLAG_2 if VOUT is asserted to indicate that photodiode PD saturates. If the FLAG_2 is asserted, memory 912 can be locked to preserve the count value stored in memory 912 (from FD ADC) and prevents memory 912 from be overwritten by the subsequent PD ADC operation.

Between times T4 and T5, controller 920 can perform the PD ADC operation by comparing the COMP_IN voltage with a VREF ramp that starts from $V_{ref\_low\_margin}$ to $V_{ref\_high}$. In PD ADC phase, $V_{ref\_high}$ can represent the minimum detectable quantity of residual charge stored in photodiode PD, whereas $V_{ref\_low\_margin}$ can represent the saturation threshold of photodiode PD with margin to account for dark current, as described above. If neither FLAG_1 nor FLAG_2 is asserted prior to PD ADC, the count value obtained when comparator 906 trips during PD ADC can be stored into memory 912, and the count value from PD ADC can be provided to represent the intensity of light.

Although FIG. 11C shows TTS, FD ADC and PD ADC operations are performed, it is understood that ADC 616 (and pixel cell 602a) needs not perform all of these operations, and can skip some of them based on selection 922. As to be described below, the quantization operations may vary for different photodiodes within pixel cell 602a.

Figure 11D:
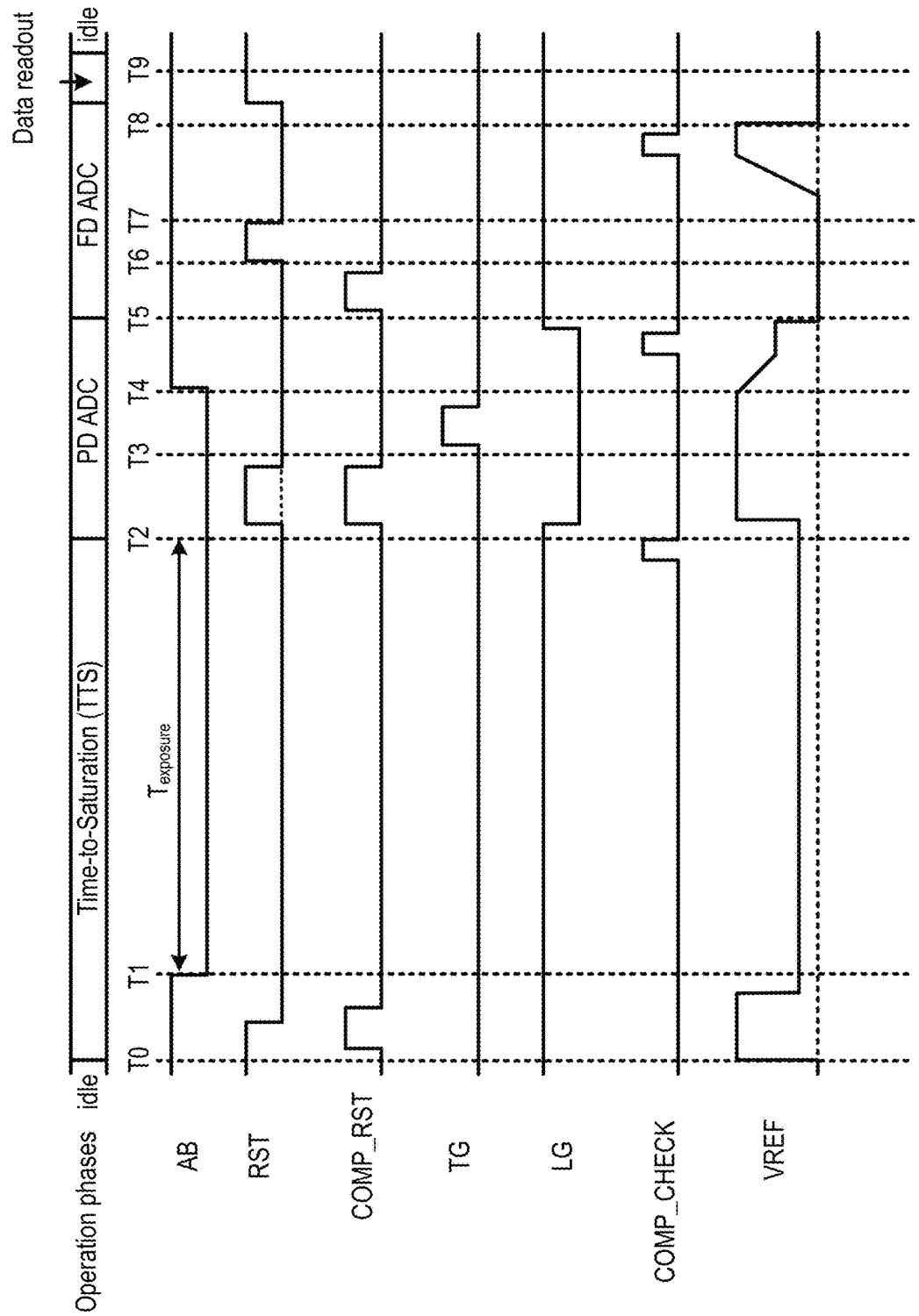

Reference is now made to FIG. 11D, which illustrate another example sequence of the control signals of pixel cell 602a generated by controller 920. In FIG. 11D, PD ADC operation can be performed between the TTS and FD ADC operations, which can reduce the accumulation of additional charge in charge storage device 902 or in the photodiode PD after the TTS operation and improve shutter efficiency. As shown in FIG. 11D, between times T0 and T1 is a first reset phase as in FIG. 11C, in which both charge storage device 608 and comparator 906 can be put in a reset state by controller 1110 by asserting the RST and COMP_RST signals. Moreover, LG signal is asserted, which allows $C_{FD}$ and $C_{EXT}$ capacitors to be reset by the RST signal and the PIXEL_OUT signal is set at the reset level. With COMP_RST signal asserted and the positive terminal of comparator 906 connected to $V_{ref\_high}$, COMP_IN can be set to a sum of $V_{ref\_high}$ and comparator offset $V_{comp\_offset}$. Moreover, with RST signal asserted, PIXEL_OUT can be set the reset voltage $V_{pixel\_out\_rst}$ and can include reset noise $V\sigma_{KTC}$. A first sampling operation can be performed by the CC cap to store a $V_{CC}$ voltage including the components of the comparator offset, the reset noise, and PIXEL_OUT voltage at the reset level, as described in Equation 1 above:

$$V_{cc}(T1) = (V_{ref\_high} + V_{comp\_offset}) - (V_{pixel\_out\_rst} + V\sigma_{KTC}) \quad \text{(Equation 1)}$$

Moreover, shutter signal AB can be asserted to prevent charge generated by photodiode PD from reaching charge storage device 608.

At time T1, the AB, COMP_RST, and the RST signals are released, which starts an exposure period (labelled $T_{exposure}$) in which photodiode PD can accumulate and transfer charge. TG signal can set transfer switch M1 in a partially turned-on state to allow PD to transfer overflow charge to charge storage device 608. LG signal can remain asserted to operate in low gain mode, in which both $C_{FD}$ capacitor and $C_{EXT}$ capacitor are connected in parallel to form charge storage device 608 to store the overflow charge. The overflow charge develops a new PIXEL_OUT voltage, $V_{pixel\_out\_sig1}$. The CC capacitor can AC couple the PIXEL_OUT voltage to become the COMP_IN voltage. The COMP_IN voltage between times T1 and T2 can be set based on Equation 1 above.

Between times T1 and T2, a time-to-saturation (TTS) measurement can be performed by comparator 906 comparing COMP_IN voltage with a static $V_{ref\_low}$ to generate VOUT. At time T2, when controller 1110 determines the state of VOUT of comparator 906. The state of VOUT can be provided to output logic circuits 908, which can generate a latch signal to control memory 912 to store a count value from counter 914 if VOUT indicates that COMP_IN voltage reaches $V_{ref\_low}$, which in turn indicates that charge storage device 902 is saturated. Output logic circuits 908 can also store in its internal state (e.g., FLAG_2) that charge storage device 902 is saturated to prevent the subsequent PD ADC and FD ADC operations from overwriting the TTS output in memory 912. On the other hand, if charge storage device 902 is not saturated, no count value will be stored in memory 912 at time T2, and count values from subsequent PD ADC or FD ADC operation can be stored into memory 912.

Following the TTS measurement, between times T2 and T5, the PD ADC operation can be performed to measure the residual charge stored in the photodiode PD. The LG signal is de-asserted to disconnect $C_{EXT}$ from $C_{FD}$ to increase charge-to-voltage conversion ratio, as described above. The overflow charge (if any) is divided between $C_{FD}$ and $C_{EXT}$ based on a ratio of capacitances between $C_{FD}$ and $C_{EXT}$ such that $C_{FD}$ stores a first portion of the overflow charge and $C_{EXT}$ stores a second portion of the overflow charge. $V_{pixel\_out\_sig1}$ can correspond to the first portion of the overflow charge stored in $C_{FD}$.

To prepare for the PD ADC operation, between times T2 and T3, COMP_RST signal is asserted again to reset comparator 906. The resetting of comparator 906 can set a new $V_{CC}$ voltage across the CC capacitor based on a difference between $V_{pixel\_out\_sig1}$ and the output of comparator 906 in the reset state, as follows:

$$V_{cc}(T2)=(V_{ref\_high}+V_{comp\_offset})-(V_{pixel\_out\_sig1}(T3)+V\sigma_{KTC}) \quad \text{(Equation 4)}$$

Optionally, the RST signal can be asserted between times T2 and T3 to reset $C_{FD}$ and to remove the first portion of the overflow charge, prior to the transfer of the residual charge. This allows the subsequent PD ADC operation to quantize only the residual charge rather than a mixture of the residual charge and the first portion of the overflow charge. Such arrangements can improve the accuracy of measurement of low light intensity as there is no need to remove the overflow charge component (based on the result of the subsequent FD ADC operation) from the PD ADC operation output which could otherwise introduce additional errors. On the other hand, not asserting the RST signal between times T2 and T3 can be advantageous, as such arrangements can introduce redundancy in the PD ADC and FD ADC operations and increase the signal-to-noise ratio, as both operations measure a mixture of residual and overflow charge.

Between times T3 and T4, COMP_RST signal is released so that comparator 906 exits the reset state. Moreover, the TG signal can set transfer switch M1 in a fully turned-on state to transfer the residual charge to $C_{FD}$. The residual charge can be transferred to $C_{FD}$, which changes the PIXEL_OUT voltage to $V_{pixel\_out\_sig2}$. The new PIXEL_OUT voltage can be AC coupled into a new COMP_IN voltage at time T4, as follows:

$$V_{comp\_in}(T4)=V_{pixel\_out\_sig2}-V_{pixel\_out\_sig1}-V_{ref\_high}+V_{comp\_offset} \quad \text{(Equation 5)}$$

In Equation 5, the difference between $V_{pixel\_out\_sig2}$ $V_{pixel\_out\_sig1}$ represents the quantity of residual charge transferred by the photodiode to charge storage device 608 between times T3 and T4.

After TG is fully turned-on between times T3 and T4, the TG is de-asserted to disconnect the photodiode PD from $C_{FD}$ and $C_{EXT}$. As a result, no additional charge is transferred to $C_{FD}$ and $C_{EXT}$ after time T4 until the start of next exposure period. Compared with the arrangements of FIG. 11C where additional charge can be accumulated in the photodiode PD during the FD ADC operation which typically takes a long time, in FIG. 11D the additional charge is accumulated only during the reset period T2-T3 and the transfer period T3-T4, both of which are typically much shorter than a FD ADC operation. Moreover, after T4, no additional overflow charge is accumulated at charge storage device 902. As a result, both FD ADC and PD ADC can process charge accumulated in almost the same exposure period as the TTS operation, which can improve the shutter efficiency of the image sensor.

Between times T4 and T5, controller 1110 can perform the PD ADC operation by comparing the COMP_IN voltage with a VREF ramp that starts from $V_{ref\_high}$ to $V_{ref\_low\_margin}$. In PD ADC phase, $V_{ref\_high}$ can represent the minimum detectable quantity of residual charge stored in photodiode PD, whereas $V_{ref\_low\_margin}$ can represent the saturation threshold of photodiode PD with margin to account for dark current, as described above.

At time T5, controller 1110 can check whether the COMP_IN voltage falls below $V_{ref\_low\_margin}$, which can indicate whether the photodiode PD saturates. If the COMP_IN voltage goes above $V_{ref\_low\_margin}$ (which indicates the photodiode PD saturates), and if no TTS output is stored in the memory (based on the internal state of output logic circuits 908), output logic circuits 908 can generate a latch signal to control memory 912 to store a count value from counter 914. Output logic circuits 908 can also store, as part of its internal state, the indication that the photodiode PD saturates (e.g., FLAG_1), so that the subsequent FD ADC operation will not be able to overwrite the PD ADC output (or TTS output) stored in the memory. If the COMP_IN voltage falls below $V_{ref\_low\_margin}$, no count value will be stored into memory 912 at time T5, and a count value from a subsequent FD ADC operation can be stored into memory 912.

Between times T5 and T8, a FD ADC operation can be made to measure the overflow charge transferred by the photodiode PD within the exposure period $T_{exposure}$. As photodiode PD remains disconnected from $C_{FD}$ and $C_{EXT}$, no additional charge is transferred to $C_{FD}$ and $C_{EXT}$, and the total charge stored in $C_{FD}$ and $C_{EXT}$ is mostly generated in the exposure period $T_{exposure}$, together with additional charge generated by the photodiode between times T3 and T4.

At time T5, the LG signal is asserted to connect $C_{FD}$ with $C_{EXT}$, which allows the second portion of the overflow charge stored in $C_{EXT}$ to combine with the residual charge stored in $C_{FD}$ (and the first portion of the overflow charge if RST is not asserted between times T2 and T3), and a new PIXEL_OUT voltage $V_{pixel\_out\_sig3}$ can develop at the parallel combination of $C_{FD}$ and $C_{EXT}$ and is to be quantized.

Between times T5 and T7, a noise sampling operation can be performed to mitigate the effect of reset noise and comparator offset on the FD ADC operation. Between times T5 and T6, comparator 906 can be reset as part of the first sampling operation. The positive terminal of comparator 906 is connected to the lower end of VREF, $V_{ref\_low}$. The $V_{CC}$ voltage can include components of reset noise and comparator offset as described above. The $V_{CC}$ voltage can be as follows:

$$V_{cc}(T5)=(V_{ref\_low}+V_{comp\_offset})-(V_{pixel\_out\_sig3}+V\sigma_{KTC1}) \quad \text{(Equation 6)}$$

Between times T6 and T7, both $C_{FD}$ and $C_{EXT}$ can be reset, while comparator 906 exits the reset state, as part of a second sampling operation. As a result of resetting, PIXEL_OUT can be reset to a reset voltage $V_{pixel\_out\_rst}$. Moreover, second reset noise charge is also introduced into charge storage device 608, which can be represented by $V\sigma_{KTC2}$. The second reset noise charge typically tracks the first reset noise charge. At time T6, as the result of the second sampling operation, $V_{pixel\_out}$ can be as follows:

$$V_{pixel\_out}(T6)=V_{pixel\_out\_rst}+V\sigma_{KTC2} \quad \text{(Equation 7)}$$

At time T7, COMP_RST is released, and comparator 906 exits the reset state. Via AC-coupling, the COMP_IN voltage can track $V_{pixel\_out}$(T6) in addition to $V_{cc}$(T5) as follows:

$$V_{comp\_in}(T7)=(V_{ref\_low}+V_{comp\_offset})+(V_{pixel\_out\_rst}-V_{pixel\_out\_sig3})+(V\sigma_{KTC2}-V\sigma_{KTC1}) \quad \text{(Equation 8)}$$

Following the second sampling operation, the COMP_IN voltage can be quantized by comparing against a VREF ramp between times T7 and T8. The VREF ramp can start from $V_{ref\_low}$, which can represent a minimum quantity of overflow charge detectable in charge storage device 608 including $C_{EXT}$ and $C_{FD}$, and $V_{ref\_high}$, which can represent the quantity of overflow charge when charge storage device 608 saturates. If neither FLAG_1 or FLAG_2 is asserted, a count value from counter 914 when VOUT trips can be stored into memory 912 to represent the intensity of light received in the exposure period. After time T8, the digital value stored in memory 912 can be read out to represent the intensity of light received by the photodiode PD within the exposure period $T_{exposure}$, at time T9. In a case where one image frame is generated in a single frame period, the frame period can span from time T0 to T8.

As shown in Equations 5 and 8, the polarity of comparison in PD ADC operation, where $V_{comp\_in}$ represents $V_{pixel\_out\_sig2}-V_{pixel\_out\_sig1}$, is opposite to the polarity of comparison in FD ADC operation, where $V_{comp\_in}$ represents $V_{pixel\_out\_rst}-V_{pixel\_out\_sig3}$. In PD ADC, the VOUT of comparator 906 of FIG. 9A becomes a logical zero when COMP_IN voltage is higher than $V_{ref\_low\_margin}$, which indicates the photodiode PD does not saturate. But in order to store the digital value when VOUT trips, which represents a measurement of the residual charge, into memory 912, memory 912 needs to receive a positive VOUT from comparator 906. In contrast, in FD ADC, the VOUT of comparator 906 of FIG. 9A becomes a logical one when COMP_IN voltage is higher than $V_{ref\_low}$, which indicates that the overflow charge exceeds the minimum detectable level. The polarity of comparison of FD ADC and the TTS operation is also identical. Referring back to FIG. 9C, the output logic circuit 908 of FIG. 9C can send the inverted output of comparator 906 to NOR gate 936 and registers 932 and 934 in the PD ADC operation (when the LG signal is low) and send the non-inverted output of comparator 906 in the TTS and the FD ADC operations (when the LG signal is high). The arrangements of FIG. 9C can accommodate the reversed polarity of comparison between TTS/FD ADC and PD ADC operation.

The multiple quantization operations in FIG. 11C and FIG. 11D may require a relatively long duration to complete, and can become a major bottleneck to the generation of image frames and can lower the frame rate. One way to improve the operational speed of the image sensor is to enable parallel quantization operations for each photodiode by, for example, providing a comparator for each photodiode in a pixel cell, such that each photodiode of the pixel cell has its own dedicated comparator to perform the multiple quantization operations.

While including multiple comparators in each pixel cell of an image sensor can reduce the total time of completion of the quantization operations for each pixel cell and improve the operational speed of the image sensor, such arrangements can substantially increase the size of the pixel cell.

Figure 12A:
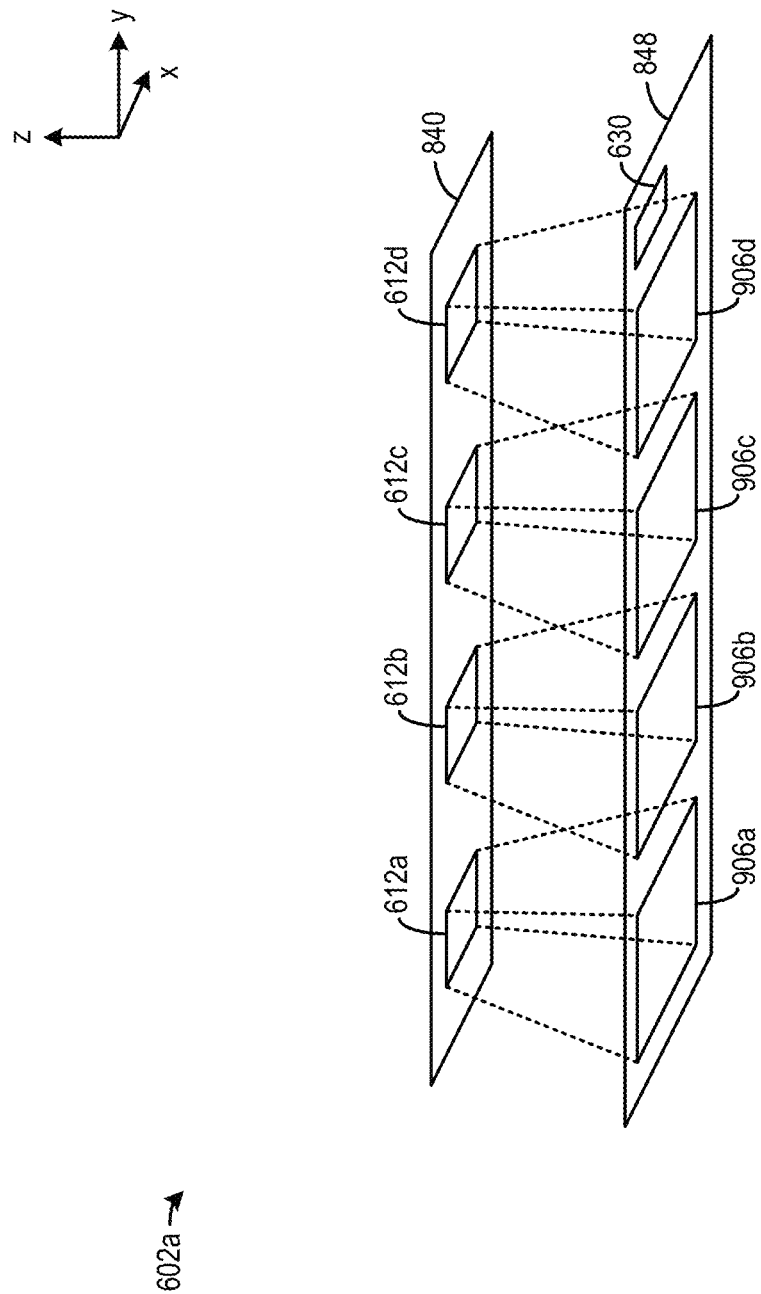
FIG. 12A and FIG. 12B illustrate examples of structures of a multi-photodiode pixel cell.

FIG. 12A illustrates an example exploded view of pixel cell 602a which includes, as part of circuit 849, a comparator 906 for each photodiode. For example, pixel cell 602a may include photodiodes 612a, 612b, 612c, and 612d in semiconductor substrate 840, and corresponding comparators 906a, 906b, 906c, and 906d, as well as memory 630, in semiconductor substrate 848. The two substrates can be stacked to reduce the footprint of pixel cell 602a (along the x and y directions). As shown in FIG. 12A, each comparator is much larger than its corresponding photodiode as well as memory 630. This can be due to the comparator include analog circuits (e.g., differential pairs, biasing circuits, output stages, etc.) which include much larger analog transistors than the digital transistors and devices used to implement the photodiodes and memory 630. The comparators may define the footprint of the pixel cell as a result. Moreover, the comparators typically consume lots of power. As the advancement in the process technologies further shrinks the sizes of the photodiodes and allows more photodiodes to be included in an image sensor to improve resolution, the power and space required by the comparators can become a bottleneck that limits how many photodiodes can be included in the image sensor, especially in a case where each photodiode is to have a dedicated comparator.

Figure 12B:
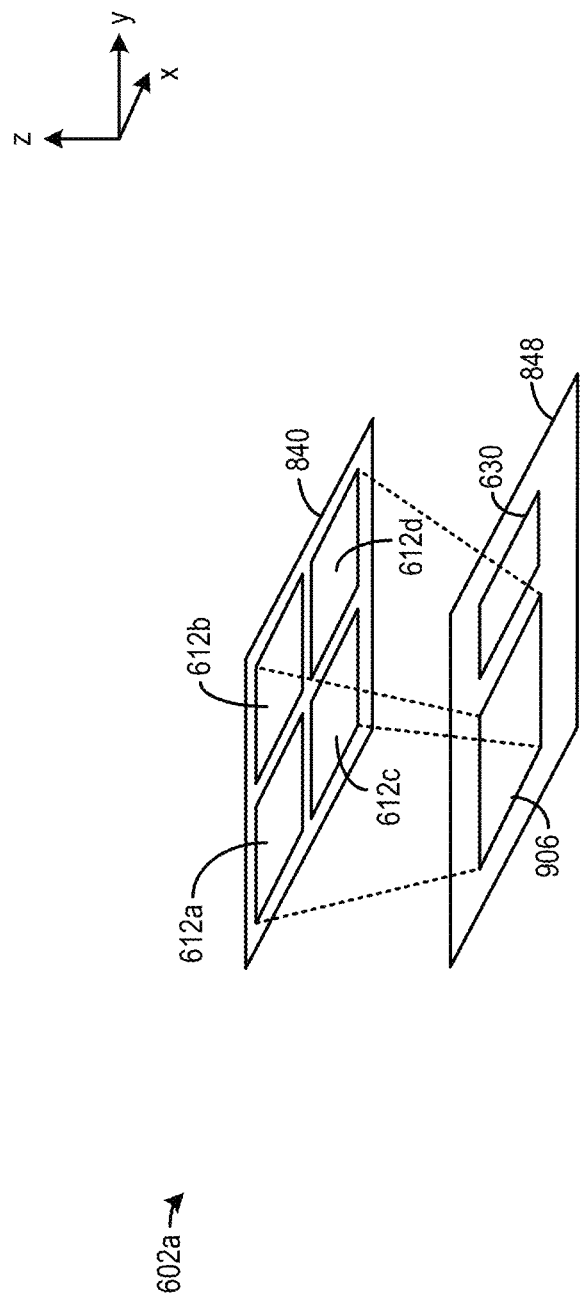

One way to reduce the footprint of pixel cell 602a is by having the photodiodes of the pixel cell to share the comparators. For example, as shown in FIG. 12B, instead of having one comparator for each photodiode, and a total of four comparators, in pixel cell 602a, one comparator 906 can be provided to quantize the charge generated by each of photodiodes 612a, 612b, 612c, and 612d. Compared with FIG. 12A, the arrangements in FIG. 12B can substantially reduce the footprint as well as power consumption of pixel cell 602a. But because of the sharing of comparator 906 among the photodiodes, each photodiode need to take turn to access comparator 906 to perform the quantization operations, which increase the total time of quantization operations of the photodiodes of the pixel cell. The increase in the total time of quantization operations can reduce the operational speed and the frame rate of the image sensor, which can degrade its capability in imaging high speed objects/scenes and limit the applications of the image sensor.

Figure 13A:
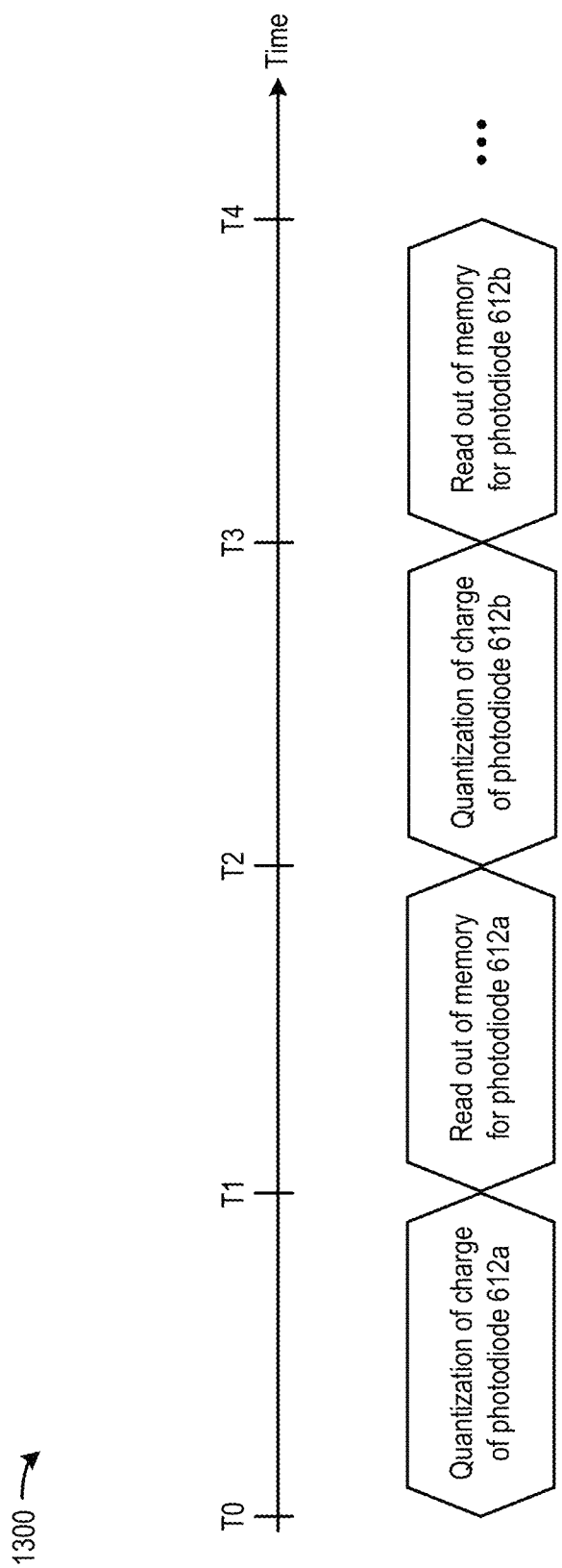
FIG. 13A and FIG. 13B, illustrate example operations of a multi-photodiode pixel cell.

One way to improve the operational speed and the frame rate of the image sensor is by increasing the size of memory 630 of the pixel cell to maximize the storage of the quantization results of the photodiodes of the pixel cell. Such arrangements can reduce the number of read out operations of memory 630 and the interruptions to the quantization operations. FIG. 13A illustrates an example sequence 1300 of quantization and memory operations of pixel cell 602a in a case where memory 630 only includes a single memory bank to store the quantization results of photodiode 612a-612d. As shown in FIG. 13A, comparator 906 can be controlled to quantize the charge of photodiode 612a and store a first result to memory 630 between times T0 and T1, followed by read out of memory 630 for the first result between times T1 and T2. As memory 630 only includes a single memory bank, first result needs to be read out and transferred to the host device (e.g., host device 652) prior to the quantization operation of the charge of photodiode 612b. After the read out and transfer of the first result are complete, comparator 906 can then be controlled to quantize the charge of photodiode 612b and overwrite the first result with the second result in memory 630, between times T2 and T3, followed by the read out and transfer of the second result between times T3 and T4. As the quantization operations and read out operations for each photodiode are serialized, the operational speed and frame rate of the pixel cell, and the image sensor as a whole, can be substantially reduced.

Figure 13B:
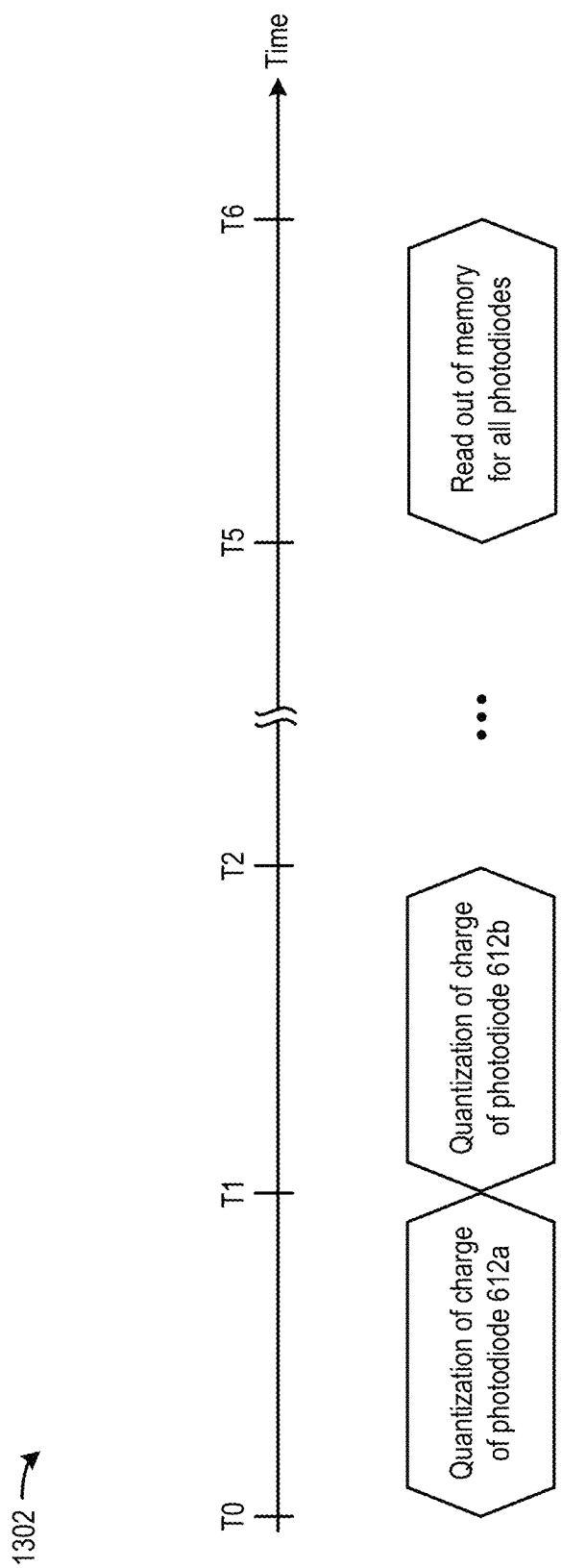

On the other hand, if memory 630 includes multiple memory banks which are capable of storing the quantization results of multiple (or all) photodiodes at the same time, the number of read out operations can be reduced, which can improve the operational speed and frame rate of the pixel cell. FIG. 13B illustrates another sequence 1302 of quantization and memory operations of pixel cell 602a in a case where memory 630 includes multiple memory banks each to store the quantization result of one of photodiodes 612a-612d. As shown in FIG. 13B, comparator 906 can be controlled to quantize the charge of photodiode 612a and store the first result to memory 630 between times T0 and T1, followed by quantization of the charge of photodiode 612b and storage of the second result to memory 630 between times T1 and T2. Compared with FIG. 13A, since memory 630 can store both the first result and the second result, there is no need to perform a read out between the quantization operations of the two photodiodes. As a result, the quantization operations of each photodiodes can be completed, and then at time T5 a read out operation can be performed at memory 630 to read out the quantization results of all the photodiodes and to transfer the quantization results to host device 652. The arrangements of FIG. 13B can significantly improve the operational speed and frame rate of the pixel cell and can compensate for the speed degradation caused by the sharing of the comparator among the photodiodes.

Figure 14A:
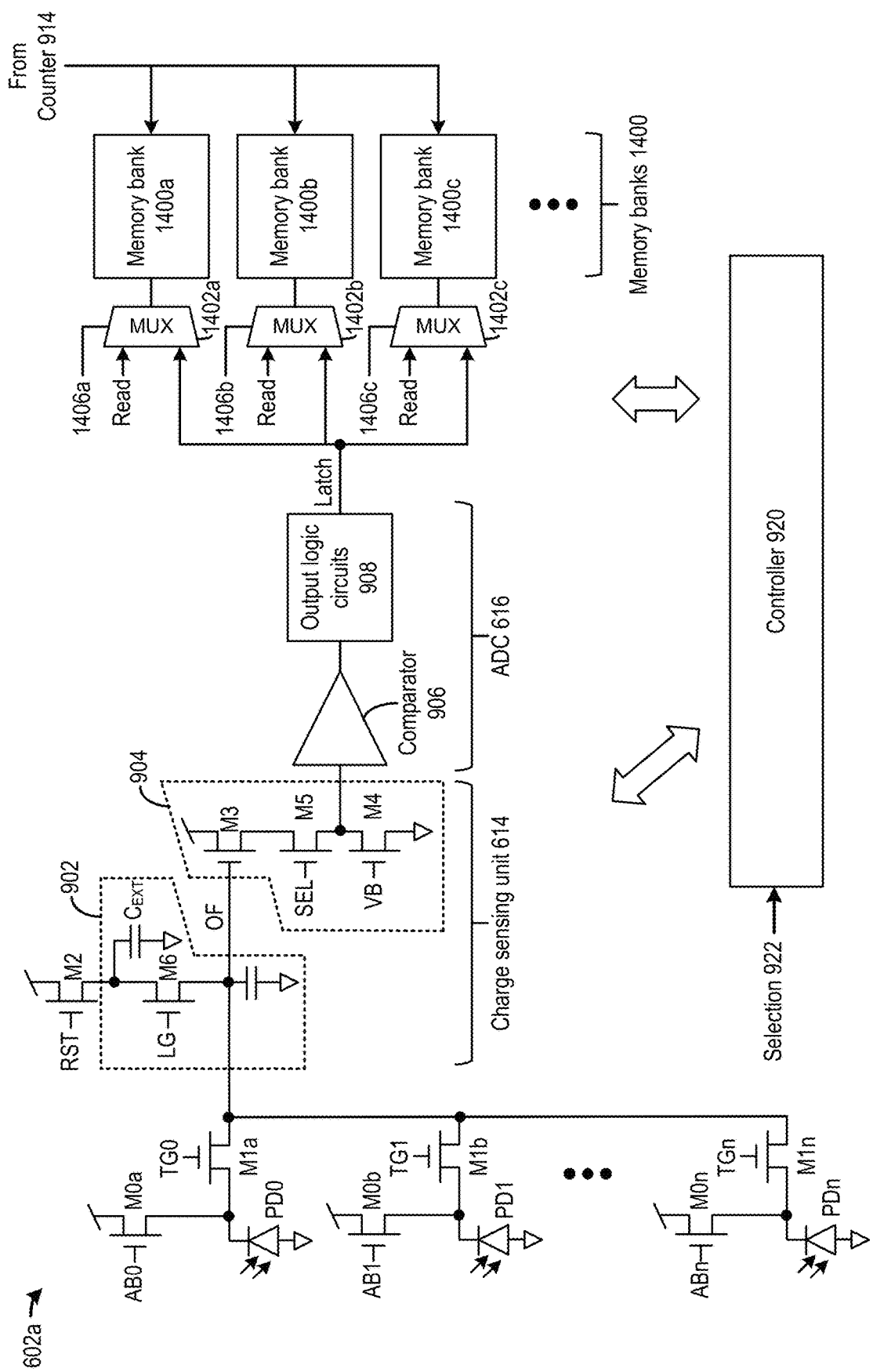
FIG. 14A, FIG. 14B, and FIG. 14C illustrate an example of a multi-photodiode pixel cell having multiple memory banks and its operation.
Figure 14B:
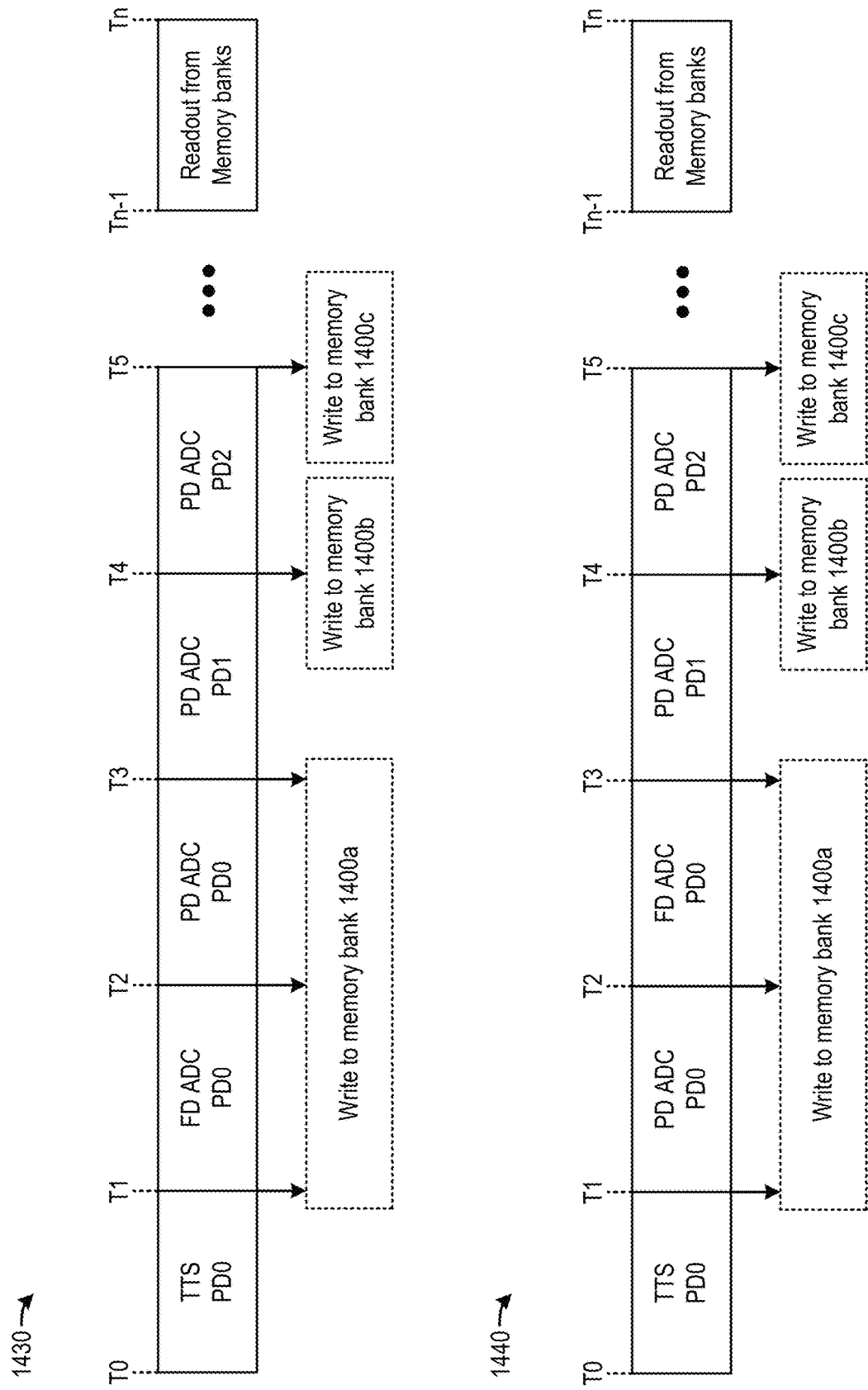
Figure 14C:
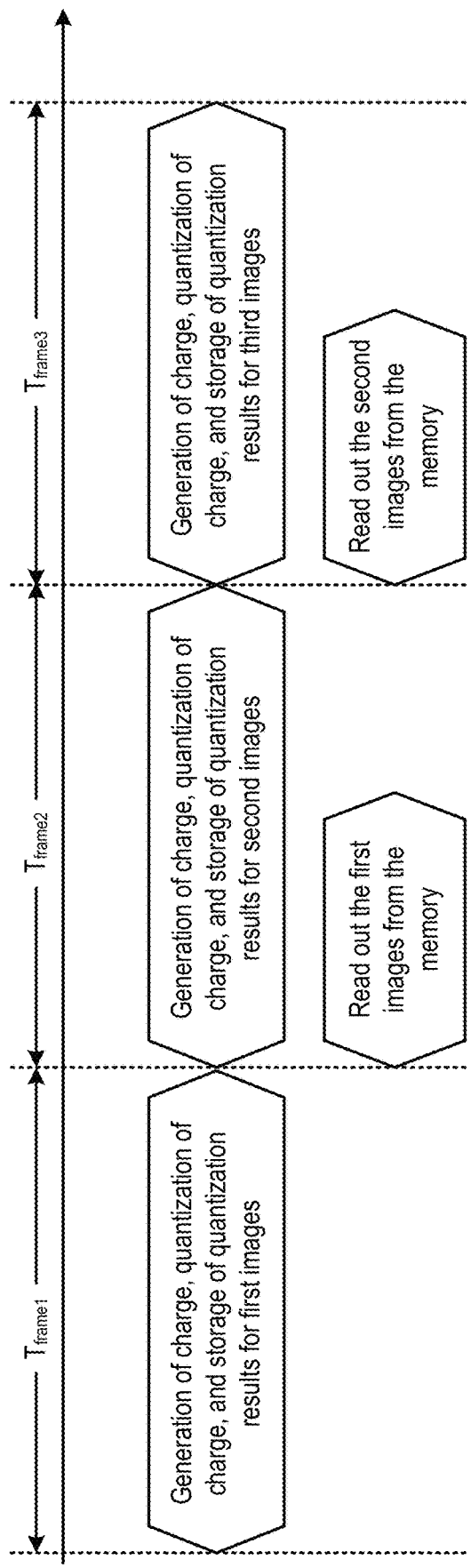

Reference is now made to FIG. 14A-FIG. 14C, which illustrate an example of pixel 602a including multiple photodiodes and multiple memory banks and its operations. As shown in FIG. 14A, pixel cell 602a includes a plurality of photodiodes including PD0, PD1, PDn, etc. Photodiodes PD0, PD1, PDn can correspond to, photodiodes 612a, 612b, and 612c. PD0, PD1, and PDn can share a single charge sensing unit 614 and a single ADC 616. Each photodiode can take turn to access charge sensing unit 614 to convert the charge to a voltage. Each photodiode is coupled with a respective shutter switch and a respective transfer switch. For example, photodiode PD0 is coupled with shutter switch M0a and transfer switch M1a, photodiode PD1 is coupled with shutter switch M0b and transfer switch M1b, whereas photodiode PDn is coupled with shutter switch M0n and transfer switch M1n. Each transfer switch is coupled with the OF node of charge storage device 902. Controller 920 can control the timing of control signals AB0, AB1, and ABn (for shutter switches M0a, M0b, and M0n) and the timing of control signals TG0, TG1, and TGn (for transfer switches M1a, M1b, M1n) to individually enable each photodiode to generate/accumulate residual charge, and to transfer overflow charge to charge sensing unit 614 to convert to a voltage.

In addition, pixel cell 602a includes a single ADC 616 and memory 912 which includes multiple memory banks 1400 including memory bank 1400a, 1400b, 1400c, etc. ADC 616 includes a comparator 906 and output logic circuits 808. Comparator 906 (for which the CC capacitor and M8 switch are omitted in FIG. 14A for simplicity) can compare the voltage with a static threshold (e.g., for TTS operation) or a voltage ramp (e.g., for PD ADC and FD ADC operations) to generate a decision. Moreover, output logic circuits 908 to control when a memory bank stores a count value from counter 914. The count value can represent the quantization result of the voltage, which represents the overflow charge or residual charge generated by a photodiode, as described above. Each memory bank includes a multiplexor 1402 (e.g., multiplexor 1402a, 1402b, 1402c, etc.) which can receive multiplexor select signals 1406 (e.g., 1406a, 1406b, 1406c, etc.) to select the associated memory bank for a write or a read operation. For example, for a write operation, multiplexor select signals 1406 can select which memory bank(s) to receive the latch signal from output logic circuits 908 to control when the memory bank(s) store a count value from counter 914. For a read operation, multiplexor select signals 1406 can select which memory bank(s) to receive a read enable signal (labelled "read" in FIG. 14A) to output the stored count value. In some examples, each memory bank 1400 can include a SRAM cell, and the associated multiplexor 1402 can drive the word line (WL) of the SRAM cell. In the example of FIG. 14A, each memory bank can store the quantization result of one photodiode. For example, memory bank 1400a can store the quantization result of photodiode PD0 (or 612a), memory bank 1400b can store the quantization result of photodiode PD1 (or 612b), etc. As to be described below, other different mapping between the photodiodes and the memory banks can be adopted for different applications. Moreover, in some examples, ADC 616 and memory bank 1400 can be external to pixel cell 602a and can be shared by multiple pixel cells.

FIG. 14B illustrates example sequences 1430 and 1440 of operations of pixel cell 602a of FIG. 14A. In both sequences 1430 and 1440, controller 920 can connect one of the photodiodes (e.g., PD0) to charge sensing unit 614 and ADC 616 to perform the TTS, FD ADC, and PD ADC operation based on selection 922. After the quantization operations of PD0 completes, other photodiodes (e.g., PD1, PD2, etc.) can take turn in accessing charge sensing unit 614 and ADC 616 to perform a PD ADC operation. In some examples, some of the photodiodes can be binned together and allowed to access charge sensing unit 614 and ADC 616 at the same time. For example, photodiodes configured to detect light of the wavelength range (e.g., monochrome), including PD0, can be binned together and allowed to access charge sensing unit 614 and ADC 616 at the same time to perform the TTS, FD ADC, and PD ADC operation based on selection 922. Moreover, other photodiodes that detect light of different wavelength range from PD0 can also be binned together to perform a PD ADC operation. The resulting quantization result can represent the charge generated by the photodiodes of the same bin within the exposure period.

Specifically, in the beginning of both sequences 1430 and 1440, controller 920 can de-assert control signals AB0, AB1, and ABn for shutter switches M0a, M0b, and M0n to start the exposure time for photodiodes PD0, PD1, and PDn, such that each photodiode can generate and accumulate charge in response to a component of the incident light. Between times T0 and T2, controller 920 can configure charge storage device 902 at maximum capacity with $C_{FD}$ and $C_{EXT}$ capacitors connected in parallel, and enable photodiode PD0 (and/or other photodiodes binned with PD0) to transfer overflow charge to charge sensing unit 614 by biasing transfer switch Mla at the partially-on state, while disabling other transfer switches such as M1b and M1n to prevent other photodiodes from transferring overflow charge to charge sensing unit 614. Multiplexor selection signals 1406a can select memory bank 1400a for writing by enabling multiplexor 1402a to forward the latch signal from output logic circuits 908 to memory bank 1400a, to control the storage of a count value from counter 914 at T1 for the TTS operation.

Based on selection 922, controller 920 can control ADC 616 to perform a TTS operation between times T0 and T1 for PD0. If charge sensing unit 614 is saturated by PD0, output logic circuits 908 can assert the latch signal, and multiplexor 1402a can forward the asserted latch signal to memory bank 1400a to store a value from counter 914 at time T1 from the TTS operation. After the TTS operation completes, a FD ADC operation or a PD ADC operation can be performed. For example, in sequence 1430, between times T1 and T2 controller 920 can control ADC 616 to perform a FD ADC operation to measure the overflow charge in charge sensing unit 614, as described in FIG. 11C. If charge storage device 902 is not saturated, output logic circuits 908 can assert the latch signal, and multiplexor 1402a can forward the asserted latch signal to memory bank 1400a to store a value from counter 914 at time T2 from the FD ADC operation. Following the FD ADC operation, between times T2 and T3 controller 920 can disconnect the $C_{FD}$ capacitor from the $C_{EXT}$ capacitor to reduce the capacity of charge storage device 902, and control the photodiode PD0 to transfer the residual charge to the $C_{FD}$ capacitor. Controller 920 can also stop the exposure of the photodiode PD0 by de-asserting the control signal AB0 for the shutter switch M0a of the photodiode. Controller 920 can then control ADC 616 to perform a PD ADC operation to measure the residual charge. If there is no overflow charge, output logic circuits 908 can assert the latch signal, and multiplexor 1402a can forward the asserted latch signal to memory bank 1400a to store a value from counter 914 at time T3 for the PD ADC operation.

Following the completion of the TTS, FD ADC, and PD ADC operation for PD0, between times T3 and T4 controller 920 can reset the $C_{FD}$ capacitor, control PD1 (and/or other photodiodes binned with PD1) to transfer residual charge to the $C_{FD}$ capacitor, and control ADC 616 to perform a PD ADC operation to measure the residual charge. Between T3 and T4, multiplexor selection signals 1406a can deselect memory bank 1400a for writing. Moreover, multiplexor selection signals 1406b can select memory bank 1400b for writing by enabling multiplexor 1402b to forward the latch signal from output logic circuits 908 to memory bank 1400b, to control the storage of a count value from counter 914 at T4 for the PD ADC operation. Controller 920 can then perform PD ADC operation for other photodiodes and store the count value of the PD ADC operation at other memory banks. After the PD ADC operations complete, controller 920 can select all the memory banks to perform a read out operation to read out the count values from all the memory banks, between times Tn-1 and Tn. The count values may represent part of a 2D frame and 3D frame.

On the other hand, in sequence 1440 following the completion of the TTS operation, at time T1 the $C_{FD}$ capacitor can be disconnected from the $C_{EXT}$ capacitor to preserve part of the overflow charge in $C_{EXT}$ capacitor. The $C_{FD}$ capacitor can be reset, and between times T1 an T2 the residual charge accumulated at the photodiode PD0 can be transferred to the $C_{FD}$ capacitor, followed by the PD ADC operation, as described in FIG. 11D. If the photodiode PD0 is not saturated by the residual charge, output logic circuits 908 can assert the latch signal (by inverting the output of comparator 906), and multiplexor 1402a can also forward the asserted latch signal to memory bank 1400a to store a value from counter 914 at time T2 for the PD ADC operation. Between times T2 and T3, the $C_{FD}$ capacitor can be connected with the $C_{EXT}$ capacitor to redistribute the overflow charge between the capacitors, and ADC 616 can perform a FD ADC operation to measure the overflow charge, as described in FIG. 11D. If there is overflow charge and the overflow charge does not saturate the charge storage device in the TTS operation, output logic circuits 908 can assert the latch signal, and multiplexor 1402a can forward the asserted latch signal to memory bank 1400a to store a value from counter 914 at time T3 for the FD ADC operation. Following the completion of the FD ADC operation, controller 920 can then perform a PD ADC operation for each of the remaining photodiodes, followed by a read out operation of the memory banks, as in sequence 1430.

FIG. 14C illustrates an example sequence of operation 1450 of an image sensor 600 including an array of pixel cells 602 of FIG. 14A. As shown in FIG. 14C, within a first frame period $T_{frame1}$ (e.g., frame period 714 of FIG. 7C) the photodiodes of each pixel cell of image sensor 600 can be exposed to light to generate charge, followed by the multistage quantization operation of the charge of the photodiodes and the storage of the quantization results in each memory bank 1400 for each of the photodiodes, as described in FIG. 14B. At the end of the first frame period $T_{frame1}$, memory banks 1400 can store one or more 2D frames (e.g., red images 710a, blue images 710b, green images 710c) and a 3D frame (e.g., infra-red image 710d) of first images (e.g., images 710 of FIG. 7C). Within a second frame period $T_{frame2}$ (e.g., frame period 724 of FIG. 7C), the above charge generation and quantization operations can be repeated to generate second images (e.g., images 720 of FIG. 7C). But in parallel with the generation of the charge for images 720, read out operations can be performed on memory banks 1400 of each pixel cell to read out and to transfer images 710 to host device 652. Moreover, within a third frame period $T_{frame3}$, the read out of the second images from the memory can be performed in parallel with the generation of charge for third images. Compared with a case where the memory needs to be read out before the quantization operation of each photodiode, as described in FIG. 13B, the arrangements of FIG. 14C can significantly reduce the frame period and improve both the frame rate and the operational speed of the image sensor. The improvements of the frame rate and the operational speed are made by possible by providing additional memory banks in the pixel cell to store the quantization results of the photodiodes, to avoid putting the quantization operation for a photodiode on hold to wait for the completion of the read out operation for another photodiode.

Figure 15A:
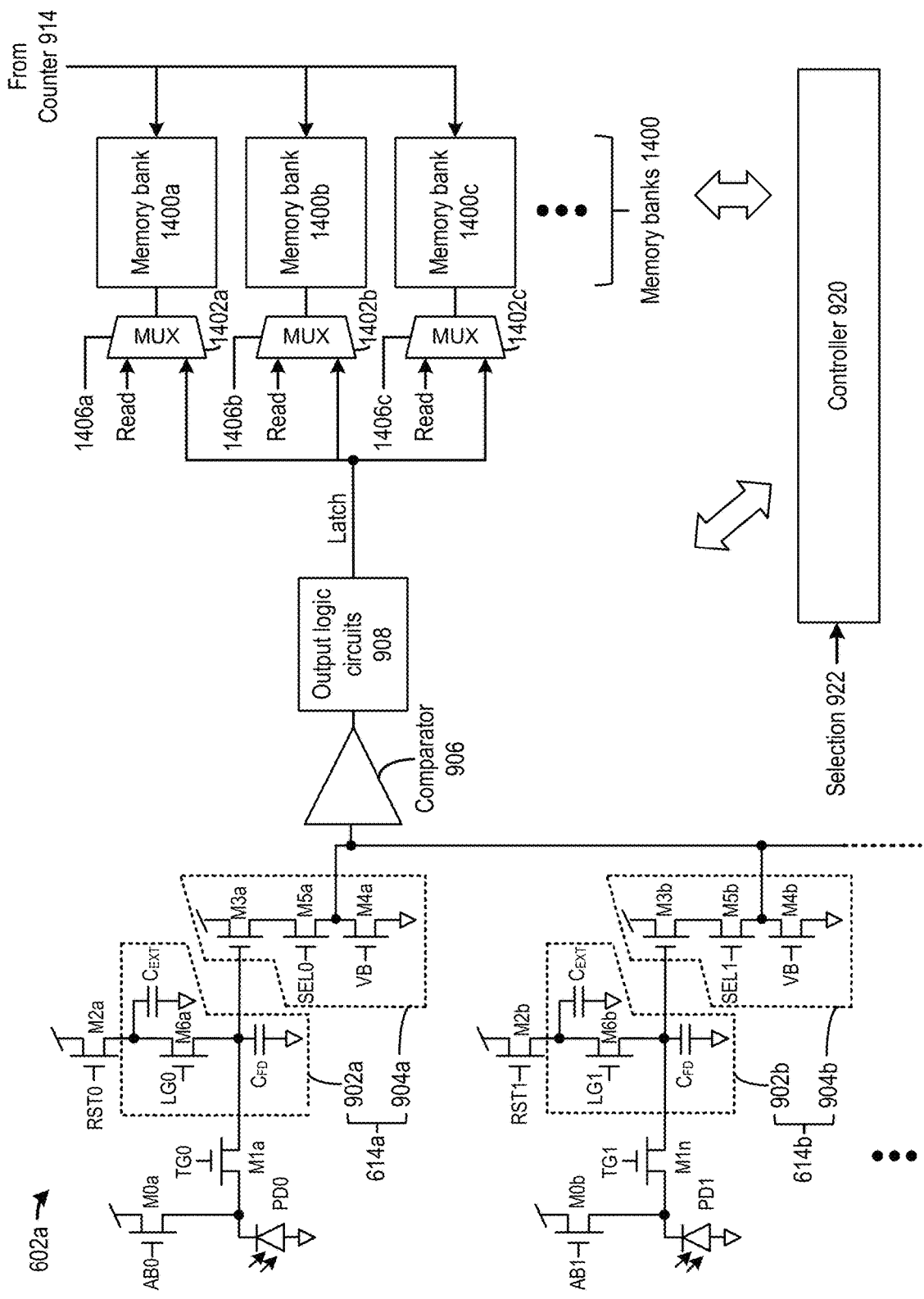
FIG. 15A and FIG. 15B illustrate another example of a multi-photodiode pixel cell having multiple memory banks.
Figure 15B:
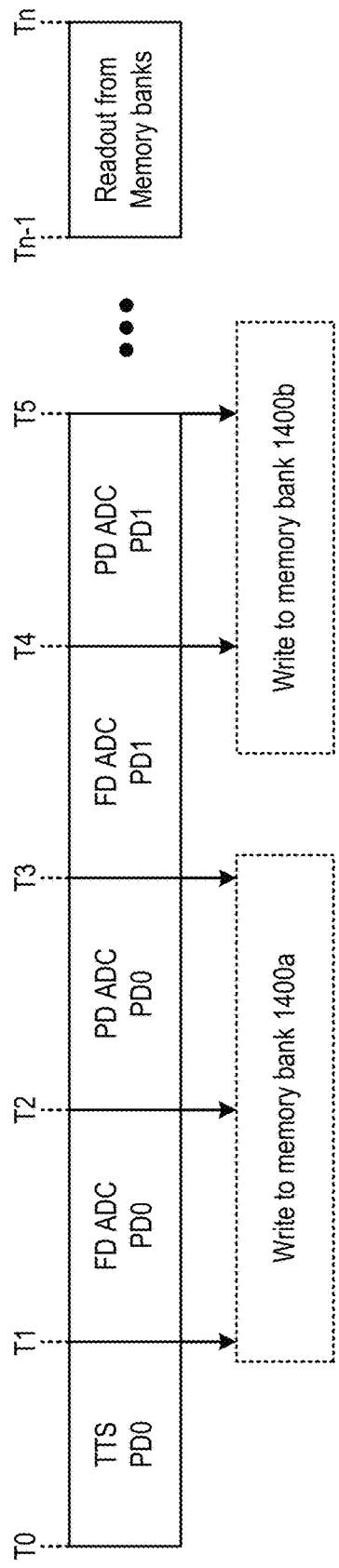
Figure 15B:
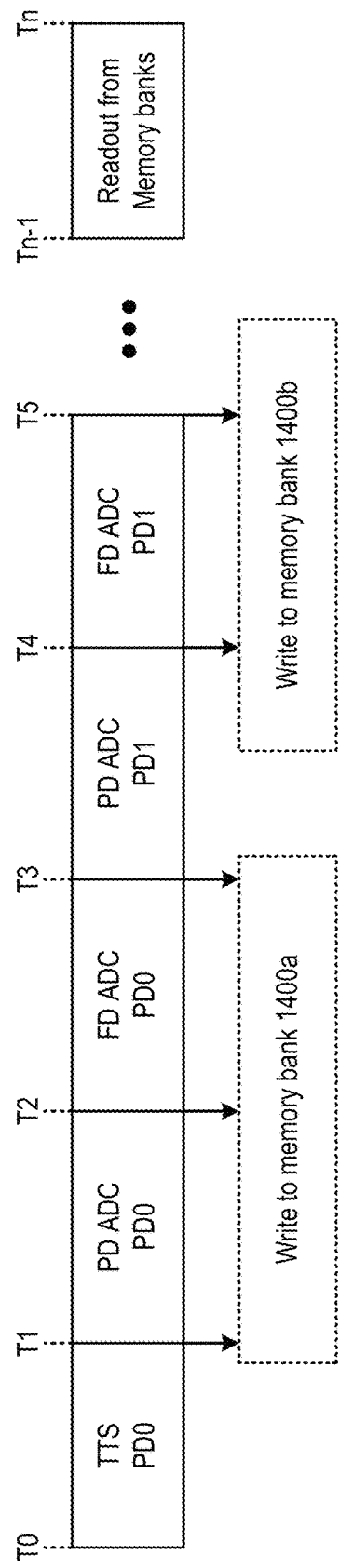

Reference is now made to FIG. 15A-FIG. 15B, which illustrate another example of pixel 602a including multiple photodiodes and multiple memory banks and its operations. As shown in FIG. 15A, pixel cell 602a includes a plurality of photodiodes including PD0, PD1, etc., as well as a plurality of charge sensing units 614 including charge sensing unit 614a, 614b, etc. Charge sensing unit 614a includes a charge storage device 902a and a switchable buffer 904a and is configured to convert residual charge and overflow charge transferred from photodiode PD0 to voltages. Charge sensing unit 614b includes a charge storage device 902b and a switchable buffer 904b and is configured to convert residual charge and overflow charge transferred form photodiode PD1 to voltages. Each photodiode is coupled with a respective shutter switch and a respective transfer switch. For example, photodiode PD0 is coupled with shutter switch M0a and transfer switch M1a, whereas photodiode PD1 is coupled with shutter switch M0b and transfer switch M1b. Controller 920 can control the timing of control signals AB0 and AB1 (for shutter switches M0a and M0b), control signals TG0 and TG1 (for transfer switches M1a and M1b), as well as control signals RST0, LG0, RST1, and LG1 to individually enable each photodiode to generate/accumulate residual charge, and to transfer overflow charge to a respective charge sensing unit 614. In addition, controller 920 can also control the timing of control signals SEL0 and SEL1 to provide each charge sensing unit 614a and 614b access to ADC 616 to perform quantization operations selected by selection signal 922. In addition, pixel cell 602a includes memory banks 1400 and multiplexors 1402 coupled with ADC 616 as in FIG. 14A. Each memory bank 1400 can store a quantization result of a photodiode (e.g., memory bank 1400a for PD0, memory bank 1400b for PD1, etc.) as in FIG. 14A. As in FIG. 14A, the photodiodes in FIG. 15A can also be binned (e.g., based on the photodiodes detecting light of the same wavelength range), so that charge sensing units of binned photodiodes can access ADC 616 at the same time.

The additional charge storage sensing units for each photodiode can accumulate the overflow charge from the each photodiode in parallel during the same exposure period, which enables a FD ADC operation to be performed for each photodiode within the pixel cell to measure the overflow charge generated by the each photodiode, although only the photodiode that connects to ADC 616 during the exposure period (e.g., PD0) can perform the TTS operation. FIG. 15B illustrates example sequences 1502 and 1504 of operations of pixel cell 602a of FIG. 15A. The sequence of operations in FIG. 15B are similar to sequences 1430 and 1440 of FIG. 14B, except that a FD ADC and a PD ADC operation can be performed for each photodiode. In sequence 1502, FD ADC operation can be performed after PD ADC operation for each photodiode, whereas in sequence 1504, PD ADC operation can be performed after the FD ADC operation for each photodiode.

Figure 16A:
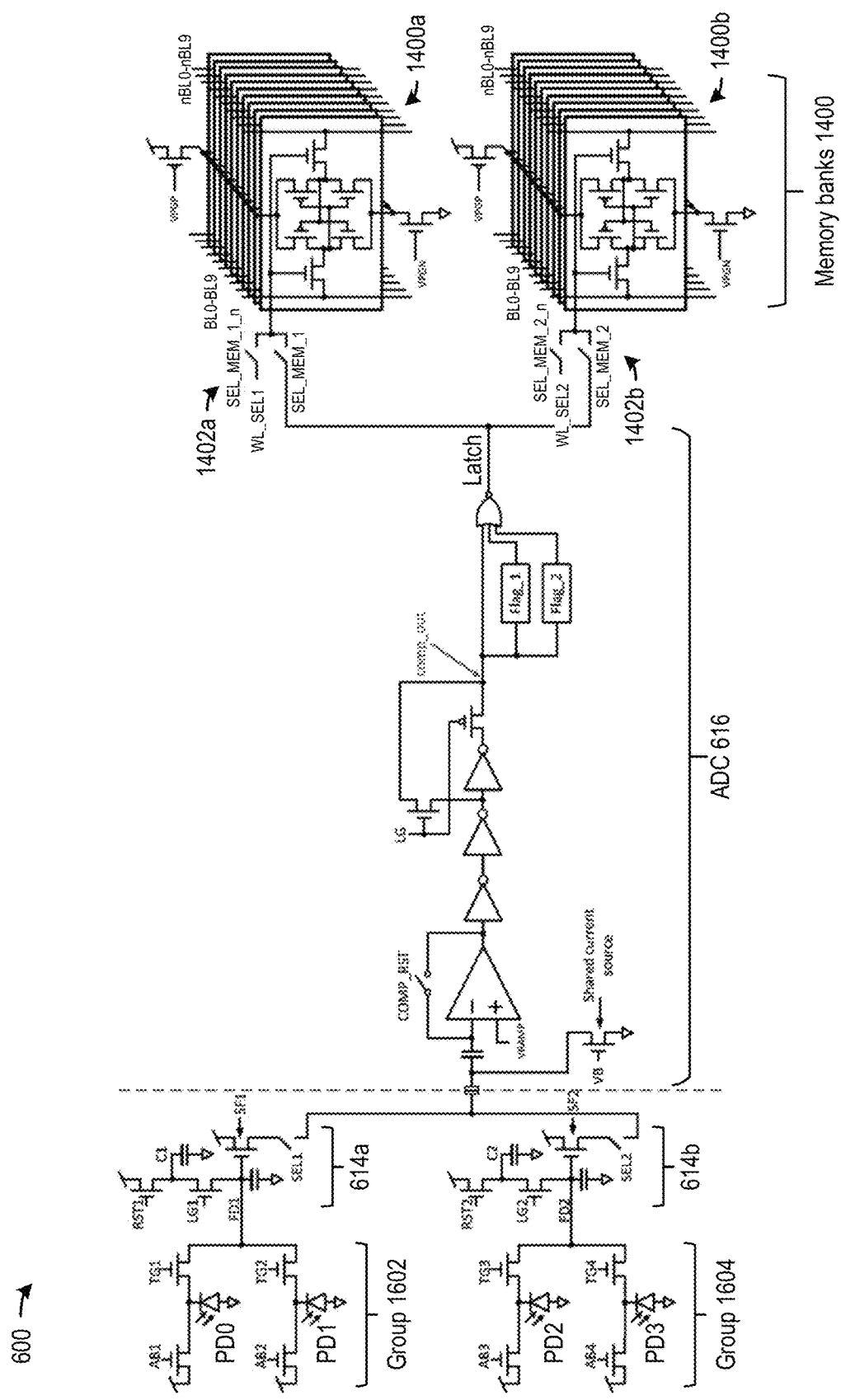
FIG. 16A and FIG. 16B illustrate examples of an image sensor having multiple photodiode pixel cells and multiple memory banks.
Figure 16B:
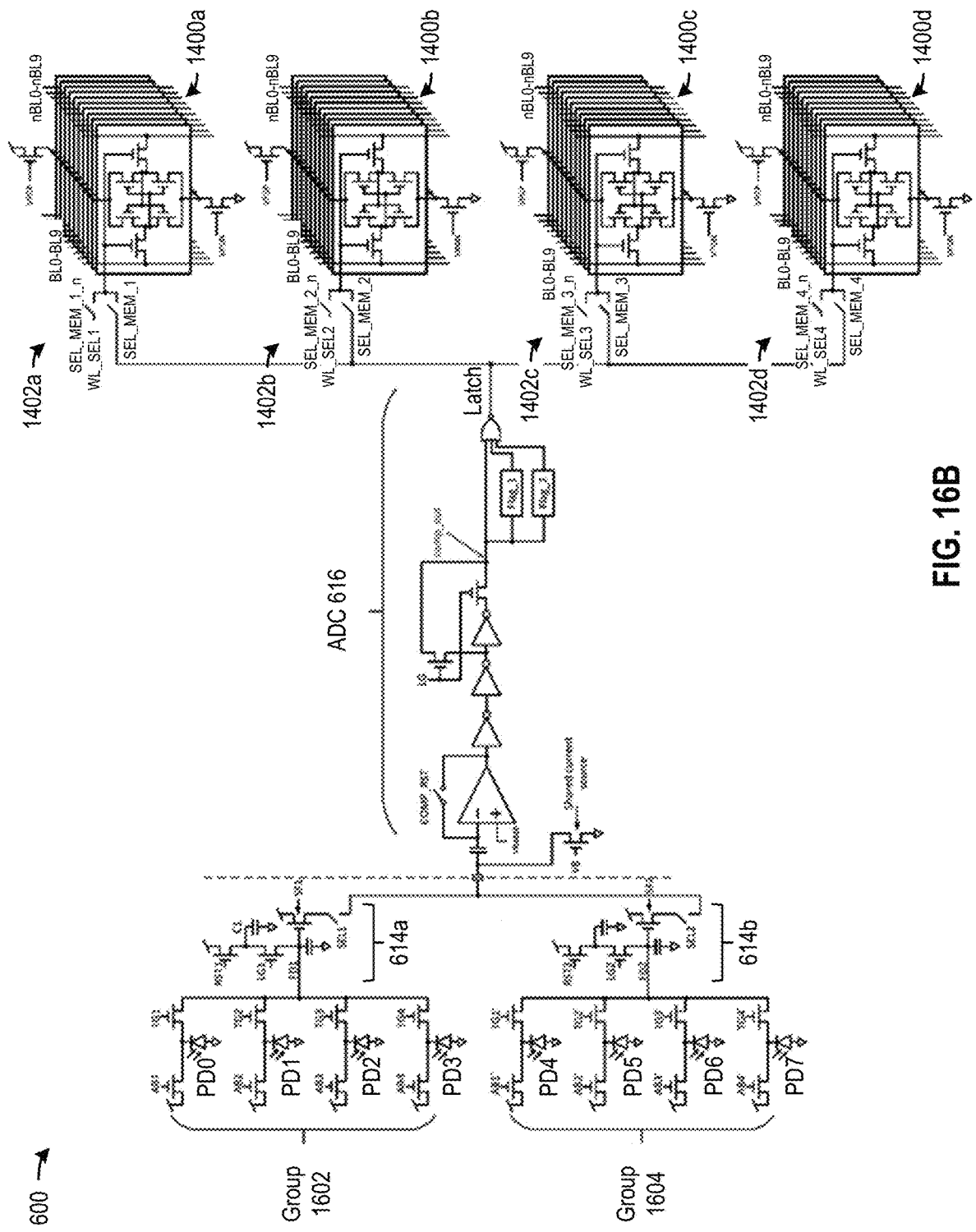

FIG. 16A and FIG. 16B illustrate other examples of image sensor 600. In FIG. 16A, image sensor 600 includes a group of photodiodes can share a charge sensing unit 614, and the charge sensing units can share a single ADC 616. For example, a group 1602 of photodiodes (PD0 and PD1) shares a charge sensing unit 614a, whereas a group 1604 of photodiodes (PD2 and PD3) shares a charge sensing unit 614b. In some examples, groups 1604 and 1606 of photodiodes can be part of a pixel cell, whereas in some examples the pairs of photodiodes can be of different pixel cells. Moreover, in FIG. 16A, one memory bank is provided to store the quantization results of a pair of photodiodes. For example, memory bank 1400a is provided to store the quantization results of group 1604, whereas memory bank 1400b is provided to store the quantization results of group 1606. Each multiplexor 1402 (e.g., multiplexors 1402a, 1402b, etc.) are represented by a pair of switches in FIG. 16A controlled by a pair of signals SEL_MEM and SEL_MEM_*_n (e.g., SEL_MEM_1 and SEL_MEM_1_n, SEL_MEM_2 and SEL_MEM_2_n, etc.) which are part of multiplexor select signals 1406. The SEL_MEM signal selects a memory bank for a write operation by forwarding the latch signal from ADC 616, whereas the SEL_MEM_*_n signal select a memory bank for a read out operation by forwarding a WL_SEL*(e.g., WL_SEL1, WL_SEL2, etc.) signal to the memory bank. The output of counter 914 can be connected to bit lines labelled BL0-BL9 connected to each memory bank to supply the write data. Each memory bank is also connected to bit lines labelled nBL0-nBL9 to output the stored data during the read out operation. ADC 616 and memory banks 1400 can be part of a pixel cell or can be external to the pixel cell.

In FIG. 16A, one photodiode from group 1602 and one photodiode from group 1604 (e.g., PD0 and PD2) can be exposed to light within a first exposure period to perform measurement of the light intensity simultaneously, and the respective charge sensing units can store the overflow charge (if any) from the photodiodes. ADC 616 can be controlled to perform TTS operation, PD ADC operation, and FD ADC operation for one of the photodiodes (e.g., PD0), and then PD ADC and FD ADC operations for the other of the photodiodes (e.g., PD2), as described in FIG. 14B. The two memory banks 1400a and 1400b can store the quantization results of the photodiodes. During the read out of the memory banks, another set of photodiodes from groups 1602 and 1604 (e.g., PD1 and PD3) can be exposed to light within a second exposure period to perform measurement of the light intensity simultaneously, and the same quantization operations and memory write operations for PD0 and PD2 can follow. In FIG. 16A, PD0, PD1, PD2, and PD3 can be configured to have certain spectral responses (e.g., to measure light component of a certain wavelength range) which do not require all of the photodiodes to measure light intensity simultaneously. As an example, PD0 and PD2 can be configured to detect different components of visible light simultaneously to generate images of different colors (e.g., red image 710a and green image 710c) which can be used to construct a 2D frame, whereas PD1 and PD3 can be configured to detect infra-red light to construct a 3D frame. In such a case, the application that uses the 2D and 3D frame data may allow those frames to be obtained in slightly different exposure periods by image sensor 600 of FIG. 16A. In some examples, the photodiodes of groups 1602 and 1604 can also have the same exposure time. In such a case, a PD ADC operation can be performed on PD1 and PD3 after, respectively, the TTS and/or FD ADC operation for PD0 and the FD ADC operation for PD2.

FIG. 16B illustrate another examples of image sensor 600. In FIG. 16B, each of group 1602 and 1604 can include four photodiodes. For example, group 1602 can include photodiodes PD0, PD1, PD2, and PD3, whereas group 1604 can include photodiodes PD4, PD5, PD6, and PD7. Each group of photodiodes can be the photodiodes of a pixel cell, and the two groups of photodiodes in FIG. 16B can be of different pixel cells. Each group of photodiodes share a charge sensing unit (e.g., charge sensing unit 614a for group 1602, charge sensing unit 614b for group 1604, etc.), and the charge sensing units share a single ADC, as in FIG. 16A. In addition, four memory banks 1400 (e.g., 1400a, 1400b, 1400c, and 1400d) are provided to store the quantization results of the photodiodes. As in FIG. 16A, different exposure schemes can be supported by image sensor 600 of FIG. 16B. For example, one photodiode from both groups (e.g., PD0 and PD4) can be exposed to light simultaneously in a first exposure period, followed by another photodiode from both groups (e.g., PD1 and PD5) in a second exposure period, etc. As another example, all the photodiodes can be exposed to light in the same exposure period, with one photodiode from group 1602 (e.g., PD0) capable of performing TTS, FD ADC and PD ADC operations and one photodiode from group 1604 (e.g., PD4) capable of performing FD ADC and PD ADC operations, while the rest of the photodiodes are capable of performing the PD ADC operation.

Different mapping of photodiodes to the memory banks can be supported as well. For example, in one example, memory bank 1400a and memory bank 1400b can store the quantization results of two photodiodes of group 1602, whereas memory bank 1400c and memory bank 1400d can store the quantization results of two photodiodes of group 1604. In such a case, after the quantization operations of two photodiodes from each group (e.g., PD0 and PD1 of group 1602 and PD4 and PD5 of group 1604), a read out operation of the memory banks can be performed while the exposure of the other photodiodes from each group (e.g., PD2 and PD3 of group 1602 and PD6 and PD7 of group 1604) are underway. As another example, memory banks 1400a, 1400b, and 1400c can store the quantization results of three photodiodes of group 1602, whereas memory bank 1400d can store the quantization result of a photodiode of group 1604. Such arrangements can be provided when, for example, the photodiodes of group 1602 is part of a pixel cell that is in a region of interest, or is part of a group of photodiodes that can configure the light measurement operations of other photodiodes (e.g., to dynamically adjust the exposure time of other photodiodes). In such a case, by allocating more memory resources to the group 1602, the read out of the quantization results of group 1602 can happen earlier than other photodiodes of image sensor 600, which allows the adjustment of the light measurement operations of the other photodiodes to be based on the quantization results of group 1602 read out from memory banks 1400.

Figure 17:
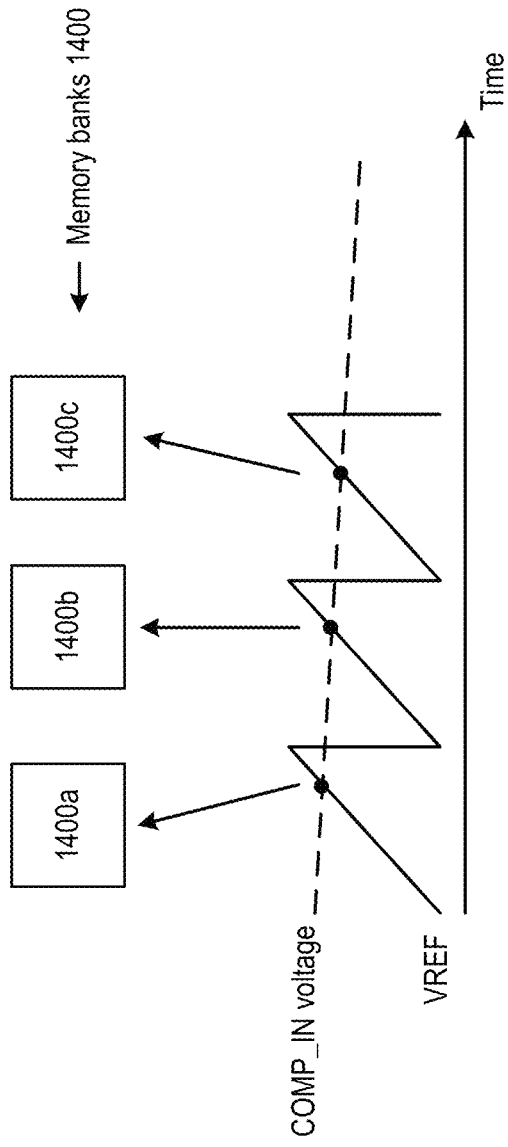
FIG. 17 illustrates an example application of a pixel cell having multiple memory banks

FIG. 17 illustrates another example operation that can be performed by pixel cell 602a of FIG. 14A, FIG. 15A, and/or image sensor 600 of FIG. 16A. In FIG. 17, a quantization operation (e.g., TTS, FD ADC, PD ADC) can be repeated several times to obtain multiple samples of a measurement of the COMP_IN voltage for a photodiode. The multiple samples can correspond to multiple TTS measurements, multiple measurements of a quantity of overflow charge, multiple measurements of a quantity or residual charge, etc. The measurements can be post-processed in various ways, such as finding an average, finding a rate of change, etc. Such arrangements can reduce the effect of noise (e.g., dark current, thermal noise, etc.) on the measurements and account for the change in the overflow/residual charge if the photodiode remains exposed to light during the measurement. All these can improve the signal-to-noise ratio and the dynamic range. To facilitate the repetition of the quantization operations, instead of allocating a memory bank to a photodiode, multiple memory banks can be allocated to a photodiode, with each memory bank storing a sample of the measurement.

Figure 18:
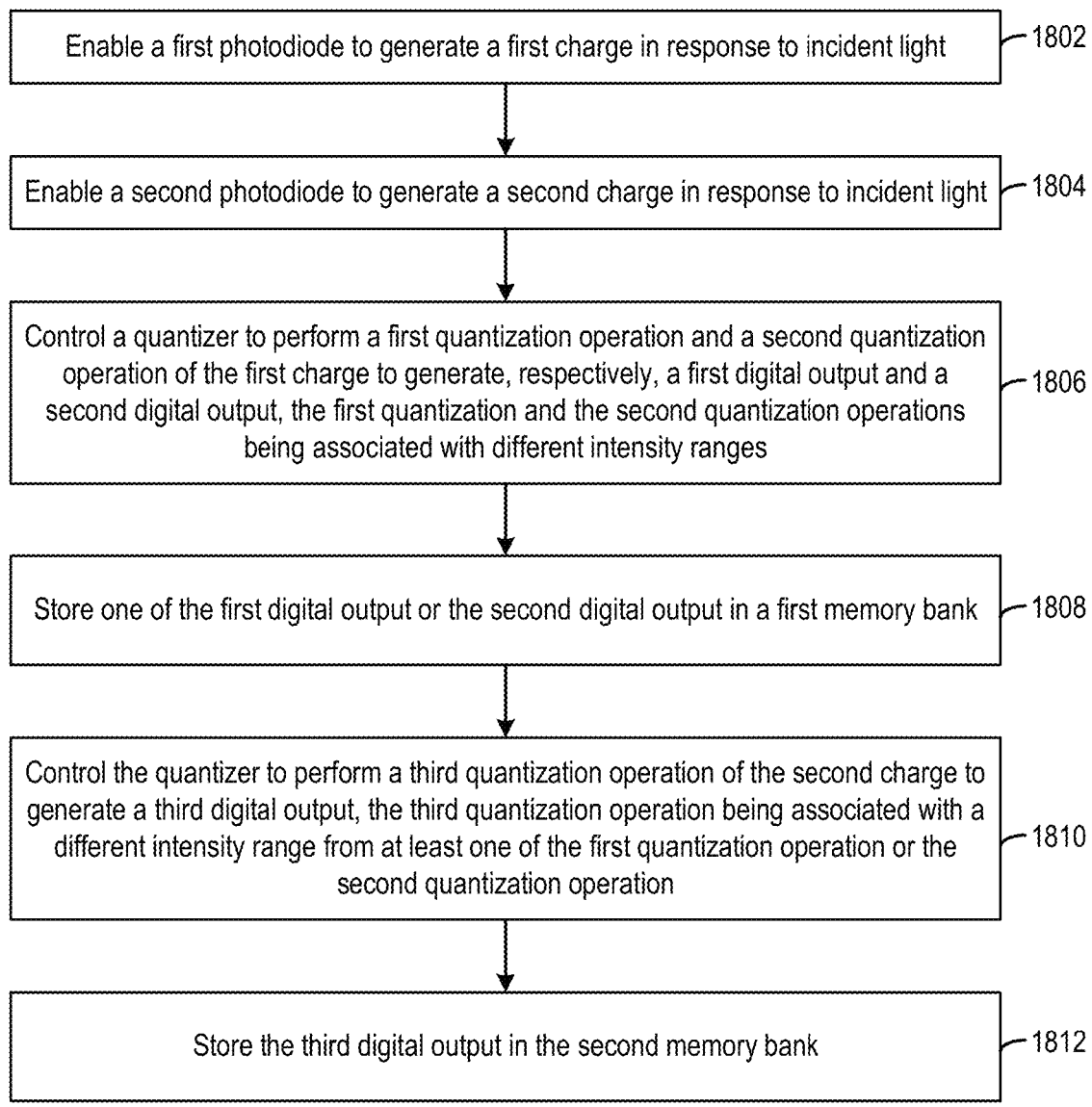
FIG. 18 illustrates a flowchart of an example process for measuring light intensity.

FIG. 18 illustrates a method 1800 for performing a light intensity measurement by multiple photodiodes comprising a first photodiode and a second photodiode. The first photodiode and the second photodiode can be part of the same pixel cell 602a, such as those shown in FIG. 14A, FIG. 15A, and FIG. 16A, or can be in different pixel cells, such as those shown in FIG. 16B. The first photodiode and the second photodiode can be configured to detect incident light components of the same wavelength range or different wavelength ranges. The two photodiodes can be coupled with a single charge sensing unit or coupled with two different charge sensing units. Each charge sensing unit comprises a charge storage device (e.g., charge storage device 902) and a switchable buffer (e.g., switchable buffer 904). The charge storage device can include a main capacitor (e.g., $C_{FD}$) and an auxiliary capacitor (e.g., $C_{EXT}$) which can be connected in parallel or disconnected from each other to adjust the capacitance of the charge storage device. The output of the charge sensing unit(s) is coupled with a quantizer (e.g., ADC 616), which is further coupled with a first memory bank (e.g., memory bank 1400a) and a second memory bank (1400b). Method 1800 can be performed by, for example, controller 920 in conjunction with other components of pixel cell 602a or image sensor 600.

Method 1800 starts with step 1802, in which the first photodiode is exposed to incident light to generate first charge. In some examples, a first shutter switch is coupled between the first photodiode and a charge sink, and the first shutter switch can be switched off to expose the first photodiode to the incident light to generate the first charge, and the switching off of the first shutter switch can begin an exposure period.

In step 1804, the second photodiode is exposed to incident light to generate second charge. In some examples, a second shutter switch is coupled between the second photodiode and the charge sink, and the second shutter switch can be switched off to expose the second photodiode to the incident light to generate the second charge. In some examples, the first shutter switch and the second shutter switch can be switched off at the same time so that the exposure period starts at the same time for both the first photodiode and the second photodiode.

In step 1806, the quantizer can be controlled to perform a first quantization operation and a second quantization operation of the first charge to generate, respectively, a first digital output and a second digital output, the first quantization and the second quantization operations being associated with different intensity ranges. In some examples, the first quantization operation can be a TTS operation, whereas the second quantization operation can be a FD ADC or PD ADC operation, as described in FIG. 14B. The charge sensing unit may receive first overflow charge of the first charge from the first photodiode after the first photodiode saturates to convert to a first voltage (if the incident light intensity is in the medium or high intensity ranges of FIG. 10), which can be quantized by the TTS or the FD ADC operation to generate the first digital output. In addition, the charge sensing unit can receive first residual charge of the first charge from the first photodiode to convert to a second voltage, which can be quantized by the PD ADC operation to generate the second digital output.

In step 1808, one of the first digital output or the second digital output can be stored in the first memory bank. The determination of whether the first digital output or the second digital output is to be stored in the first memory bank can be based on the intensity range of the incident light, which can be indicated by whether the first photodiode is saturated by the first residual charge, and whether the charge sensing unit is saturated by the first overflow charge. The first memory bank can be selected to receive an output from the quantizer to control a time when the first memory bank stores a count value from a counter (e.g., counter 914), and the output (e.g., the latch signal) can be generated by output logic circuits 908 of the quantizer based on whether the first photodiode is saturated by the first residual charge, and whether the charge sensing unit is saturated by the first overflow charge.

In step 1810, the quantizer can be controlled to perform a third quantization operation (e.g., PD ADC operation) of the second charge (e.g., second residual charge) to generate a third digital output. The third quantization operation is associated with a different intensity range from at least one of the first quantization operation (e.g., TTS operation) or the second quantization operation (e.g., FD ADC operation). In a case where the second photodiode is coupled with a second charge sensing unit which can store second overflow charge (of the second charge) from the second photodiode, the quantizer may also perform a FD ADC operation to measure the second charge.

In step 1812, the third digital output can be stored in the second memory bank. The second memory bank can be selected to receive the output from the quantizer to control a time when the second memory bank stores a count value from the counter.

Some portions of this description describe the examples of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some examples, a software module is implemented with a computer program product comprising a computer-readable medium containing computer program code, which can be executed by a computer processor for performing any or all of the steps, operations, or processes described.

Examples of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples of the disclosure may also relate to a product that is produced by a computing process described herein. Such a product may comprise information resulting from a computing process, where the information is stored on a non-transitory, tangible computer readable storage medium and may include any example of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the examples is intended to be illustrative, but not limiting, of the scope of the disclosure, which is set forth in the following claims.

What is claimed is:

1. An apparatus comprising:
   a first photodiode to generate a first charge in response to incident light;
   a second photodiode to generate a second charge in response to the incident light;
   a quantizer;
   a first memory bank and a second memory bank; and
   a controller configured to:
      control the quantizer to perform a first quantization operation and a second quantization operation of the first charge to generate, respectively, a first digital output and a second digital output, the first quantization and the second quantization operations being associated with different intensity ranges;
      store one of the first digital output or the second digital output in the first memory bank;
      control the quantizer to perform a third quantization operation of the second charge to generate a third digital output, the third quantization operation being associated with a different intensity range from at least one of the first quantization operation or the second quantization operation; and
      store the third digital output in the second memory bank.

2. The apparatus of claim 1, wherein the quantizer comprises a comparator; and
   wherein the comparator comprises a different type of transistor devices from the first and second photodiodes and from the first and second memory banks.

3. The apparatus of claim 1, wherein the first photodiode and the second photodiode are formed on a first semiconductor substrate;
   wherein the quantizer, the first memory bank, and the second memory bank are formed on a second semiconductor substrate; and
   wherein the first semiconductor substrate and the second semiconductor substrate form a stack.

4. The apparatus of claim 1, further comprising:
   a charge sensing unit comprising a capacitor and a buffer, the buffer being coupled with the quantizer;
   a first transfer switch coupled between the first photodiode and the capacitor; and
   a second transfer switch coupled between the second photodiode and the capacitor;
   wherein the controller is configured to:
      control the first transfer switch, while disabling the second transfer switch, to transfer first overflow charge of the first charge from the first photodiode to the capacitor to generate a first voltage;
      control the quantizer to measure, based on the first voltage, a time of saturation of the capacitor by the first overflow charge as the first digital output;
      control the quantizer to measure, based on the first voltage, a quantity of the first overflow charge transferred by the first photodiode as the second digital output;
      control the second transfer switch, while disabling the first transfer switch, to transfer second residual charge of the second charge from the second photodiode to the capacitor to generate a second voltage; and
      control the quantizer to measure, based on the second voltage, a quantity of the second residual charge transferred by the second photodiode as the third digital output.

5. The apparatus of claim 4, wherein the quantizer is configured to:
   measure the time of saturation based on comparing the first voltage against a static threshold to generate a first decision;
   measure the quantity of the first overflow charge transferred by the first photodiode based on comparing the first voltage against a first voltage ramp to generate a second decision; and
   measure the quantity of the second residual charge transferred by the second photodiode based on comparing the second voltage against a second voltage ramp to generate a third decision;

and wherein the controller is configured to:
forward the first decision and the second decision to the first memory bank to control a first time when the first memory bank stores a count value from a counter as the first digital output or the second digital output; and
forward the third decision to the second memory bank to control a second time when the second memory bank stores a count value from the counter as the third digital output.

6. The apparatus of claim 4, wherein the controller is configured to:
control the first transfer switch to transfer first residual charge of the first charge to the capacitor to generate a third voltage;
control the quantizer to measure, based on the third voltage, a quantity of the first residual charge transferred by the first photodiode as a fourth digital output; and
store one of the first, second, or fourth digital outputs in the first memory bank.

7. The apparatus of claim 6, wherein the capacitor comprise a primary capacitor and an auxiliary capacitor;
wherein the first overflow charge is stored in a parallel combination of the primary capacitor and the auxiliary capacitor; and
wherein the first residual charge and the second residual charge are stored in the primary capacitor but not in the auxiliary capacitor.

8. The apparatus of claim 1, further comprising:
a first charge sensing unit comprising a first capacitor and a first buffer, the first buffer being coupled with the quantizer;
a second charge sensing unit comprising a second capacitor and a second buffer, the second buffer being coupled with the quantizer;
a first transfer switch coupled between the first photodiode and the first capacitor; and
a second transfer switch coupled between the second photodiode and the second capacitor;
wherein the controller is configured to:
control the first transfer switch to transfer first overflow charge of the first charge from the first photodiode to the first capacitor to generate a first voltage;
control the second transfer switch to transfer second overflow charge of the second charge from the second photodiode, after the second photodiode saturates, to the second capacitor to generate a second voltage;
control the quantizer to measure, based on the first voltage, a time of saturation of the first capacitor by the first overflow charge as the first digital output;
control the quantizer to measure, based on the first voltage, a quantity of the first overflow charge transferred by the first photodiode as the second digital output; and
control the quantizer to measure, based on the second voltage, a quantity of the second overflow charge transferred by the second photodiode as the third digital output.

9. The apparatus of claim 8, wherein the quantizer is configured to:
measure the time of saturation based on comparing the first voltage against a static threshold to generate a first decision;
measure the quantity of the first overflow charge transferred by the first photodiode based on comparing the first voltage against a first voltage ramp to generate a second decision; and
measure the quantity of the second overflow charge transferred by the second photodiode based on comparing the second voltage against a second voltage ramp to generate a third decision;
and wherein the controller is configured to:
forward the first decision and the second decision to the first memory bank to control a first time when the first memory bank stores a count value from a counter as the first digital output or the second digital output; and
forward the third decision to the second memory bank to control a second time when the second memory bank stores a count value from the counter as the third digital output.

10. The apparatus of claim 8, wherein the controller is configured to:
control the first transfer switch to transfer first residual charge of the first charge to the first capacitor to generate a third voltage;
control the quantizer to measure, based on the third voltage, a quantity of the first residual charge transferred by the first photodiode as a fourth digital output;
control the second transfer switch to transfer second residual charge of the second charge to the second capacitor to generate a fourth voltage;
control the quantizer to measure, based on the fourth voltage, a quantity of the second residual charge transferred by the second photodiode as a fifth digital output;
store one of the first, second, or fourth digital outputs in the first memory bank; and
store one of the third or fifth digital outputs in the second memory bank.

11. The apparatus of claim 1, further comprising:
a first group of photodiodes including the first photodiode and a third photodiode, the third photodiode configured to generate a third charge; and
a second group of photodiodes including the second photodiode and a fourth photodiode, the fourth photodiode configured to generate a fourth charge;
wherein the controller is configured to:
control the quantizer to quantize the third charge to generate a fourth digital output;
control the quantizer to quantize the fourth charge to generate a fifth digital output;
at a first time:
store one of the first digital output or the second digital output in the first memory bank, and
store the third digital output in the second memory bank;
and at a second time:
store the fourth digital output in the first memory bank, and
store the fifth digital output in the second memory bank.

12. The apparatus of claim 11, wherein the first photodiode and the second photodiode are configured to detect visible light components of incident light and to generate, respectively, the first charge and the second charge within a first exposure period; and
wherein the third photodiode and the fourth photodiode are configured to detect an infra-red light component of the incident light and to generate, respectively, the third charge and the fourth charge within a second exposure period.

13. The apparatus of claim 11, wherein the first group of photodiodes includes the first photodiode, the third photodiode, a fifth photodiode, and a sixth photodiode, the fifth photodiode configured to generate a fifth charge and the sixth photodiode configured to generate a sixth charge;
wherein the apparatus further includes a third memory bank and a fourth memory bank; and
wherein the controller is configured to:
control the quantizer to quantize the fifth charge to generate a sixth digital output;
control the quantizer to quantize the sixth charge to generate a seventh digital output;
store one of the first digital output or the second digital output in the first memory bank;
store the sixth digital output in the third memory bank; and
store the seventh digital output in the fourth memory bank.

14. The apparatus of claim 11, wherein the first group of photodiodes and the second group of photodiodes are part of different pixel cells.

15. The apparatus of claim 1, further comprising a third memory bank;
wherein the controller is configured to:
quantize, at a first time, the first charge to generate the second digital output;
quantize, at a second time, the first charge to generate a fourth digital output;
store the second digital output in the first memory bank; and
store the fourth digital output in the third memory bank.

16. The apparatus of claim 1, further comprising a third photodiode to generate a third charge in response to incident light,
wherein the controller is configured to control the quantizer to perform the first quantization operation and the second quantization operation of a combination of the first charge and the third charge to generate, respectively, a first digital output and a second digital output, the first quantization and the second quantization operations being associated with different intensity ranges.

17. The apparatus of claim 16, wherein the first photodiode and the third photodiode are configured to detect same component of the incident light.

18. A method comprising:
enabling a first photodiode to generate a first charge in response to incident light;
enabling a second photodiode to generate a second charge in response to the incident light;
controlling a quantizer to perform a first quantization operation and a second quantization operation of the first charge to generate, respectively, a first digital output and a second digital output, the first quantization and the second quantization operations being associated with different intensity ranges;
storing one of the first digital output or the second digital output in a first memory bank;
controlling the quantizer to perform a third quantization operation of the second charge to generate a third digital output, the third quantization operation being associated with a different intensity range from at least one of the first quantization operation or the second quantization operation; and
storing the third digital output in a second memory bank.

19. The method of claim 18, further comprising:
transferring first overflow charge of the first charge from the first photodiode, after the first photodiode saturates, to a capacitor to generate a first voltage;
controlling the quantizer to measure, based on the first voltage, a time of saturation of the capacitor by the first overflow charge as the first digital output;
controlling the quantizer to measure, based on the first voltage, a quantity of the first overflow charge transferred by the first photodiode as the second digital output;
transferring second residual charge of the second charge from the second photodiode to the capacitor to generate a second voltage; and
controlling the quantizer to measure, based on the second voltage, a quantity of the second residual charge transferred by the second photodiode as the third digital output.

20. The method of claim 18, wherein the first photodiode and the second photodiode generate, respectively, the first charge and the second charge in response to different components of the incident light.

* * * * *